INVENTOR
MAXWELL C. ANDREWS
BY Francis J. Thomas
ATTORNEY

FLIP-FLIP

"AND" GATES

"OR" GATES

INVERTER

AMPLIFIER

LIMITER

DELAY CIRCUIT

SINGLE-SHOT MULTIVIBRATOR

RING COUNTER

June 22, 1965 M. C. ANDREWS 3,191,150
SPECIMEN IDENTIFICATION SYSTEM WITH ADAPTIVE
AND NON-ADAPTIVE STORAGE COMPARATORS
Filed Oct. 30, 1962 37 Sheets-Sheet 3

FIG. 15
RECYCLING SHIFT REGISTER

FIG. 16 ACCUMULATOR

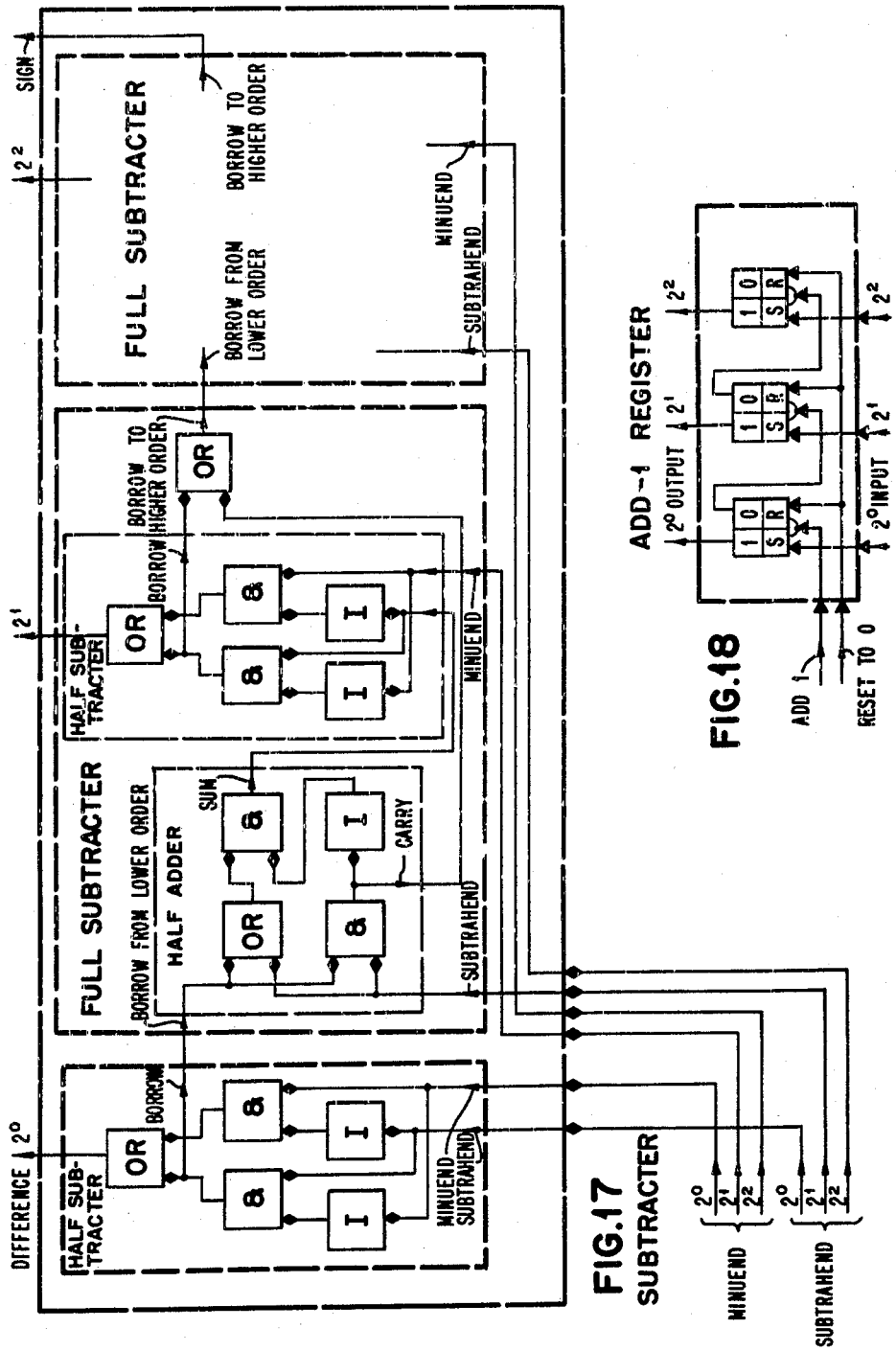
FIG.17 SUBTRACTER
FIG.18 ADD-1 REGISTER

NORMALIZED COMPARISON

FIG. 31

|  | \multicolumn{10}{c}{REFERENCE PATTERN} |
|---|---|---|---|---|---|---|---|---|---|---|
| INPUT PATTERN | 1 | 2 | 3 | 4 | 5 | 6 | 7 | 8 | 9 | 0 |
| 1 | 9.22 | 5.86 | 5.23 | 7.49 | 6.15 | 6.18 | 7.06 | 6.26 | 6.95 | 6.21 |
| 2 | 8.24 | 12.96 | 10.63 | 11.37 | 11.41 | 12.23 | 11.55 | 12.24 | 10.88 | 10.68 |
| 3 | 6.18 | 8.95 | 10.91 | 8.46 | 9.82 | 8.80 | 9.08 | 9.46 | 8.46 | 8.08 |
| 4 | 11.71 | 12.65 | 11.18 | 14.42 | 12.80 | 13.60 | 12.83 | 12.90 | 13.60 | 12.41 |
| 5 | 10.52 | 13.89 | 14.21 | 14.01 | 15.78 | 14.28 | 14.03 | 14.55 | 14.11 | 12.56 |
| 6 | 10.74 | 15.12 | 12.93 | 15.12 | 14.51 | 16.03 | 14.58 | 14.83 | 14.51 | 14.29 |
| 7 | 8.35 | 9.72 | 9.08 | 9.71 | 9.70 | 9.92 | 10.91 | 9.75 | 9.47 | 9.53 |
| 8 | 14.43 | 20.06 | 18.43 | 19.00 | 19.58 | 19.65 | 18.98 | 21.24 | 19.24 | 18.04 |
| 9 | 14.97 | 16.66 | 15.40 | 18.72 | 17.74 | 17.96 | 17.23 | 17.99 | 19.85 | 17.32 |
| 0 | 9.33 | 11.42 | 10.27 | 11.93 | 11.03 | 12.35 | 12.10 | 11.77 | 12.09 | 13.86 |

NORMALIZED "SECOND-DIFFERENCE" COMPARISON

FIG. 32

|  | \multicolumn{10}{c}{REFERENCE PATTERN} |
|---|---|---|---|---|---|---|---|---|---|---|
| INPUT PATTERN | 1 | 2 | 3 | 4 | 5 | 6 | 7 | 8 | 9 | 0 |
| 1 | 23.58 | 5.19 | 3.35 | 17.73 | 6.96 | 7.66 | 11.52 | 9.76 | 17.88 | 9.70 |
| 2 | 7.97 | 36.22 | 15.10 | 19.07 | 15.59 | 29.90 | 18.21 | 28.82 | 12.86 | 15.25 |
| 3 | 5.68 | 16.68 | 40.00 | 12.87 | 28.94 | 14.32 | 20.00 | 27.75 | 14.13 | 17.37 |
| 4 | 15.78 | 11.04 | 6.75 | 20.98 | 10.01 | 14.78 | 11.52 | 11.74 | 14.53 | 10.86 |
| 5 | 10.26 | 14.96 | 25.15 | 16.59 | 34.76 | 17.45 | 19.64 | 21.10 | 20.76 | 10.66 |
| 6 | 9.75 | 24.79 | 10.75 | 21.17 | 15.08 | 30.03 | 19.01 | 19.01 | 14.60 | 17.32 |
| 7 | 10.94 | 4.26 | 11.20 | 12.30 | 12.66 | 14.18 | 22.41 | 12.05 | 13.43 | 15.81 |
| 8 | 16.29 | 31.31 | 27.30 | 22.03 | 23.88 | 24.91 | 21.16 | 39.34 | 22.43 | 21.57 |
| 9 | 22.65 | 10.60 | 10.55 | 20.69 | 17.84 | 14.52 | 18.57 | 17.03 | 29.87 | 14.09 |
| 0 | 16.29 | 16.68 | 17.20 | 20.50 | 12.14 | 22.84 | 27.94 | 20.71 | 18.68 | 39.60 |

FIG. 33b

IDEAL FONT

MEASURE OF SIMILARITY
TO IDEAL FONT

A   0.930
B   0.982
R   1.000

IDEAL FONT WITH
DELETION NOISE

MEASURE OF SIMILARITY
TO IDEAL FONT

A   0.888
B   0.928
R   0.944

IDEAL FONT WITH
ADDITIVE NOISE

MEASURE OF SIMILARITY
TO IDEAL FONT

A   0.920
B   0.952
R   0.967

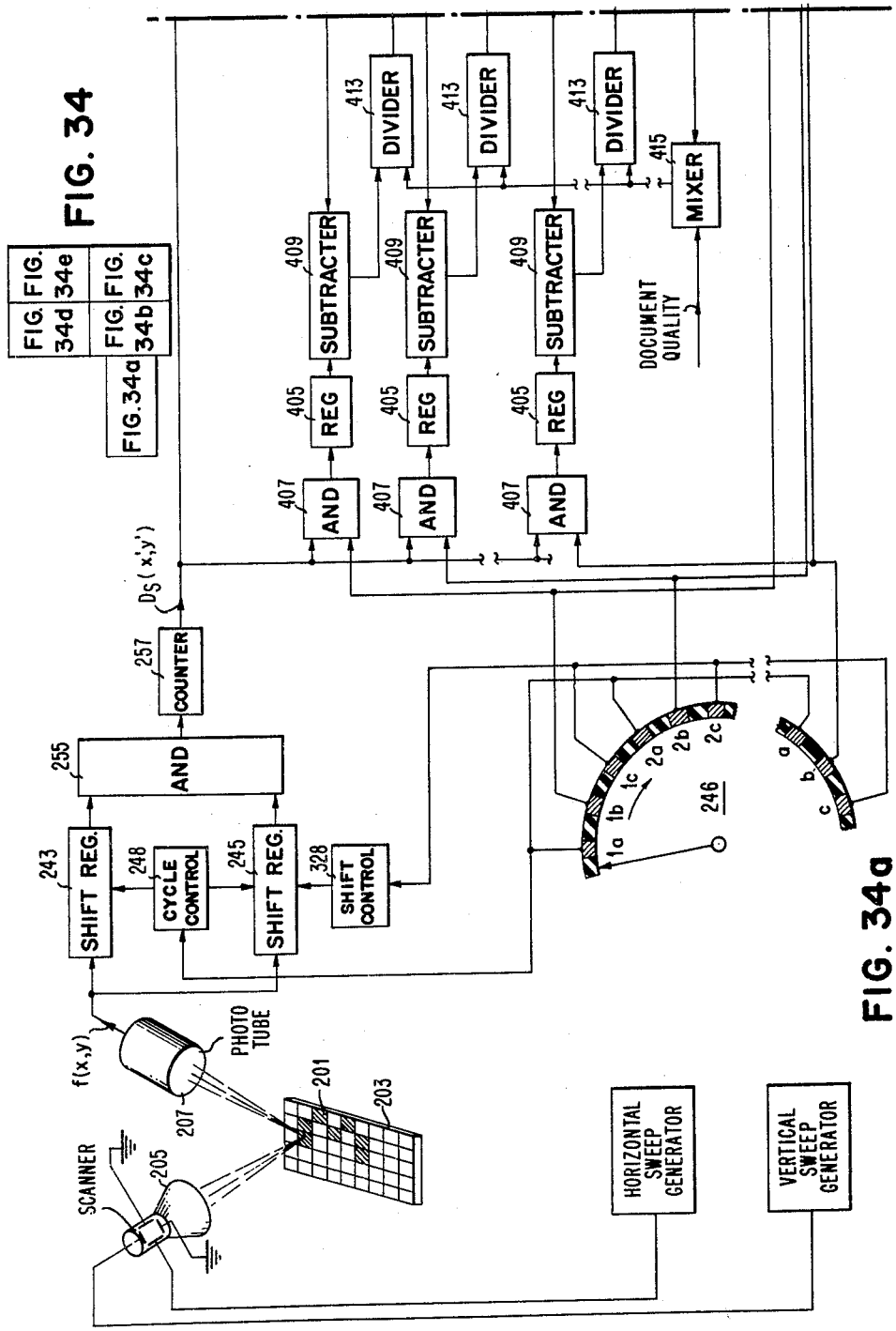

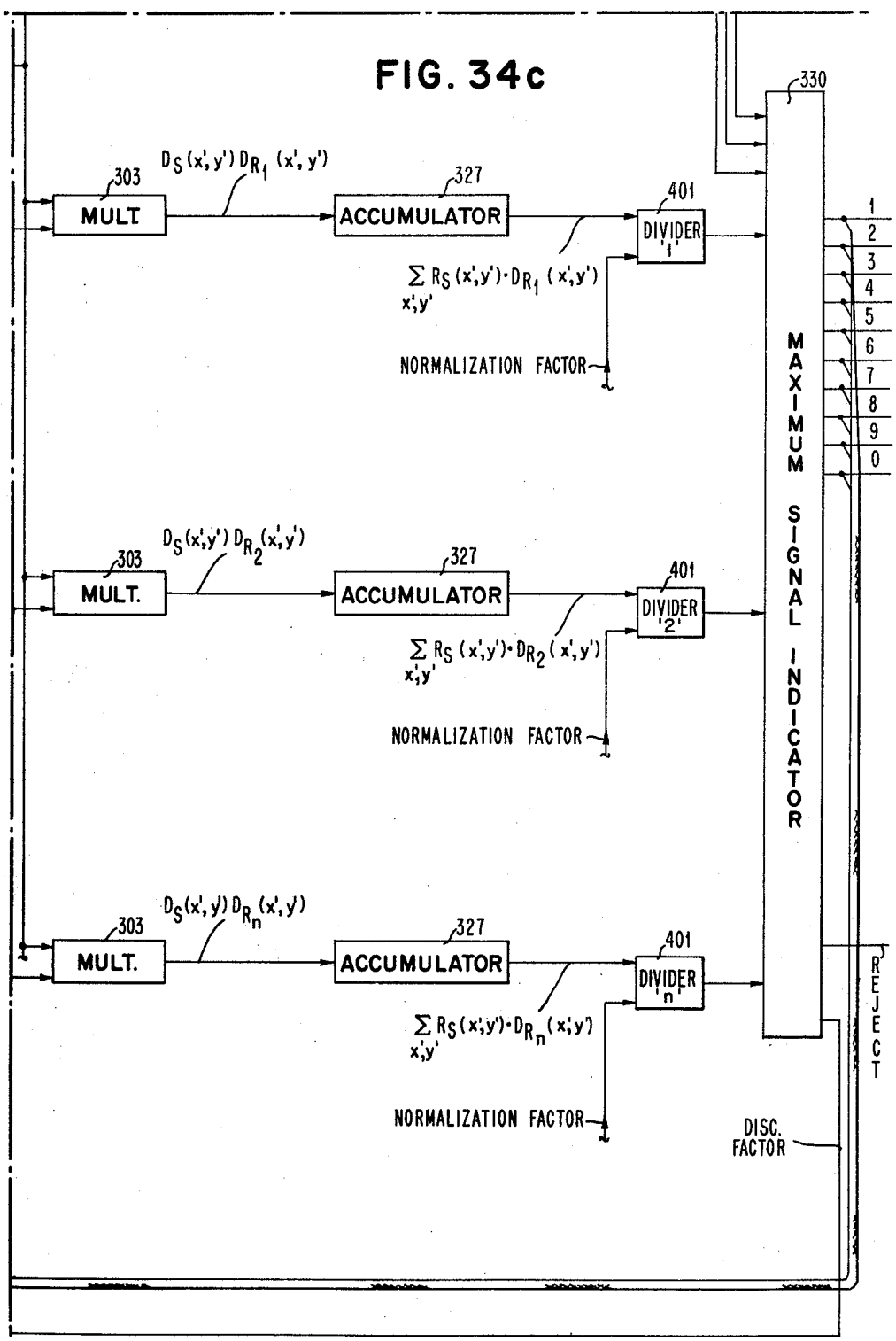

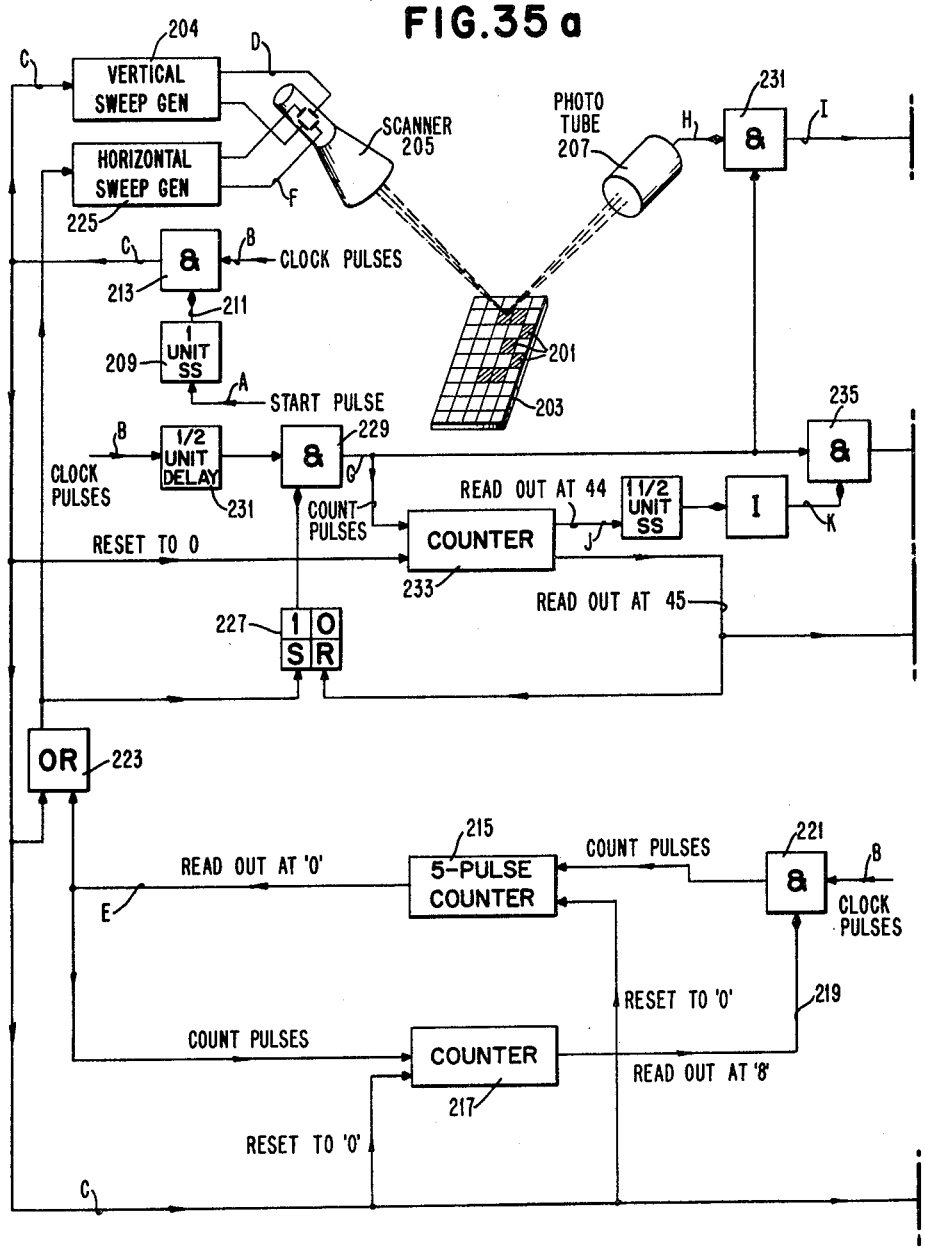

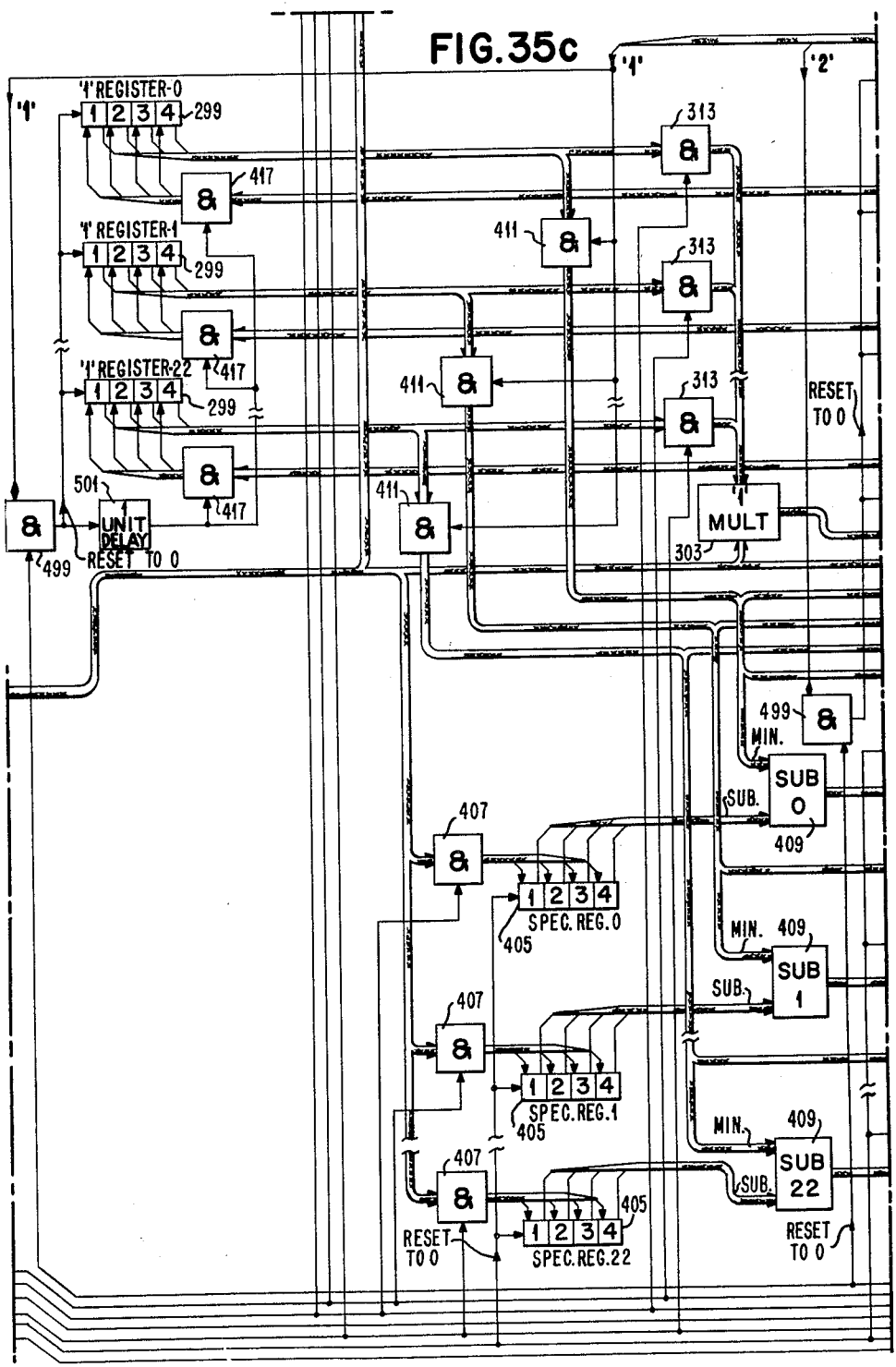

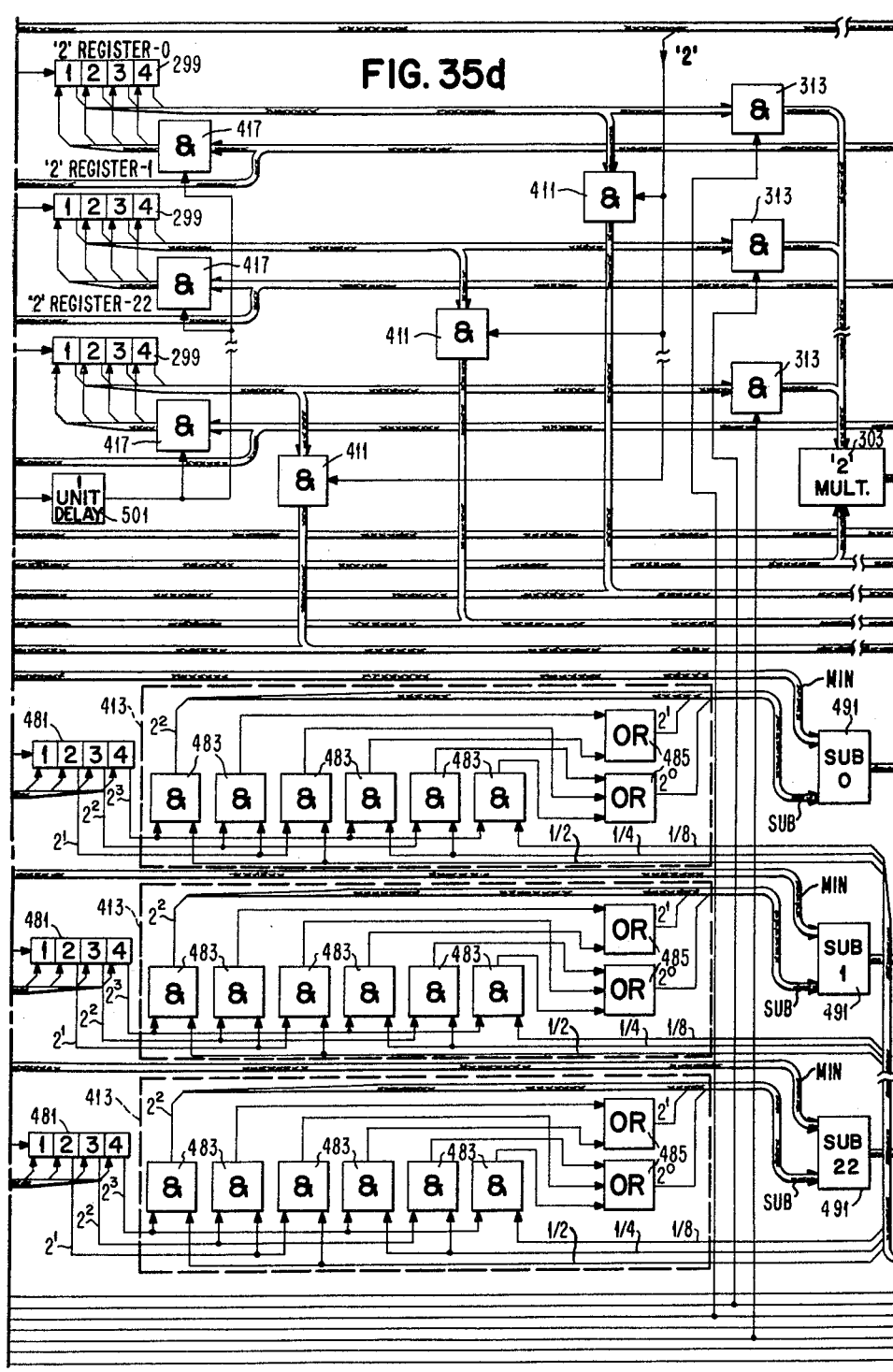

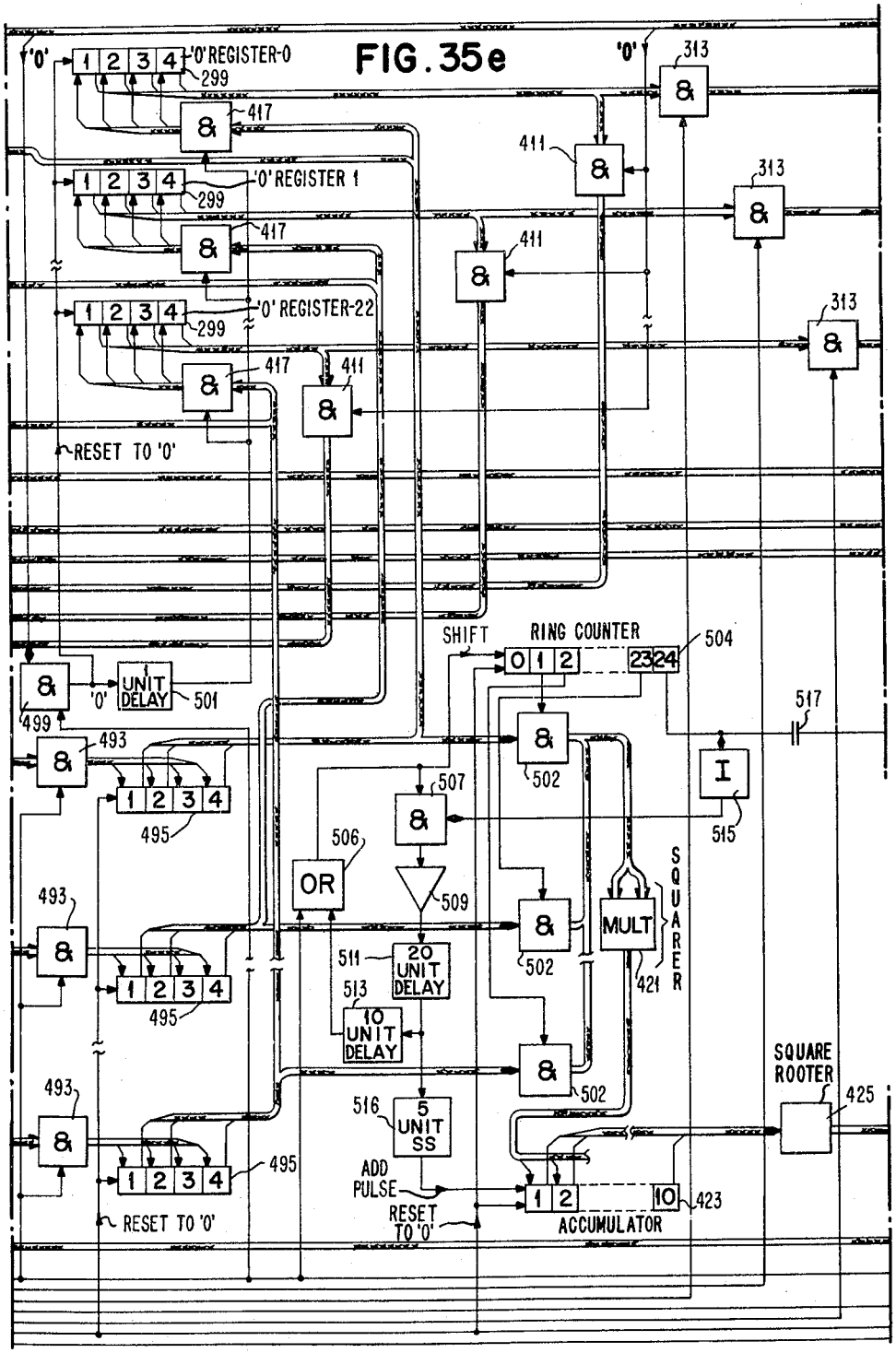

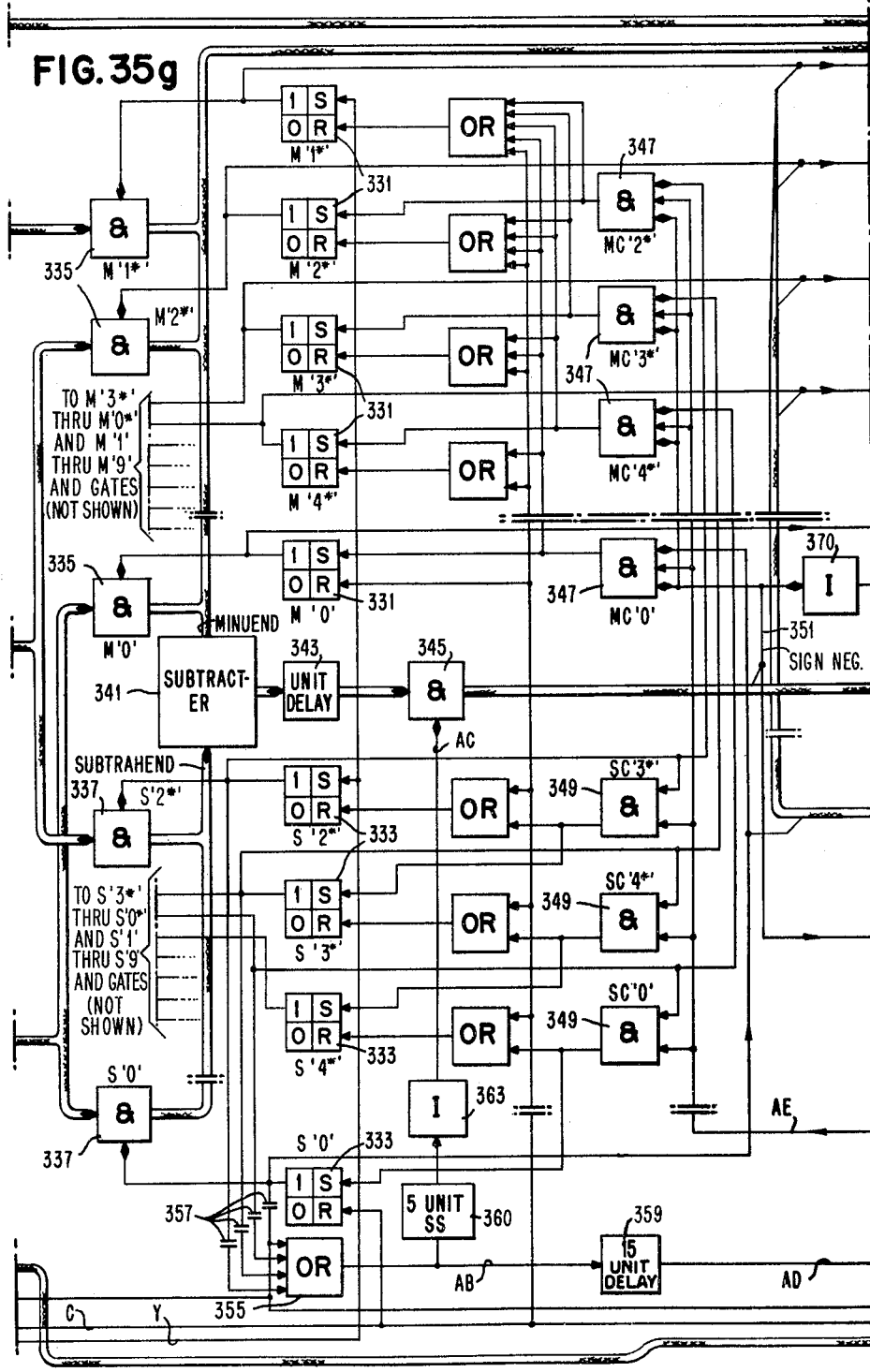

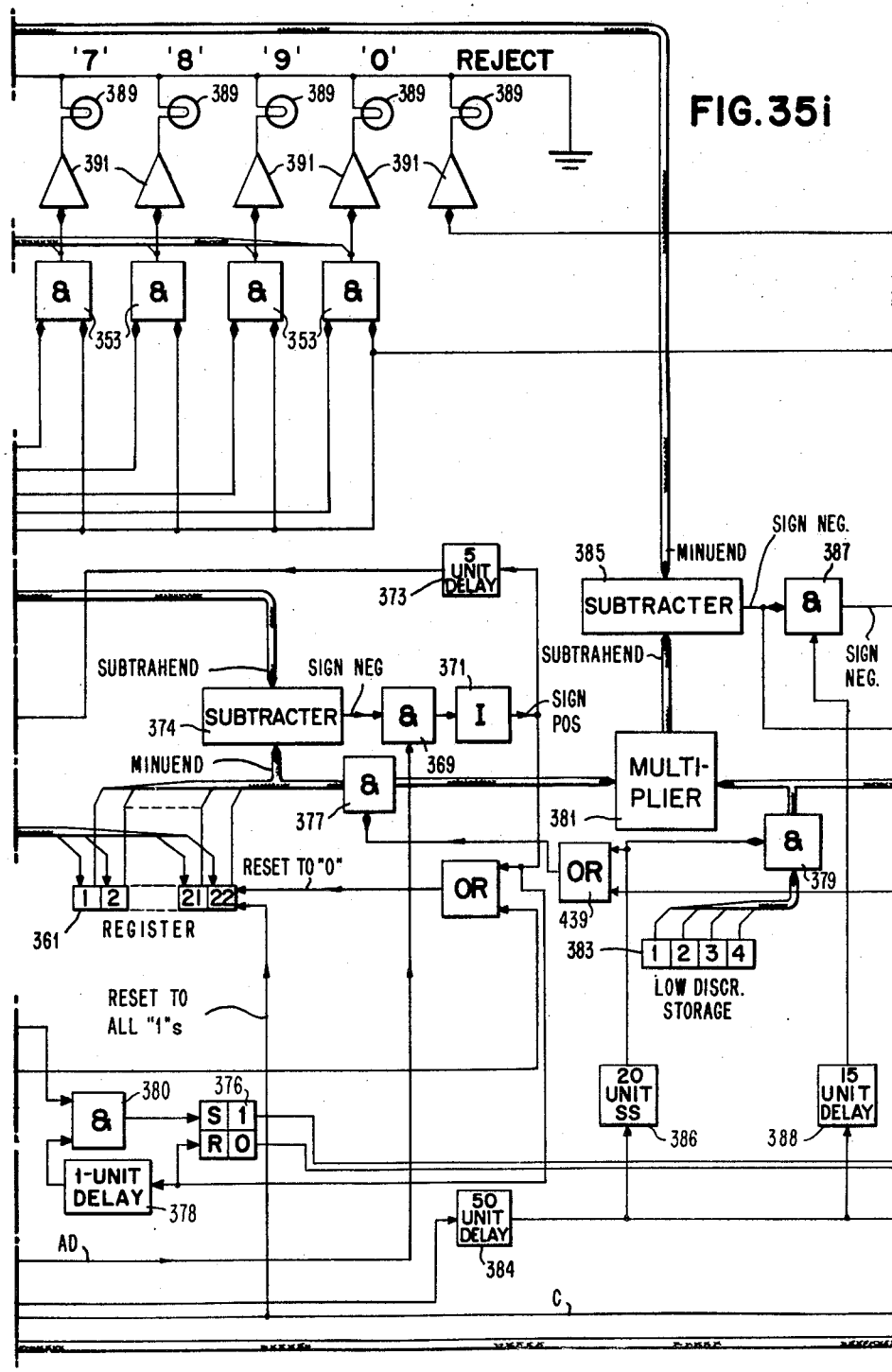

June 22, 1965 M. C. ANDREWS 3,191,150
SPECIMEN IDENTIFICATION SYSTEM WITH ADAPTIVE
AND NON-ADAPTIVE STORAGE COMPARATORS
Filed Oct. 30, 1962 37 Sheets-Sheet 27

June 22, 1965  M. C. ANDREWS  3,191,150
SPECIMEN IDENTIFICATION SYSTEM WITH ADAPTIVE
AND NON-ADAPTIVE STORAGE COMPARATORS
Filed Oct. 30, 1962   37 Sheets-Sheet 30

0 SHIFT

| ROW 1 | ROW 2 | ROW 3 | ROW 4 | ROW 5 | ROW 6 | ROW 7 | ROW 8 | ROW 9 |

0000000110000010001000001001100000000000000

0000000110000010001000001001100000000000000

1 SHIFT

0000000110000010001000001001100000000000000

0000000110000010001000001001100000000000000

2 SHIFT

0000000110000010001000001001100000000000000

0000000110000010001000001001100000000000000

3 SHIFT

0000000110000010001000001001100000000000000

0000000011000001000100000100110000000000000

22 SHIFT

0000000110000010001000001001100000000000000

0100110000000000000000000000110000010001000

FIG. 41 — 23 SHIFT

FIG. 42 — 44 SHIFT

FIG. 43 — 45 SHIFT

AUTOCORRELATION TABLE

| 23 | 24 | 25 | 26 | 27 |
|---|---|---|---|---|
| 0 | 1 | 2 | 1 | 0 |
| 28 | 29 | 30 | 31 | 32 |
| 1 | 1 | 0 | 1 | 1 |
| 33 | 34 | 35 | 36 | 37 |
| 0 | 1 | 3 | 1 | 0 |
| 38 | 39 | 40 | 41 | 42 |
| 1 | 2 | 0 | 2 | 1 |
| 43 | 44 | 0 | 1 | 2 |
| 0 | 2 | 7 | 2 | 0 |
| 3 | 4 | 5 | 6 | 7 |
| 1 | 2 | 0 | 2 | 1 |
| 8 | 9 | 10 | 11 | 12 |
| 0 | 1 | 3 | 1 | 0 |
| 13 | 14 | 15 | 16 | 17 |
| 1 | 1 | 0 | 1 | 1 |
| 18 | 19 | 20 | 21 | 22 |
| 0 | 1 | 2 | 1 | 0 |

FIG. 44

United States Patent Office 3,191,150
Patented June 22, 1965

3,191,150
SPECIMEN IDENTIFICATION SYSTEM WITH ADAPTIVE AND NON-ADAPTIVE STORAGE COMPARATORS
Maxwell C. Andrews, Katonah, N.Y., assignor to International Business Machines Corporation, New York, N.Y., a corporation of New York
Filed Oct. 30, 1962, Ser. No. 234,588
31 Claims. (Cl. 340—146.3)

This invention relates to specimen identification systems and, in particular, to adaptive techniques for altering reference storage in identification systems when the specimens are identifiable but different from the references.

The invention is applicable to many types of specimen identification systems and is embodied in a character recognition system and, more particularly, in conjunction with a system using autocorrelation function techniques. The basic autocorrelation function techniques are shown and described in a U.S. patent application, Serial Number 45,034, filed July 25, 1960, by L. P. Horwitz and G. L. Shelton, Jr., entitled Specimen Identification Apparatus and Method. In addition, methods and apparatus using adaptive techniques for altering reference storage in an autocorrelation function recognition system are shown in U.S. patent application, Serial Number 166,211, filed on January 15, 1962, by Herbert B. Baskin, entitled Specimen Identification Apparatus and Method; and in U.S. patent application, Serial Number 166,180, filed on January 15, 1962, by Maxwell C. Andrews entitled Specimen Identification Apparatus and Method.

Identification techniques, including those based on autocorrelation functions, provide an indication of the identity of the specimen based on a comparison of the specimen with a set of references. This indication is often based on a "best-match" principle and may operate in a satisfactory manner for specimens that exactly or closely match a member of the set of references. Many documents contain specimens that deviate in font and quality to an extent that some cannot be recognized by the identification system. In the previously mentioned U.S. patent application, Serial Number 166,180, a radically new approach to this problem is pursued, wherein the stored set of references is gradually altered when the specimen characters that are being recognized are sensed to closely match, but not exactly match, the references. In this manner, the system adapts itself to changes in font and quality, in many cases, before system failure occurs. In the present invention, this technique is significantly improved by using a non-adaptive reference storage in addition to the adaptive reference storage. The use of this dual channel storage insures that the original reference patterns are not "lost" by the automatic system adaptation to changing input specimens, but rather are retained in addition to the altered reference patterns. The input specimens are compared to both sets of reference patterns and an indication of the identity of the specimens is provided. Since the original set of reference patterns is also retained, when high-quality specimens follow degraded specimens (which have caused the adaptive set of reference patterns to be automatically altered) the high-quality specimens are also correctly identified by their similarity to the non-adaptive reference patterns. The adaptive reference patterns are then automatically altered by the high-quality specimens. This feature insures that, when degraded specimens cause the adaptive reference patterns to be radically altered, subsequent high-quality specimens are still identifiable even if they would not be identifiable if compared to the adaptive reference patterns. In the preferred embodiment of the invention, the autocorrelation functions of references are stored as the reference patterns and are compared to autocorrelation functions of specimens to effect recognition.

A primary object of the present invention is to provide adaptive techniques in a specimen identification system.

Another object is to provide adaptive techniques for identifying printed patterns, including characters.

A further object is to provide techniques for altering the reference patterns in specimen identification systems when the specimens do not identically match the reference patterns.

Another object is to provide dual reference pattern storage in a specimen identification system, where the reference patterns are adaptively and non-adaptively stored and where the adaptive storage is altered when the specimens do match the adaptively stored reference patterns.

A further object is to provide adaptive techniques for specimen identification systems which use autocorrelation function comparison.

Another object is to provide techniques for altering reference pattern storage, in those specimen identification systems that utilize autocorrelation function comparison when the specimens do not exactly match the reference patterns.

Another object is to provide dual reference pattern storage techniques in a specimen identification system that is based on autocorrelation function comparison, where the reference patterns are adaptively and non-adaptively stored, and where the adaptive storage is altered when the specimens do not match the adaptively stored reference pattern.

A further object is to provide dual reference pattern storage techniques in specimen identification systems utilizing adaptive and non-adaptive reference pattern storage, where the adaptive storage is altered when the specimens do not match the adaptively stored reference patterns, and where the amount of alteration is a function of the probability of correct identification.

A further object is to provide dual reference pattern storage techniques in specimen identification systems utilizing adaptive and non-adaptive reference pattern storage, where the adaptive storage is altered when the specimens do not match the adaptively stored reference patterns, and where the amount of alteration is a function of the document quality.

A further object is to provide dual reference pattern storage techniques in specimen identification systems utilizing adaptive and non-adaptive reference pattern storage, where the adaptive storage is altered when the specimens do not match the adaptively stored reference patterns, and where the amount of alteration is a function of the deviations between the specimens and the reference patterns.

A still further object is to provide dual reference pattern storage techniques in specimen identification systems utilizing adaptive and non-adaptive reference pattern storage, where the adaptive storage is altered when the specimens do not match the adaptively stored reference patterns, and where the amount of alteration is a function of the deviations between the specimen and the reference patterns and a function of the document quality.

Another object is to provide dual reference pattern storage techniques in specimen identification systems utilizing adaptive and non-adaptive reference pattern storage, where the adaptive storage is altered when the specimens do not match the adaptively stored reference patterns, and where the amount of alteration is a function of the deviations between the specimens and the reference patterns and a function of the probability of correct identification.

A further object is to provide dual reference pattern storage techniques in specimen identification system utilizing adaptive and non-adaptive reference pattern storage, where the adaptive storage is altered when the specimens do not match the adaptively stored reference patterns, and where the amount of alteration is a function of the probability of correct identification, a function of the document quality, and a function of the deviations between the specimens and the reference patterns.

A further object is to provide dual reference pattern storage techniques in those specimen identification systems that utilize autocorrelation function comparison, utilizing adaptive and non-adaptive reference pattern storage, where the adaptive storage is altered when the specimens do not match the adaptively stored reference patterns, and where the amount of alterations is a function of the probability of correct identification.

A further object is to provide dual reference pattern storage techniques in those specimen identification systems that utilize autocorrelation function comparison utilizing adaptive and non-adaptive reference pattern storage, where the adaptive storage is altered when the specimens do not match the adaptively stored reference patterns, and where the amount of alteration is a function of the document quality.

A further object is to provide dual reference pattern storage techniques in those specimen identification systems that utilize autocorrelation function comparison utilizing adaptive and non-adaptive reference pattern storage, where the adaptive storage is altered when the specimens do not match the adaptively stored reference patterns, and where the amount of alteration is a function of the deviation between the specimens and the reference patterns.

A still further object is to provide dual reference pattern storage techniques in those specimen identification systems that utilize autocorrelation function comparison utilizing adaptive and non-adaptive reference pattern storage, where the adaptive storage is altered when the specimens do not match the adaptively stored reference patterns, and where the amount of alteration is a function of the probability of correct identification and a function of the document quality.

A further object is to provide dual reference pattern storage techniques in those specimen identification systems that utilize autocorrelation function comparison utilizing adaptive and non-adaptive reference pattern storage, where the adaptive storage is altered when the specimens do not match the adaptively stored reference patterns, and where the amount of alteration is a function of the probability of correct identification, a function of the document quality, and a function of the deviation between the specimens and the reference patterns.

In accordance with a preferred embodiment of the invention, an autocorrelation function of the specimen is generated electronically and compared with at least two sets of autocorrelation functions of reference patterns to provide an indication of the identity of the specimen. One set of autocorrelation functions of reference patterns is non-adaptively stored and at least one set is adaptively stored. The autocorrelation function of a reference pattern is altered after recognition whenever it is determined that the probability of correct identification is high and that the specimen was not found to match the reference pattern. The amount of alteration is a function of this probability, the document quality, and the amount of deviation between the specimen and the reference pattern. Although the preferred embodiment of the invention is based on a specimen identification system using autocorrelation function comparison, the basic technique of employing adaptive and non-adaptive reference storage is obviously extendable to identification systems based on other techniques and functions.

The autocorrelation function is a measure of the correlation of a function with itself and is thus inherently registration invariant. If the specimen to be identified is considered to be a matrix of discrete areas having coordinates $(x, y)$ that are predominately black or predominately white, depending then upon the positions of the lines that the specimen comprises, there is a function $f(x, y)$ that is "1" for each instance where the area about the coordinates $(x, y)$ is black and "0" where white. The autocorrelation function defines the number of pairs of black areas separated by a given distance in a given direction, over all distances and directions. If $(x, y)$ is a point on the pattern, and $(x+x', y+y')$ is another point on the pattern separated from the point $(x, y)$ by $(x', y')$, then the product $(x, y) \cdot (x+x', y+y') = 1$ only where both points are black. Since this procedure is performed on every pair of points in the specimen pattern S, the autocorrelation function $D_S(x', y')$ is defined as:

$$D_S(x', y') = \sum_{x, y} f(x, y) f(x+x', y+y')$$

The autocorrelation function $D_S(x', y')$ of the specimen "S" is then compared, point-by-point, to the autocorrelation functions $D_R(x', y')$ of all reference patterns R as follows:

$$\sum_{x', y'} D_S(x', y') \cdot D_{R_n}(x', y')$$

If this operation is normalized with respect to the reference patterns, the reference pattern $n$ that produces the largest comparison sum determines the identification of the specimen. Each comparison is normalized by dividing by the square root of the sum of the squares of the elements of the autocorrelation function of the appropriate reference. A Schwartz inequality, as found on page 417 of a text authored by Wilfred Kaplan, entitled Advanced Calculus, 1952, published by the Addison-Wesley Publishing Company may be used to show that:

$$\sum_{x', y'} \frac{D_S(x', y') \cdot D_{R_n}(x', y')}{\left[ \sum_{x', y'} D_{R_n}^2(x', y') \right]^{1/2}}$$

is a maximum when $D_S(x', y') = D_{R_n}(x', y')$.

Some functions of the autocorrelation function have been found to provide better specimen identification than is achieved by using the autocorrelation function itself, either by improving the distinction between patterns having certain similarities, or by "smoothing" small differences between essentially-similar patterns, such as "1" with and without a serif. One of the "discriminating" functions which improves distinction, the normalized "second-difference" function of the autocorrelation function is explained in detail below. Specimen identification using the autocorrelation function and the "second-difference" function of the autocorrelation function of the reference patterns are shown with respect to the electronic embodiment and the advantage of the latter is shown. The "second-difference" function is only one of many "discriminating" functions of the autocorrelation function that provide improved specimen identification.

One of the "smoothing" functions which overrides small differences, the normalized "averaging" functions of the autocorrelation function is also explained in detail below.

Specimen identification may be further enhanced by using higher-order autocorrelation function comparison based on point triples, quadruples, etc. Higher-order autocorrelation function techniques are described in detail in a U.S. patent application, Serial Number 118,124, filed June 19, 1961, by H. H. Goldstine, L. P. Horwitz, and G. L. Shelton, Jr., entitled Specimen Identification Apparatus and Methods. Specimen identification is also enhanced by the use of generalized autocorrelation function which makes use of the combination of black and white points on the document area. These techniques are described in detail in U.S. patent application, Serial Number 227,322, filed on October 1, 1962, by Louis A. Kamentsky and Chao-Ning Liu, entitled Specimen Identification Methods and Apparatus.

Autocorrelation function techniques and their use in the invention will be described in greater detail below.

The foregoing and other objects, features and advantages of the invention will be apparent from the following more particular description of preferred embodiments of the invention, as illustrated in the accompanying drawings.

In the drawings:

FIGURE 1 is a block diagram of a preferred embodiment of the invention.

FIGURES 2 through 9 are diagrams showing the basic digital symbols used in FIGURES 10 through 18, 34 and 35.

FIGURES 10 through 18 are schematic diagrams showing the basic digital circuits used in FIGURES 34 and 35.

FIGURES 28 through 30 are charts showing the autocorrelation functions, normalized autocorrelation functions and normalized "second-difference" functions for ten arabic numerals.

FIGURE 31 is a chart showing the stability of identification of ten arabic numerals using "second-difference" autocorrelation comparison.

FIGURE 32 is a chart showing the stability of identification of ten arabic numerals using "second-difference" autocorrelation comparison.

FIGURES 36 through 43 are diagrams showing the operation of the shift registers shown in FIGURE 35b.

FIGURE 44 is a diagram showing the autocorrelation function generated as a result of the operation of the shift registers in the diagram in FIGURE 35b.

Figure 1:
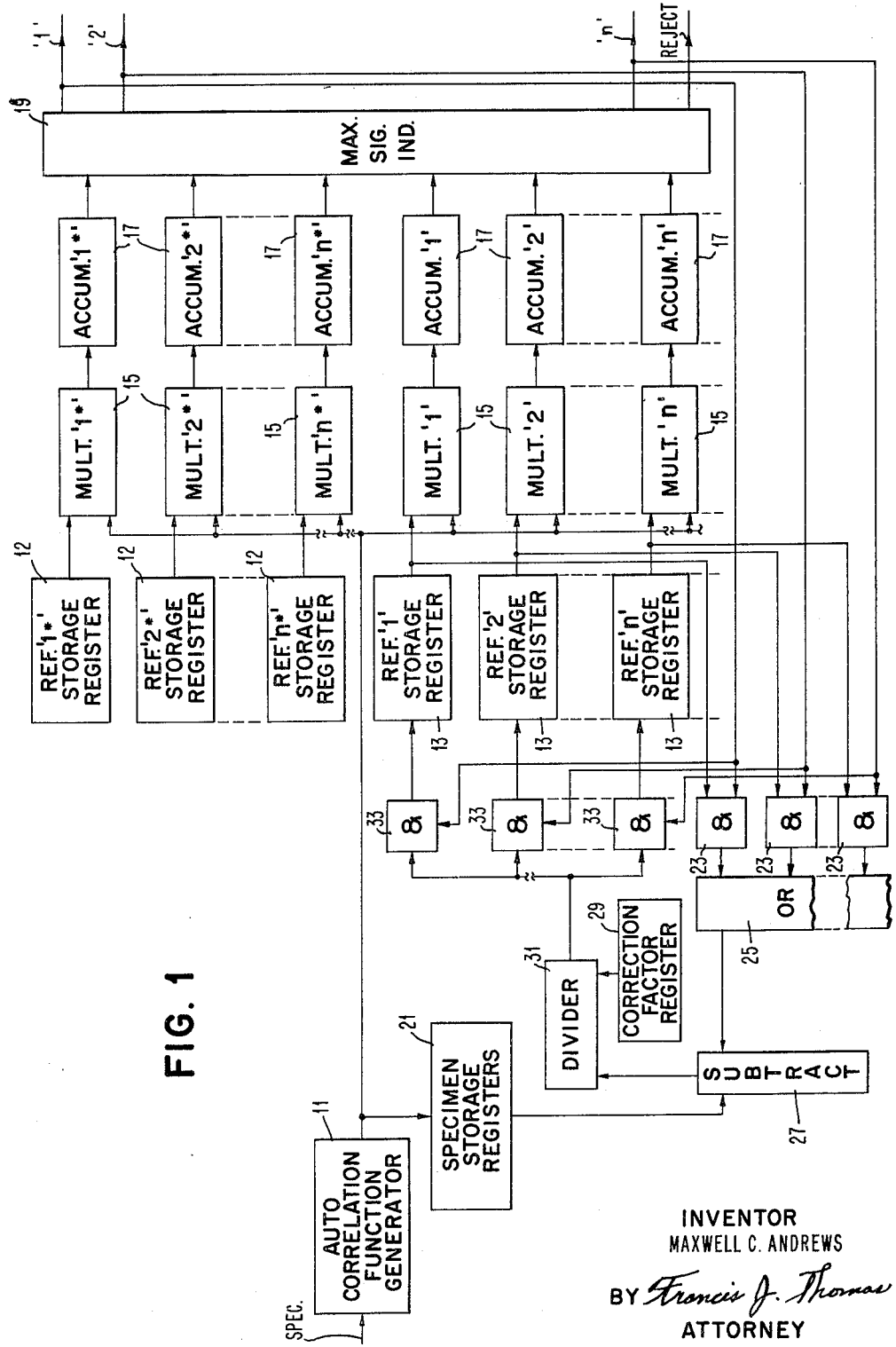

The invention is illustrated in the block diagram in FIGURE 1 where the input specimen to be identified is applied to an autocorrelation function generator 11. The generated function of the specimen is then compared (cross-correlated) with autocorrelation functions of references which are stored in two sets of reference storage registers 12 and 13. The comparisons are accomplished by serially multiplying the specimen autocorrelation function elements and the reference autocorrelation function elements in multipliers 15 and summing these products in accumulators 17. The largest accumulator sum (after normalization, which is not shown in FIGURE 1) is indicative of the identity of the specimen and this indication is generated by a maximum signal indicator 19.

Reference storage registers 12 non-adaptively store the autocorrelation functions of the reference patterns, and registers 13 adaptively store the autocorrelation functions of the references. The non-adaptively stored data is labelled by the reference followed by an asterisk (1*, 2* . . . n* . . .), whereas no asterisks are used for the adaptively stored data. Since the purpose of this system is to identify specimens, the system output representation does not indicate whether the specimen has been identified by a successful comparison with adaptively stored data or with non-adaptively stored data. For example, an output representation on the "2" lead indicates that the specimen has been recognized by its similarity to either the "2*" reference or the "2" reference.

The autocorrelation function of the specimen is also applied to storage registers 21 for comparison with the data in the adaptive reference storage registers 13 that corresponds to the output indication from the maximum signal indicator 19. This output indication conditions one of a group of "and" gates 23 which passes the appropriate register 13 data through an "or" gate 25 to a subtracter 27. The subtracter output is indicative of the difference, if any, between the autocorrelation function of the specimen and the autocorrelation function of the appropriate reference. This difference is divided by a correction factor stored in a register 29 by a divider 31. The modified difference is then applied through the appropriate one of a group of "and" gates 33 to alter the stored reference data in the corresponding registers 13.

In this manner, when the specimen font or quality changes, the identification system automatically alters the reference storage channels to accommodate the changing system input. Only a portion of the deviation between the specimens and the reference patterns (as determined by the data stored in register 29) is permitted to affect the adaptive reference storage to insure that occasional erratic specimens (or incorrectly-identified specimens) will not greatly alter the reference storage. Since a true change in font or print quality can be expected, over a period of time, to provide several specimens corresponding to each reference, these specimens will cumulatively modify reference storage such that the new font or print quality will ultimately be stored. The occasional erratic or incorrectly-identified specimens have a random effect that tends to cancel over a period of time. The use of a non-adaptive reference storage channel in addition to the adaptive channel insures that, when a series of degraded specimens (which radically alter the adaptive storage) are followed by high-quality specimens, the high-quality specimens are also identifiable.

Although the preferred embodiment of the invention is based on a specimen identification system using autocorrelation function comparison, the concept of using both adaptive and nonadaptive storage of reference patterns is obviously extendable to specimen identification systems whose operation is based on other functions and techniques.

The schematic diagrams include several symbols for circuits (such as flip-flops, "and" gates, etc.) and functional blocks (such as registers, multipliers, etc.) which are explained in detail with respect to FIGURES 2 through 18.

FIGURES 2 through 9 show the basic digital symbols used in the schematic diagrams. There are two binary conditions labelled "1" and "0," where "1" indicates the presence of a signal and "0" indicates the lack of a signal. R. K. Richards, Digtal Computer Components and Circuits, 1957, published by Van Nostrand, provides a basic introduction to digital circuits and schematic diagrams of circuits that could be used in this invention.

Figure 2:
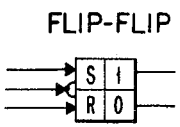

FIGURE 2 shows a basic bistable circuit, which is referred to as a flip-flop. The flip-flop is set by applying a "1" signal to the set (S) input. This provides a "1" signal at its "1" output and a "0" signal at its "0" output. This circuit is reset by applying a "1" signal to the reset input, thus providing a "0" signal at the "1" output and a "1" signal at the "0" output. There is no effect on the circuit if a set input is applied when a circuit is already set, or if a reset input is applied when previously reset. The third input is called a "complement" input and operates to reverse the condition of the circuit when a "1"

signal is applied. If the circuit were set before the application of a complement signal, it would be reset by the signal. Similarly, if the circuit were reset before the application of this signal, it would be set by the signal.

Figure 3:
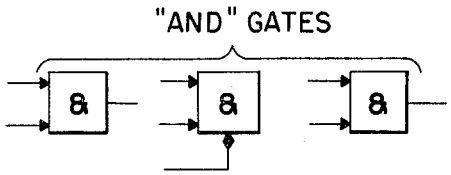
Figure 4:
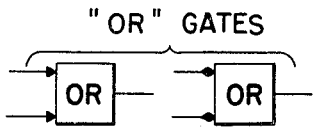

An "and" gate, as shown in FIGURE 3, provides a "1" output if all inputs received "1" signals at the same time. Three types of "and" gates are shown. An "or" gate, as shown in the two symbols in FIGURE 4, provides a "1" output if any "1" input is present. In all other cases, both the "and" gate and the "or" gate provides a "0" output.

Figure 5:
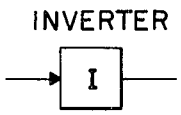

An inverter, as shown in FIGURE 5, reverses the input. If a "1" is applied, a "0" is developed as an output; if a "0" is applied, a "1" is developed.

Figure 6:
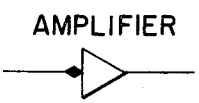

FIGURE 6 shows a symbol for conventional amplifier.

Figure 7:
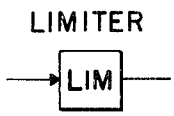

FIGURE 7 shows the symbol for a limiter. This circuit is shown in greater detail and described in conjunction with the schematic diagram in FIGURE 20.

Figure 8:

A delay circuit is shown in FIGURE 8. Signals applied to this circuit are passed after a period of time without being affected in shape or amplitude.

Figure 9:

FIGURE 9 shows the symbol for a single-shot multivibrator. This circuit generates a rectangular gate output when a "1" signal is applied at its input. The output gate has an amplitude and polarity of a "1" signal and a duration dependent upon the circuit constants.

The input leads to the digital circuits are terminated in either an arrow or a diamond. An arrow indicates that either a pulse or the leading edge of a gate signal is required. A diamond indicates that a gate signal is required for example, when used on connection with "and" gate, the diamond indicates the input to be a conditioning gate signal.

Figure 10:
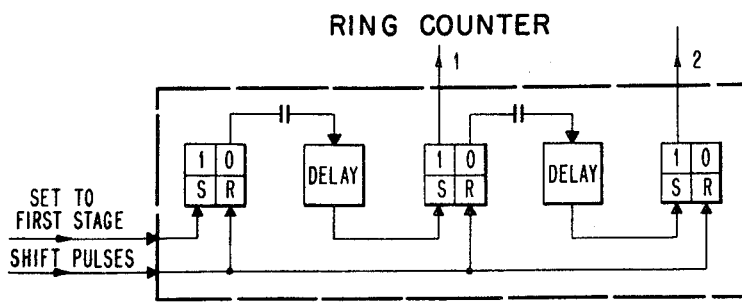

A ring counter is shown in FIGURE 10. Only one flip-flop of this counter is set at any time. At each application of a shift pulse, the flip-flop previously set is reset and, after a delay, the adjacent higher-order, flip-flop is set. An additional input is provided to set the lowest order flip-flop before the application of shift pulses. A more detailed description of the operation of a ring counter is found in a book authored by R. K. Richards entitled Arithmetic Operations in Digital Computers, 1955, published by Van Nostrand, Library of Congress Classification QA 76.R5, on pages 205–208.

Figure 11:
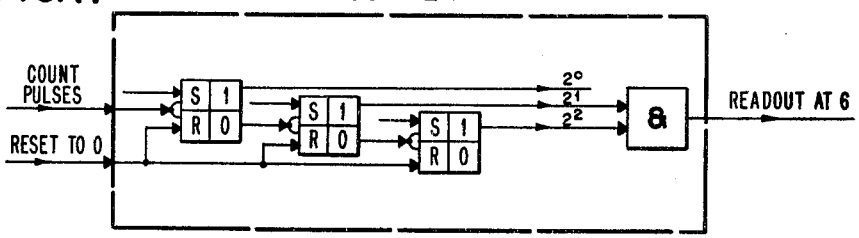

FIGURE 11 shows a series of flip-flop circuits that are connected to form a counter. Count pulses are serially applied to the complement input of the lowest-order flip-flop. The counter may be reset to 0 by the application of "1" signals to all "R" inputs, providing a "0" signal at each flip-flop "1" output. The first count pulse applied to the complement input sets the lowest-order flip-flop, providing a "1" at its output. Since the "0" output of this flip-flop is transferred from a "1" signal to a "0" signal, there is no effect on the adjacent flip-flop. The second applied count pulse resets the lowest-order flip-flop, providing a "0" signal at its "1" output lead and a "1" signal to the complement input of the adjacent flip-flop, transferring its condition. At this time, the $2^0$ and the $2^2$ output leads contain "0" signals and the $2^1$ output lead contains a "1" signal, indicating a total count 010, which is the binary representation of the decimal digit 2. As successive count pulses are applied, the output total increases until a total of 111 is obtained (after the 7th input pulse). The next (8th) count pulse applied causes an output total of 000 and succeeding pulses cause a repetition of the preceding operation. The counter need not be originally set to 000, but may be reset to any other number by applying "1" signals to the appropriate "S" and "R" inputs. When it is desired to provide a counter read-out signal for a particular count, an "and" gate is connected to the appropriate flip-flop outputs, depending upon the read-out count desired. In FIGURE 11, a read-out of 6 is indicated; thus the $2^1$ and $2^2$ inputs are applied to the "and" gate. This causes an output signal to be generated when the counter stores a count of either 6 or 7, as in those two cases the $2^1$ and $2^2$ leads contain "1" signals. When it is desired that the counter read out of 6 only, the $2^0$ signal is inverted and applied to the "and" gate. In this case the "and" gate has "1" signals applied to it at a count of 6 only because the $2^0$ signal is a "0" at this time, which after inversion provides the required "1" signal to operate the "and" gate. This could be accomplished without the use of an inverter if the third input to the "and" gate were taken from the "0" output of the lowest-order flip-flop.

Figure 12:
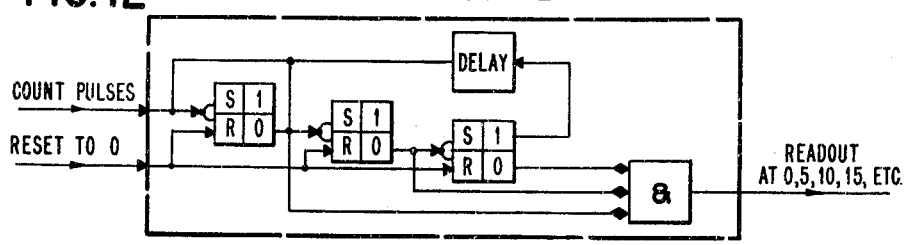

Referring next to FIGURE 12, there is shown a 5-pulse counter which provides an output for every fifth input count pulse. The "and" gate in this counter has signals applied to it from the "0" outputs of each of the flip-flops, thus the "and" gate provides an output signal when all flip-flops are reset. A reset to "0" signal is applied to the the counter to reset all flip-flops. As count pulses are applied, the counter operates in a manner similar to the counter of FIGURE 11, except that, at a count of 4, a signal is delayed and fed back to the complement input of the 2 lower-order flip-flops. Thus, the fourth count pulse which initially resets the two lower-order flip-flops and sets the highest-order flip-flop, causes a signal to be fed back to the two lower-order flip-flops, setting them. The fifth count pulse applied to the circuit of FIGURE 12 causes all flip-flops to be reset which provides an output from the "and" gate. In a similar manner, the tenth, fifteenth, etc. pulses applied to this counter causes outputs from the "and" gate.

Figure 13:
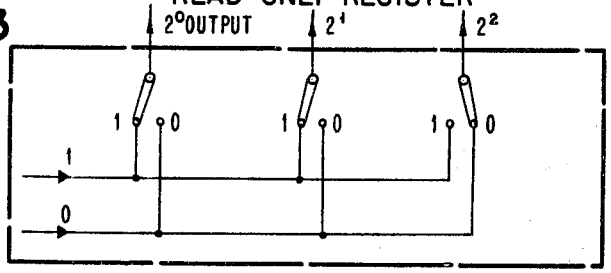

In FIGURE 13 there is shown a read-only register which provides "1" outputs on various leads dependent upon the setting of switches. The register (as shown) stores the binary number 011.

Figure 14:
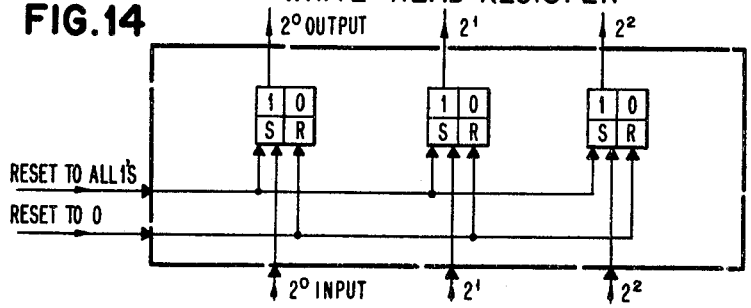
Figure 23:
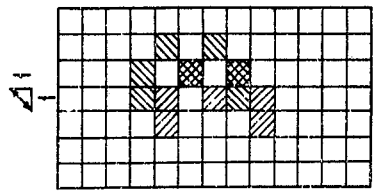
FIGURES 19 through 26 are a set of explanatory diagrams showing a procedure for generating the autocorrelation function of a typical pattern.
Figure 22:
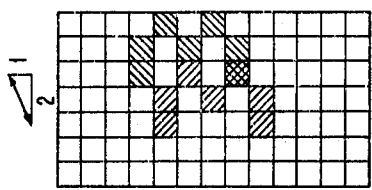

FIGURE 14 shows a write-read register. This register is reset to "0" by the application of a pulse to the flip-flop reset inputs; reset to all "1's" by the application of a pulse to all flip-flop set inputs; or reset to any other number by the application of pulses to the appropriate set and reset inputs of the flip-flops. A number is written into the register by the parallel application of pulses on the appropriate signal input leads. For example, if it were desired to write the number 101 into the register, the register would be previously reset to "0," and then a "1" signal would be applied on the $2^2$ and $2^0$ inputs. A "0" signal would be applied on the $2^1$ input. The register output, taken from the "1" outputs of the flip-flops indicates the binary number stored in the register.

Figures 15, 16:
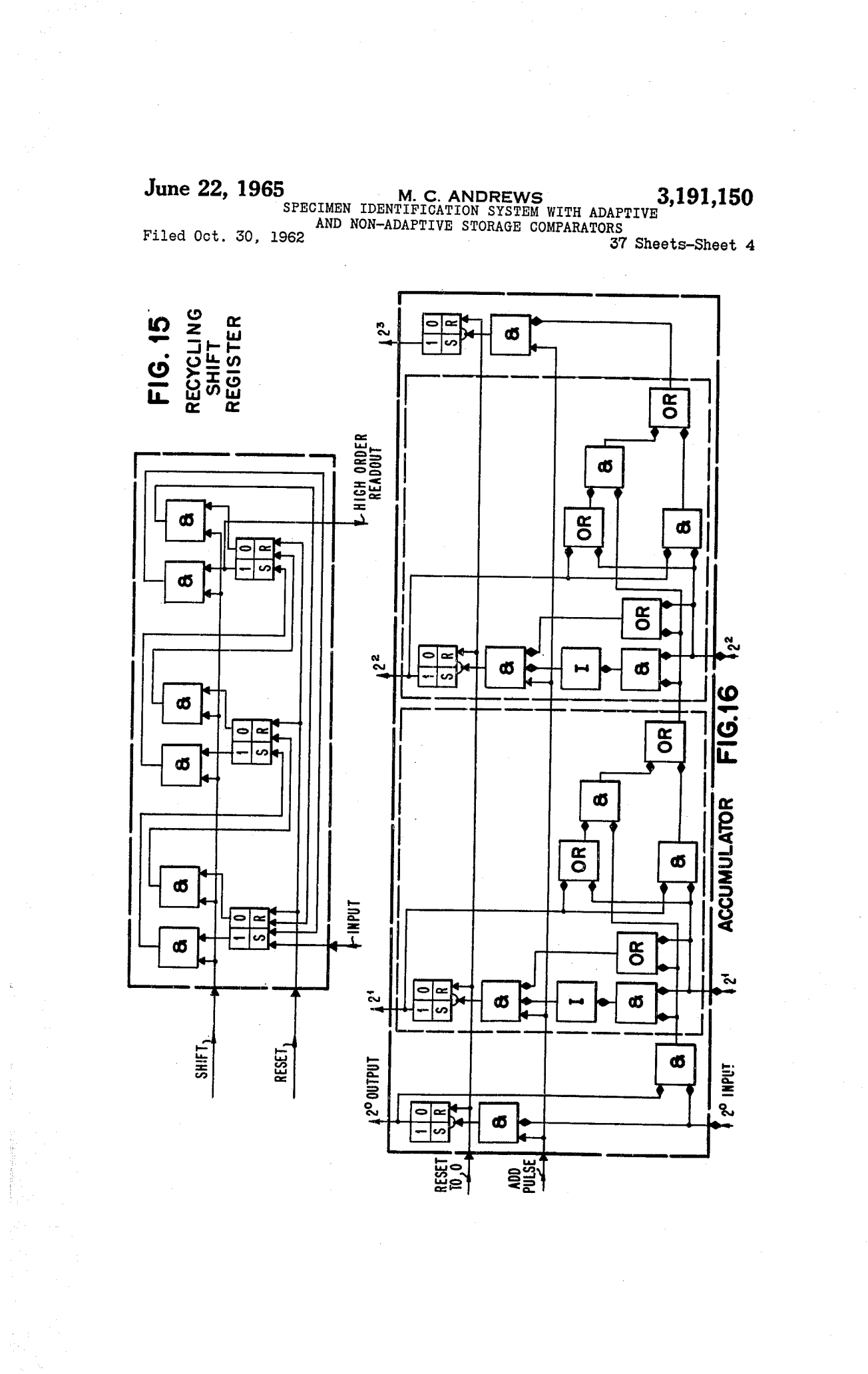

A recycling shift register is shown in FIGURE 15. This register is comprised of a group of shift register "sections" in tandem. The previously-cited R. K. Richard's text entitled Arithmetic Operations in Digital Computers contains an explanation of these and other shift register sections on pages 144–148. A reset input is applied to each flip-flop in the register. The data input to the shift register is applied serially to the set input of the lowest-order flip-flop. Shift pulses are applied to the shift register in between each input data bit. These pulses condition the "and" gates which cause the data stored in each flip-flop to be transferred to the next highest-order flip-flop. Since this is a recycling shift register, the output of the highest output order flip-flop is fed back to the lowest-order flip-flop. In this manner, the data that is placed in the shift register is recycled by the application of subsequent shift pulses. A high-order read-out is provided to indicate the highest-order bit in the register. In this manner, data stored in the register can be read out serially merely by applying a succession of shift pulses.

An accumulator is shown in FIGURE 16. This accumulator is of the type shown on Figure 4–22 (page 110) and described in the previously-cited R. K. Richard's text entitled Arithmetic Operation in Digital Computers. A reset input is applied to each flip-flop in the accumulator. The binary word (parallel) to be accumulated and an "add" pulse are applied simultaneously and the binary word is added to the previously stored sum. This circuit is explained in detail in the reference.

The subtracter shown in FIGURE 17 is similar to the subtracter shown and described in the previously-cited R. K. Richard's test entitled Arithmetic Operation in Digital Computers. The half subtracters shown on FIGURE 17 follow the binary subtraction table 4–III, on page 115 of the reference. The half adder shown on FIGURE 17 is identical to the circuit in the reference in FIGURE 4–3(c) on page 86. FIGURE 17 shows only two stages of the subtracter in detail. The third stage is shown as a block which is presumed to include all the circuits in the second stage. Since the binary subtracter output indication for negative differences is in the complement form, the borrow from the highest-order full subtracter indicates the sign of the difference—a "1" indicates a negative difference, a "0" indicates a positive difference.

FIGURE 18 shows an add–"1" register. This register may be reset to 0 by the application of a pulse to the reset input of each flip-flop. A number to be stored in the register is applied in parallel to the set inputs of the flip-flops in a manner similar to the write-read register in FIGURE 14. The add "1" register increases its total by "1" when a signal is applied on the add "1" input. In this respect, the add–1 register operates in a manner similar to the counter in FIGURE 11, as the "0" output of each flip-flop is applied as the "complement" input of the adjacent flip-flop.

A multiplier that is suitable to be used in the invention is shown in Figure 5–1 (page 139) and explained in the previously-cited R. K. Richard's text entitled Arithmetic Operation in Digital Computers.

A divider and a square rooter that are suitable for use in the invention are shown and described in U.S. patent application, Serial Number 159,175, filed December 13, 1961, by H. Fleisher and R. I. Roth, entitled Computing Techniques and U.S. patent application, Serial Number 159,934, filed December 13, 1961, now Patent No. 3,101,793, by R. I. Roth and H. Fleisher entitled Computing Techniques.

In order to provide a clear illustration of the principles of the preferred embodiment of the invention, the manual generation of autocorrelation functions and some of the theory associated therewith will be described below.

The autocorrelation functions is a measure of the correlation of a function with itself and is generated by comparing the specimen to be autocorrelated with itself, shifted in all directions and distances.

Figure 27:
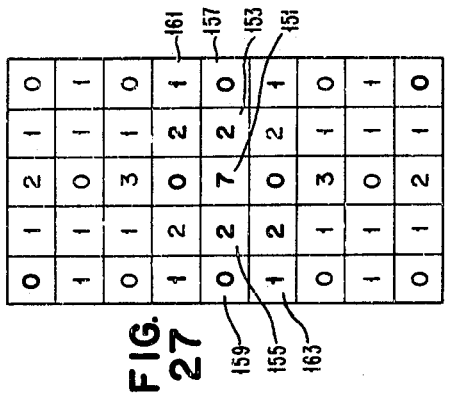
FIGURE 27 is a chart showing the autocorrelation function generated following the procedure in FIGURES 19 through 26.
Figure 26:
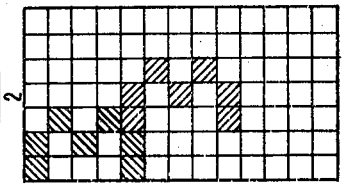
Figure 25:
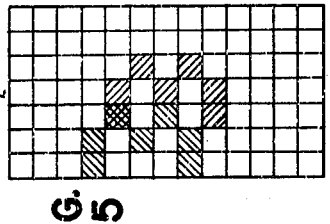
Figure 24:
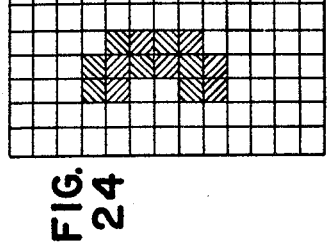

FIGURES 19 through 26 illustrate a method of generating the autocorrelation function in FIGURE 27 for a typical pattern "3." In the following description, the patterns are comprised of 15 discrete areas on a 3 x 5 matrix for simplicity of arithmetic. In practice, this invention is designed to be used to identify specimens comprising many discrete areas on a large matrix.

Figure 19:
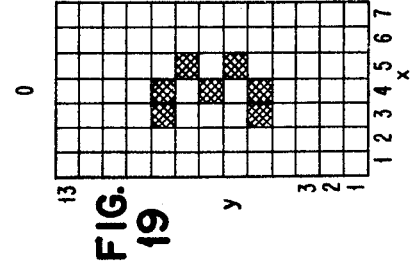

The pattern "3" formed by slant-left lines is common to FIGURES 19 through 26, the pattern formed by slant-right lines is shifted to various positions in the figures. FIGURE 19 illustrates the "0-shift" pattern, and hence, the slant-left and slant-right patterns are superimposed. If the discrete areas of the matrix are considered to have $x$ and $y$ coordinates, as shown in FIGURE 19, $f(x, y)$ is "1" for $(x=3, y=9)$; $(x=4, y=9)$; $(x=5, y=8)$; $(x=4, y=7)$; $(x=5, y=6)$; $(x=4, y=5)$; and $(x=3, y=5)$. For all other values of $x$ and $y$, $f(x, y)=0$. The autocorrelation function $D(x', y')$ is determined by the equation:

$$D(x', y') = \sum_{x, y} f(x, y) f(x+x', y+y')$$

Figure 21:
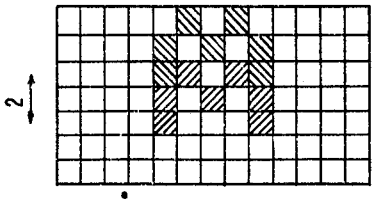
Figure 20:
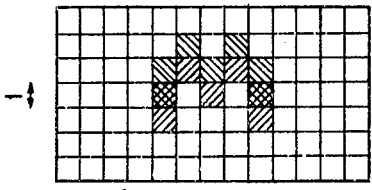

In the "0-shift" condition (FIGURE 19) $x'=y'=0$ and the sum is merely a count of the number of areas that are filled by the pattern, as the product $$f(x, y) \cdot f(x+0, y+0) = 1$$

whenever $f(x, y)=1$. This sum is "7" for the pattern in FIGURE 19, and it is placed in the "0" shift position 151 in the table in FIGURE 27. FIGURE 20 illustrates the conditions present for a shift of one unit to the right (designated as $x'=1$, $y'=0$), which causes a "2" to be placed at the corresponding position 153 of the table in FIGURE 27 as there are two coincident areas on the matrix. Position 153 is displaced one unit to the right of position 151 to correspond to a shift of one unit to the right of the pattern in FIGURE 20. A "2" is also placed in position 155 of the table as a shift to the left of one unit ($x'=1$, $y'=0$) obviously produces the same result as a shift to the right of one unit ($x'=1$, $y'=0$). FIGURE 21 illustrates the conditions present for ($x'=2$, $y'=0$) which provides a "0" at location 157 on FIGURE 27 and also position 159, corresponding to ($x'=2$, $y'=0$). In a similar manner, positions 161 and 163 of the table are filled with "1's" as determined by FIGURE 22. FIGURES 23 through 26 illustrate the conditions present for several other combinations of $x'$ and $y'$. Using this procedure, the entire autocorrelations table of FIGURE 27 may be filled in for the typical pattern "3."

Figure 28:
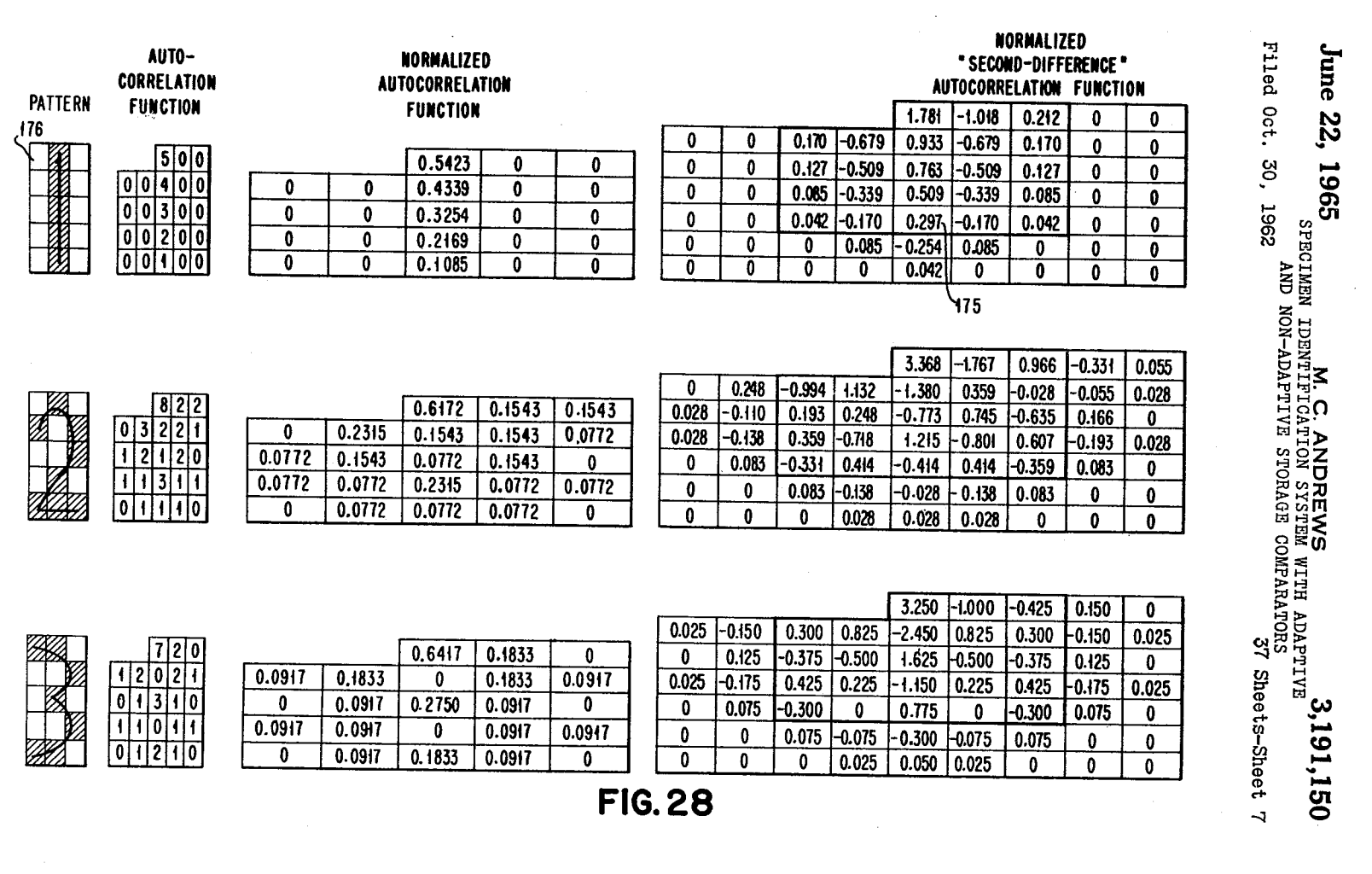
Figure 29:
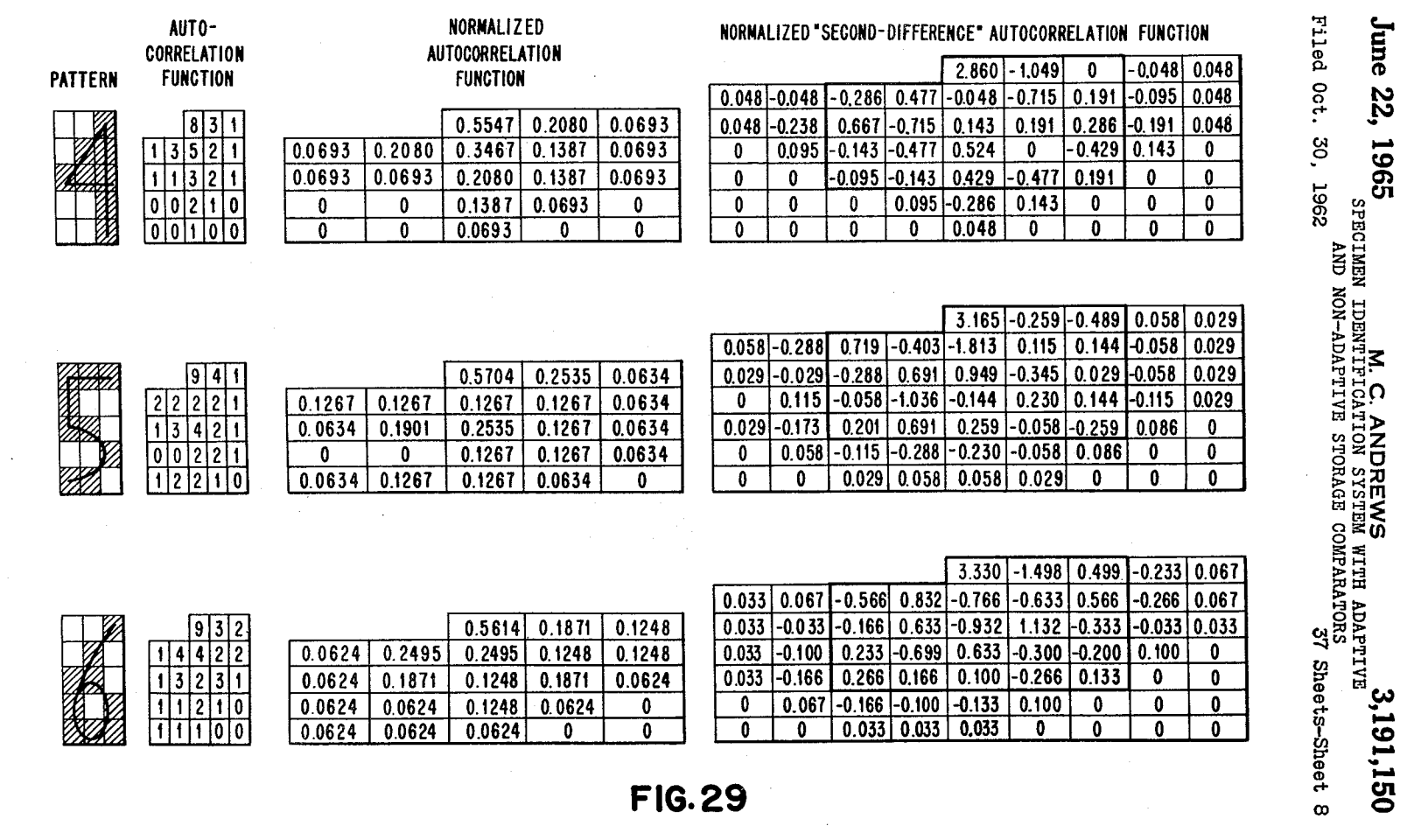
Figure 30:
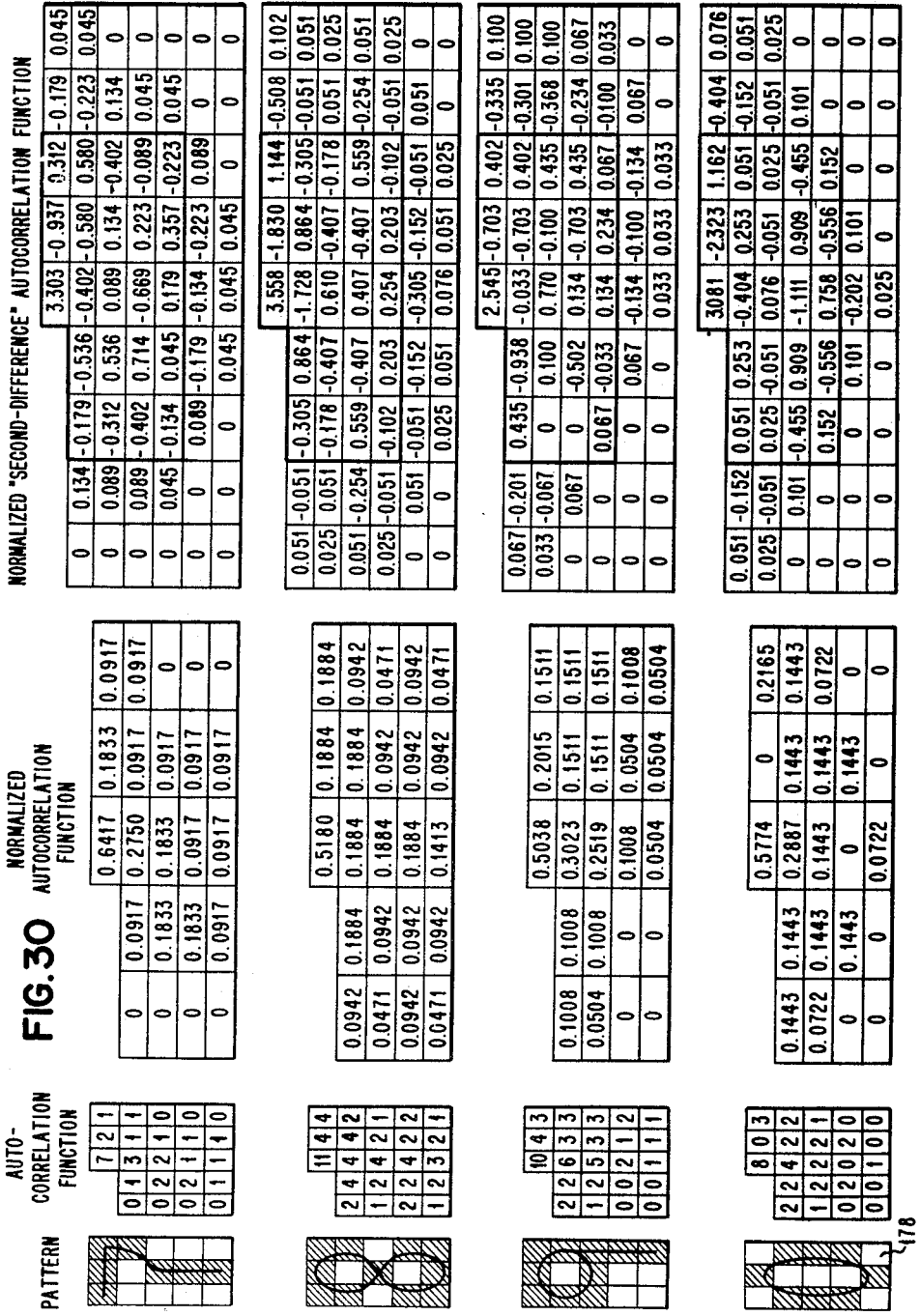

FIGURES 28 through 30 show ten arabic numeral patterns on 3 x 5 matrices and their autocorrelation functions. In addition, normalized autocorrelation functions and normalized "second-difference" autocorrelation functions are shown. All functions are shown in abbreviated form, omitting the redundant "reflected" portions. The generation of the autocorrelation function has been described above and this function forms the basis for comparison in the embodiment to be described in detail subsequently. Since the system is normalized with respect to the reference patterns, the normalized autocorrelation functions are also shown. The normalized autocorrelation function of the reference pattern $R_n$ is generated according to:

$$\frac{D_{R_n}(x', y')}{\left[\sum_{x', y'} D_{R_n}^2(x', y')\right]^{1/2}}$$

A calculation for the pattern "1" provides a divisor of $$(1^2+2^2+3^2+4^2+5^2+4^2+3^2+2^2+1^2)^{1/2} = 85^{1/2} = 9.22$$

which is divided into 1, 2, 3, 4 and 5 to obtain 0.1085, 0.2169, 0.3254, 0.4339 and 0.5423, respectively. The division must be computed using the redundant numbers that are not shown on FIGURE 28 as well as the numbers shown. Although the invention is embodied in a system using basic autocorrelation function comparison, it is considered to be obvious to extend the system to include comparison based on various functions of autocorrelation functions. Such functions include "discriminating" functions which emphasize small specimen differences, such as that encountered between an "O" and a "Q," and "smoothing" functions which ignore these differences and are useful in overcoming the effects of serifs, noise, etc.

One of the "discriminating" functions, the normalized "second-difference" function of the reference "$R_n$" which is obtained according to:

$$\frac{E_{R_n}(x', y')}{\left[\sum_{x'', y''} F_{R_n}^2(x'', y'')\right]^{1/2}}$$

where:

$$E_{R_n}(x'', y'') = \sum_{x', y'} L_{x'', y''}(x', y') \cdot D_{R_n}(x', y')$$

$$F_{R_n}(x'', y'') = \sum_{x', y'} M_{x'', y''}(x', y') \cdot D_{R_n}(x', y')$$

and, in turn, where:

$$L_{0,0}(x', y') = \begin{matrix}
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 1 & 0 & 0 & 0 & 0 & 0 & 0 \\
0 & 0 & 0 & 0 & 0 & 2 & -8 & 2 & 0 & 0 & 0 & 0 & 0 \\
0 & 0 & 0 & 0 & 1 & -8 & 20 & -8 & 1 & 0 & 0 & 0 & 0 \\
0 & 0 & 0 & 0 & 0 & 2 & -8 & 2 & 0 & 0 & 0 & 0 & 0 \\
0 & 0 & 0 & 0 & 0 & 0 & 1 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0
\end{matrix}$$

$$M_{0,0}(x', y') = \begin{matrix}
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & -1 & 0 & 0 & 0 & 0 & 0 & 0 \\
0 & 0 & 0 & 0 & 0 & -1 & 4 & -1 & 0 & 0 & 0 & 0 & 0 \\
0 & 0 & 0 & 0 & 0 & 0 & -1 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0
\end{matrix}$$

The subscripts for L and M indicate the position on the 13 x 17 matrix that the non-zero portion fills. For example, subscripts (0, 0) indicate the non-zero portion of the matrix is centered as shown above whereas subscripts (2, −3) would indicate that all non-zero elements are shifted up two positions and to the left three positions. The L matrix is the autocorrelation function of the M matrix.

A sample calculation to obtain the 0.297 at position 175 of the normalized "second-difference" autocorrelation function for the pattern "1" follows.

The autocorrelation function is centered on a 13 x 17 matrix as follows:

$$D_{R1}(x', y') = \begin{matrix}
0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 \\
0 & 0 & 0 & 0 & 0 & 1 & 0 & 0 & 0 & 0 & 0 & 0 \\
0 & 0 & 0 & 0 & 0 & 2 & 0 & 0 & 0 & 0 & 0 & 0 \\
0 & 0 & 0 & 0 & 0 & 3 & 0 & 0 & 0 & 0 & 0 & 0 \\
0 & 0 & 0 & 0 & 0 & 4 & 0 & 0 & 0 & 0 & 0 & 0 \\
0 & 0 & 0 & 0 & 0 & 5 & 0 & 0 & 0 & 0 & 0 & 0 \\
0 & 0 & 0 & 0 & 0 & 4 & 0 & 0 & 0 & 0 & 0 & 0 \\
0 & 0 & 0 & 0 & 0 & 3 & 0 & 0 & 0 & 0 & 0 & 0 \\
0 & 0 & 0 & 0 & 0 & 2 & 0 & 0 & 0 & 0 & 0 & 0 \\
0 & 0 & 0 & 0 & 0 & 1 & 0 & 0 & 0 & 0 & 0 & 0 \\
0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0
\end{matrix}$$

The denominator $$\left[ \sum_{x'', y''} F_{R1}^2(x'', y'') \right]^{1/2}$$

is determined as follows:

$F_{R1}(0, 0)$ equals $(4)(5) + (-1)(4) + (-1)(4) = 12$

All products other than $$D_{R1}(0, 0) \cdot L_{0,0}(0, 0), \quad D_{R1}(0, 1) \cdot L_{0,0}(0, 1)$$

and $$D_{R1}(0, -1) \cdot L_{0,0}(0, -1)$$

equal 0. Similarly, $F_{R1}(0, 1) = F_{R1}(0, -1) = (4)(4)$
$\qquad + (-1)(3) + (-1)(5) = 8$ $F_{R1}(0, 2) = F_{R1}(0, -2) = (4)(3)$
$\qquad + (-1)(2) + (-1)(4) = 6$ $F_{R1}(0, 3) = F_{R1}(0, -3) = 4(2)$
$\qquad + (-1)(1) + (-1)(3) = 4$ $F_{R1}(0, 4) = F_{R1}(0, -4) = 4(1) - 1(2) = 2$ $F_{R1}(0, 5) = F_{R1}(0, 5) = -1(1) = -1$ $F_{R1}(1, 0) = F_{R1}(-1, 0) = (-1)(5) = -5$ $F_{R1}(1, 2) = F_{R1}(1, -2) = F_{R1}(-1, 2)$
$\qquad = F_{R1}(-1, -2) = (-1)(3) = -3$ $F_{R1}(1, 3) = F_{R1}(1, -3) = F_{R1}(-1, 3)$
$\qquad = F_{R1}(-1, -3) = (-1)(2) = -2$ $F_{R1}(1, 4) = F_{R1}(1, -4) = F_{R1}(-1, 4)$
$\qquad = F_{R1}(-1, -4) = (-1)(1) = -1$ The denominator is finally determined as:

$12^2 + (2(8))^2 + 2(6)^2 + 2(3)^2 + 2(2)^2$
$\qquad + 2(-1)^2 + 2(-5)^2 + 4(-4)^2 + 4(-3)^2$
$\qquad + 4(-2)^2 + 4(-1)^{2\frac{1}{2}} = 556^{\frac{1}{2}} = 23.58$ Each numerator, $E_{R1}(x'', y'')$ is obtained by multiplying $L_{x'', y''}(x', y')$ by $D_{R1}(x', y')$, point-by-point, and summing over $x', y'$. In order to obtain the number at position 175, which corresponds to $(x'=0 \cdot y'=4)$, the matrix $L_{0, 4}(x', y')$ is multiplied point-by-point by $D_{R1}(x', y')$ and summed. This results in $$(20 \times 1) + (-8 \times 2) + (1 \times 3) = 7$$

The remaining products are zero.

The resulting number for position 175 of the normalized "second-difference" autocorrelation function is thus:

$$\frac{7}{23.58} = 0.297$$

Since the L matrix is a basic 5 x 5 matrix surrounded by zeros and the autocorrelation function matrix is a basic 5 x 9 matrix surrounded by zeros, the normalized "second-difference" autocorrelation function matrix is a basic 9 x 13 matrix surrounded by zeros. The redundant "reflected" portions of the matrix are not shown in FIGURES 28–30. When the normalized "second-difference" autocorrelation functions of the reference patterns $R_n$ are used in the specimen identification apparatus, comparison sums $S_{S, R_n}$ are developed by the formula:

$$S_{S, R_n} = \frac{\sum_{x', y'} D_S(x', y') \cdot E_{R_n}(x', y')}{\left[ \sum_{x'', y''} F_{R_n}^2(x'', y'') \right]^{1/2}}$$

Since $D_S(x', y')$ is zero for $x' > \pm 2$ or $y' > \pm 4$, all products (numerators) are zero in these cases. For this reason, only the portions of the normalized "second-difference" autocorrelation functions within the heavy lines (FIGURES 28–30) are necessary.

The use of "second-difference" functions improves discrimination due to the negative components in the M matrix. Another class of functions, the "smoothing" functions, does not improve discrimination, but improves stability of recognition of poor specimens, such as those with addition or deletions noise, those with or without serifs, etc. These functions are determined by the preceding formulas for discriminating functions, replacing the M matrix with a matrix (S) having no negative elements and replacing the L matrix with a matrix (R) derived as the autocorrelation function of the S matrix. One of the "smoothing" functions, the "averaging" function, uses the following S matrix:

$$S_{0,0}(x', y') = \begin{matrix}
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 1 & 0 & 0 & 0 & 0 & 0 & 0 \\
0 & 0 & 0 & 0 & 0 & 1 & 1 & 1 & 0 & 0 & 0 & 0 & 0 \\
0 & 0 & 0 & 0 & 0 & 0 & 1 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0
\end{matrix}$$

The autocorrelation function of the S matrix provides the following R matrix:

$$R_{0,0}(x', y') = \begin{matrix} 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 1 & 0 & 0 & 0 & 0 & 0 & 0 \\ 0 & 0 & 0 & 0 & 0 & 2 & 2 & 2 & 0 & 0 & 0 & 0 \\ 0 & 0 & 0 & 0 & 1 & 2 & 5 & 2 & 1 & 0 & 0 & 0 \\ 0 & 0 & 0 & 0 & 0 & 2 & 2 & 2 & 0 & 0 & 0 & 0 \\ 0 & 0 & 0 & 0 & 0 & 0 & 1 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \\ 0 & 0 & 0 & 0 & 0 & 0 & 0 & 0 & 0 & 0 & 0 & 0 \end{matrix}$$

Identification of specimens using "averaging" functions of the autocorrelation function is accomplished according to:

$$\frac{B_{Rn}(x', y')}{\left[\sum_{x'', y''} C^2_{Rn}(x'', y'')\right]^{1/2}}$$

where $$B_{Rn}(x'', y'') = \sum_{x', y'} R_{x'', y''}(x', y') \cdot D_{Rn}(x', y')$$

and $$C_{Rn}(x'', y'') = \sum_{x', y'} S_{x'', y''}(x', y') \cdot D_{Rn}(x', y')$$

The comparison sums $S_{S, Rn}$ are then developed by the formula:

$$S_{S, Rn} = \frac{\sum_{x', y'} D_S(x', y') \cdot B_{Rn}(x', y')}{\left[\sum_{x'', y''} C^2_{Rn}(x'', y'')\right]^{1/2}}$$

Autocorrelation function comparison provides accurate and stable identification of specimens. The sums $S_{S, Rn}$ obtained using the data of FIGURES 28–30 and discussed above are shown in FIGURE 31 where the normalized autocorrelation function of the reference patterns are used, and in FIGURE 32 where the normalized "second-difference" autocorrelation function of the reference patterns are used. The largest sums are developed in each case when the input pattern matches the reference pattern, but when "second-difference" autocorrelation comparison is used, a larger ratio is obtained between the closest and second-closest matches.

Figure 33A:
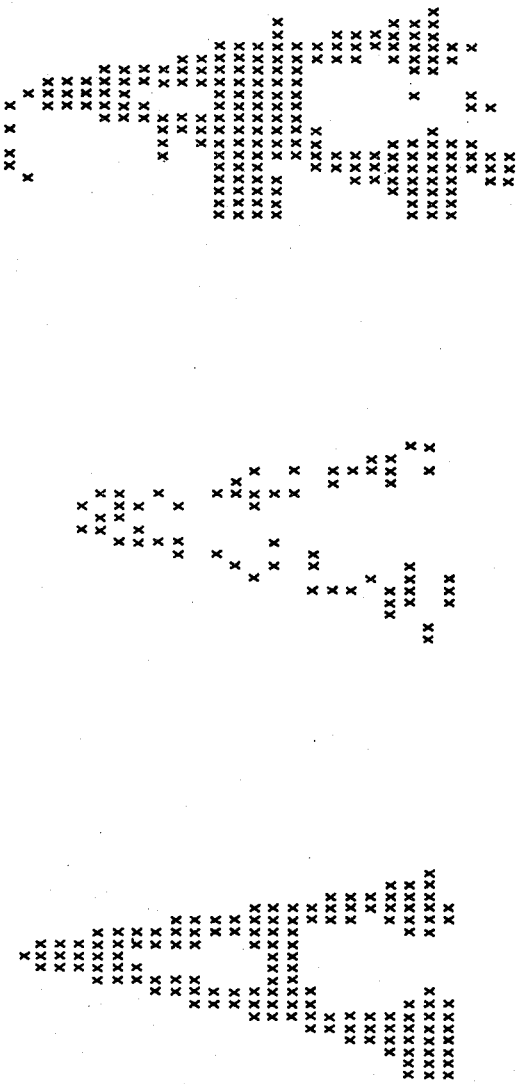
FIGURE 33 is a group of diagrams showing the stability of autocorrelation function specimen identification for typical specimens containing addition and deletion noise.

FIGURE 33 shows the results obtained when using autocorrelation function comparison of ideal input specimens and input specimens containing deletion and addition noise with reference patterns. In this case, the patterns are divided into a larger number of discrete areas than the patterns used in the preceding description. In practice, the invention is used with patterns having a number of discrete areas of the order shown in FIGURE 33. The data below the patterns is the measure of similarity of the specimen to three reference patterns (A, B and R) and was obtained by further normalizing the sums $S_{S, Rn}$ obtained using normalized autocorrelation function comparison. Patterns A, B and R, which are similar in structure, were chosen to show the stability of autocorrelation function comparison under adverse conditions.

Further system stability is provided by the use of adaptively stored patterns. In practice, high resolution patterns are used, but its enhanced stability is obvious even with three-by-five characters of the type shown in FIGURES 28–30. Examples of a change in type font and a change in specimen quality (such as might appear on a carbon copy made with a worn ribbon) will be described. An example of a change in type font is the case where the specimen "1" (FIGURE 28) is changed to a "1" with a "tail" at the upper left. In this case, the matrix area 176 contains a portion of the specimen, and this specimen has been found to be correctly identified by the system. An example of an imperfect specimen is the case where the specimen "0" (FIGURE 30) has an additional matrix area 178 filled. Again, the specimen is found to be correctly identified. Similar specimens of the changed font or having the same imperfections occurring after altering specimen storage will be identified with a higher discrimination. Furthermore, if subsequent specimens contain further imperfections, they may be identifiable in the present system, whereas if the reference storage were not altered, the second level of imperfection might be sufficient to prevent identification.

Further system stability is achieved in the present invention by the use of the non-adaptively stored references in addition to the adaptively stored references. In this manner, high-quality specimens are identifiable even if they follow a series of degraded specimens that has caused the adaptive storage to be so radically altered that the subsequent high-quality specimens are not identifiable by comparison to the adaptively stored references. In this case, the specimens are identified by their similarity to the non-adaptively stored reference patterns, and the adaptive storage is altered in the direction of the high-quality specimens.

Figure 34B:
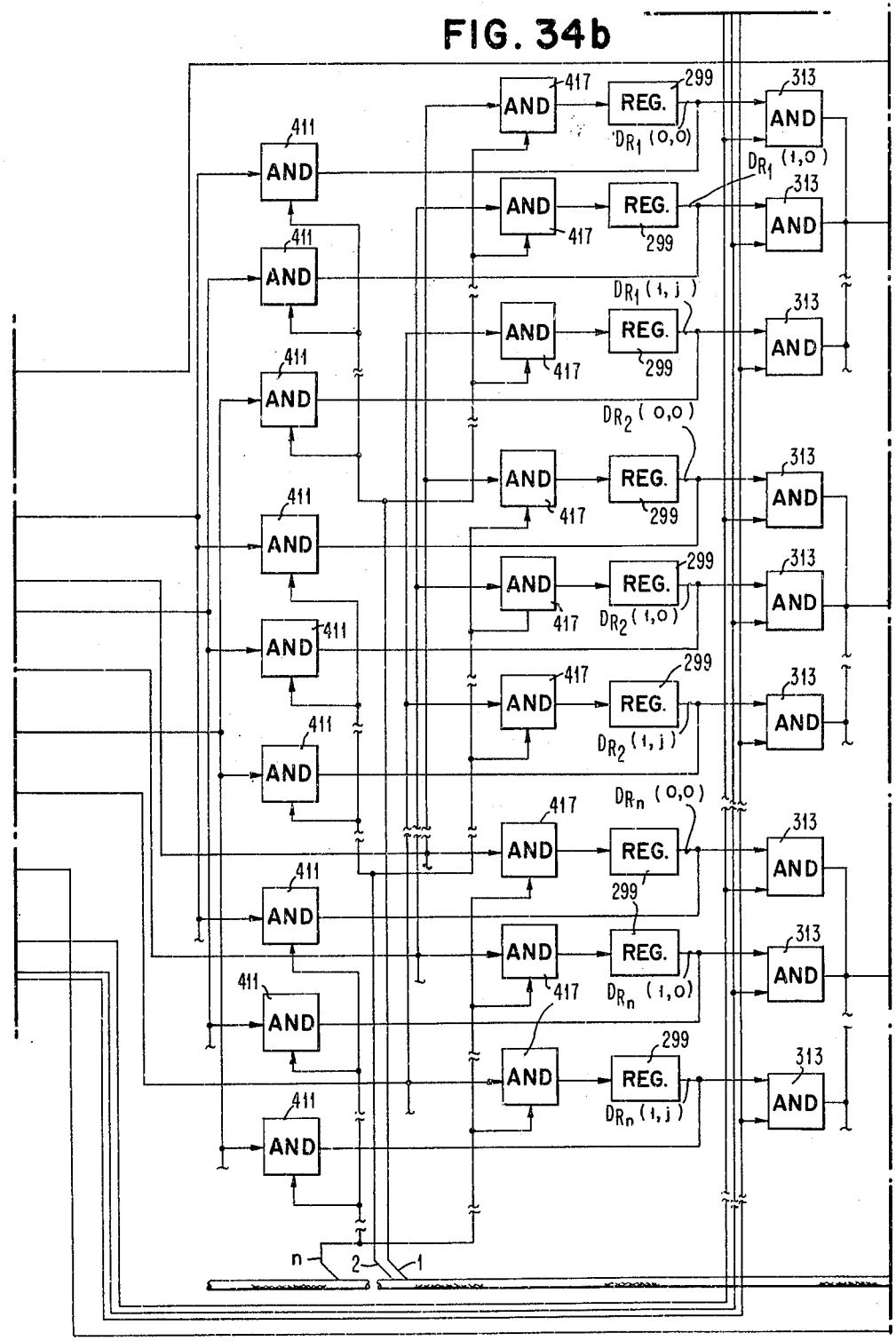
FIGURE 34 is a functional diagram of the embodiment of the invention shown in the block diagram of FIGURE 1.
Figure 34D:
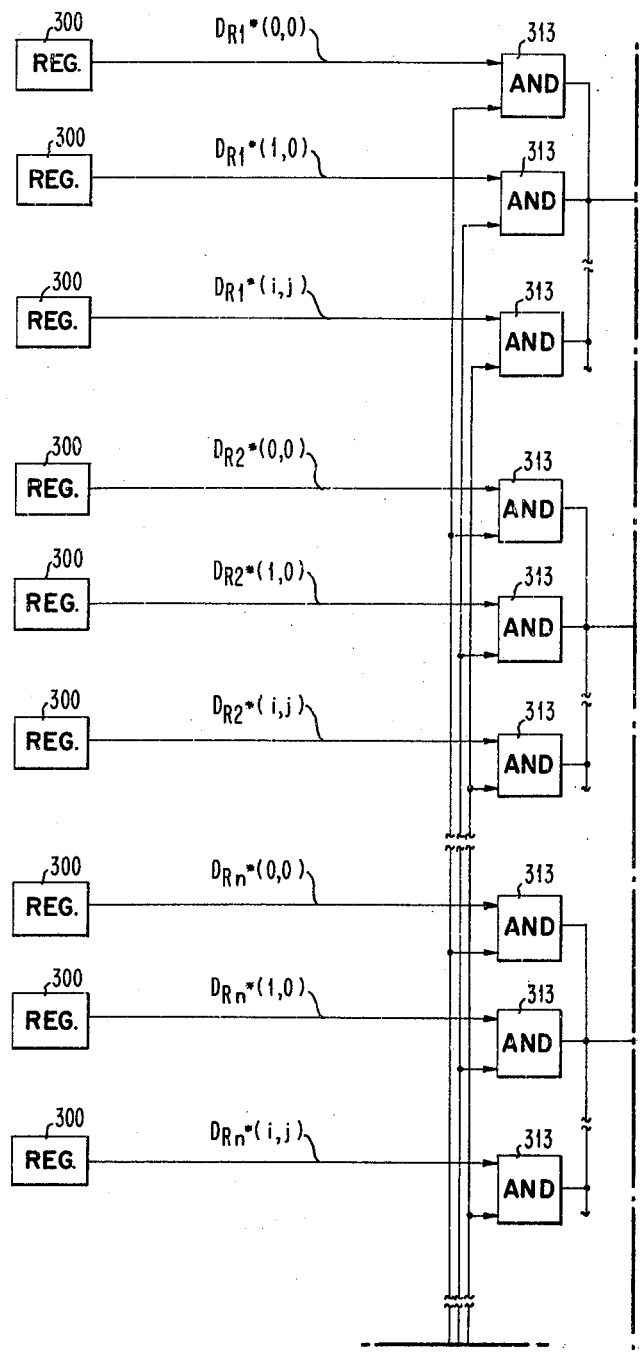
Figure 34E:
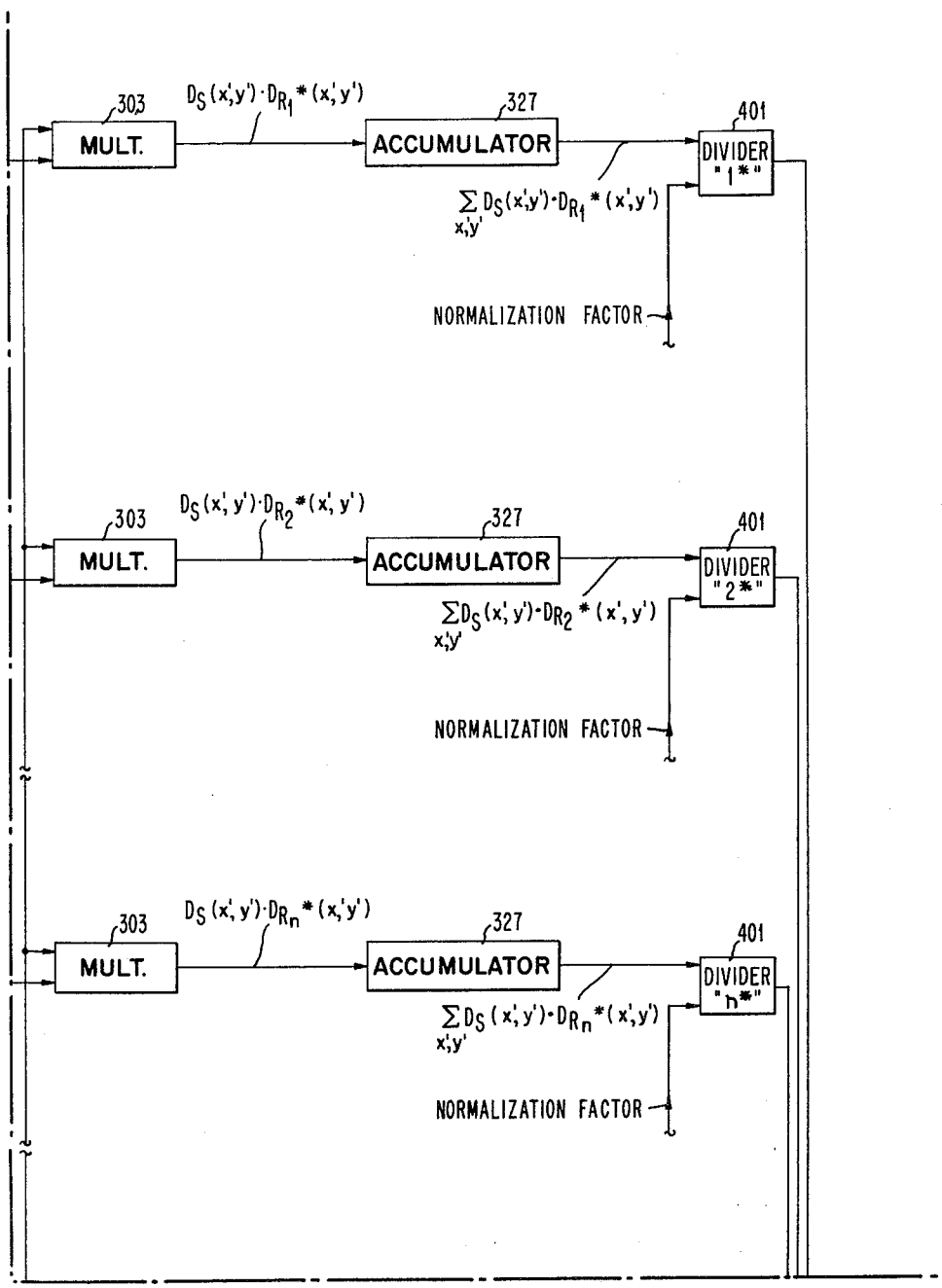

A functional diagram of a preferred embodiment of the invention using digital circuits is shown in FIGURE 34. This diagram parallels the block diagram shown in FIGURE 1 but involves greater detail. A specimen 201 on a matrix 203 is scanned by a flying-spot scanner 205. A phototube 207 develops a signal $f(x, y)$ indicative of the specimen. Any means of converting the specimen to electrical information could be used. In this case, the scanner and phototube illustrate one means of obtaining an electronic indication of the specimen.

The phototube 207 output is stored in two recycling shift registers 243 and 245. A clock 245 controls the timing of the circuits. At time "1a" a pulse is applied to the cycle control circuit 248 which supplies a series of cycling pulses to the shift registers 243 and 245 to sequentially shift the data in each register completely through the register and return the data to its original position. An "and" gate 255 and counter 257 develop the "zero-shift" autocorrelation function $D_S(0, 0)$, which is applied to a group of multipliers 303 (FIGS. 34c and e). At time "1b," a pulse is applied to the appropriate "and" gates 313 (FIGS. 34b and d) to cause the autocorrelation function of the non-adaptive and adaptive references, $D_{R1*}(0, 0), D_{R2*}(0, 0) \ldots D_{Rn*}(0, 0) \ldots D_{R1}(0, 0), D_{R2}(0, 0) \ldots D_{Rn}(0, 0) \ldots$ to be applied to the appropriate multipliers 303 from registers 299 and 300. These registers initially contain two identical sets of data corresponding to the autocorrelation functions of the references as shown in FIGS. 28–30. During operation, the data in registers 299 is altered (adapted) as described above. The products $D_S(0, 0) \cdot D_{R1*}(0, 0); D_S(0, 0) \cdot D_{R2*}(0, 0) \ldots$
$D_S(0, 0) \cdot D_{Rn*}(0, 0) \ldots D_S(0, 0) \cdot D_{R1}(0, 0);$
$D_S(0, 0) \cdot D_{R2}(0, 0) \ldots D_S(0, 0) \cdot D_{Rn}(0, 0) \ldots$ are developed by the multipliers and applied to a group of accumulators 327. At time "1c," a pulse is applied to a shift control circuit 328, which causes the data in register 245 to be shifted one position. The shift registers are again recycled at time "2a" and the counter develops an output $D_S(1, 0)$ which at time "2b" is multiplied by $D_{R1*}(1, 0); D_{R2*}(1, 0) \ldots D_{Rn*}(1, 0) \ldots D_{R1}(1, 0);$
$D_{R2}(1, 0) \ldots D_{Rn}(1, 0) \ldots$ to develop products
$D_S(1, 0) \cdot D_{R1*}(1, 0); D_S(1, 0) \cdot D_{R2*}(1, 0) \ldots$
$D_S(1, 0) \cdot D_{Rn*}(1, 0) \ldots D_S(1, 0) \cdot D_{R1}(1, 0);$
$D_S(1, 0) \cdot D_{R2}(1, 0) \ldots D_{S1}(1, 0) \cdot D_{Rn}(1, 0). \ldots$ These products are applied to accumulators 327 where they are added to the previously stored products. In a similar manner, the remaining products are developed and applied to the accumulators. After all products have been generated, the accumulator outputs represent a cross-correlation function $$\sum_{x', y'} D_S(x', y') \cdot D_R(x', y')$$

for each reference R* and R. These signals are applied to a group of dividers 401 where they are divided by a normalization factor which has been defined as:

$$\left[ \sum_{x', y'} D_{R_n}^2(x', y') \right]^{1/2}$$

for the particular reference $R_n$. A maximum signal indicator 330 selects the largest divider output as an indication of the identity of the specimen or provides a "reject" indication when the ratio of the largest to the second largest divider output is insufficient and when the largest and second largest signals do not correspond to the two stored versions of the same reference (e.g. 3* and 3). The system provides the same output signal regardless of whether identification is based on comparison with non-adaptively stored data or adaptively stored data.

Each of the sequentially-generated elements of the autocorrelation function of the specimen is also applied to a register 405 through an "and" gate 407, under the control of the timer 246. These elements are individually compared to the corresponding elements of the autocorrelation function of the appropriate adaptive reference by a group of subtracters 409. The appropriate adaptive reference function is selected by "and" gate 411 under the control of the output signals from the maximum signal indicator 330. The deviation, if any, between the specimen and the selected reference is reflected in the output signals from the subtracters. These signals are applied to dividers 413 where they are divided by a correction factor supplied by a signal mixer 415. The result of these divisions is applied to the appropriate corresponding adaptive reference storage registers 299 through "and" gates 417 under the control of the output signals from the maximum signal indicator 330. The correction factor supplied by mixer 415 is a function of the document quality and a discrimination factor signal from the maximum signal indicator which is a function of the probability of correct identification.

Dividers 401 have been shown to operate on the output of each accumulator 327 to provide normalized results. The non-adaptive storage registers 300 may contain normalized reference functions and the corresponding dividers (FIG. 34e) may be eliminated. The dividers corresponding to the adaptive storage (registers 299) cannot be eliminated unless the adaptive circuits are amended to include a normalization factor calculation. For simplicity, in FIG. 34, dividers are shown for both the adaptive and non-adaptive channels, but in the preferred embodiment to be described in detail below, the non-adaptive storage includes normalization factors and the dividers are eliminated while the adaptive storage does include the normalization factors and the dividers are retained.

Figure 35B:
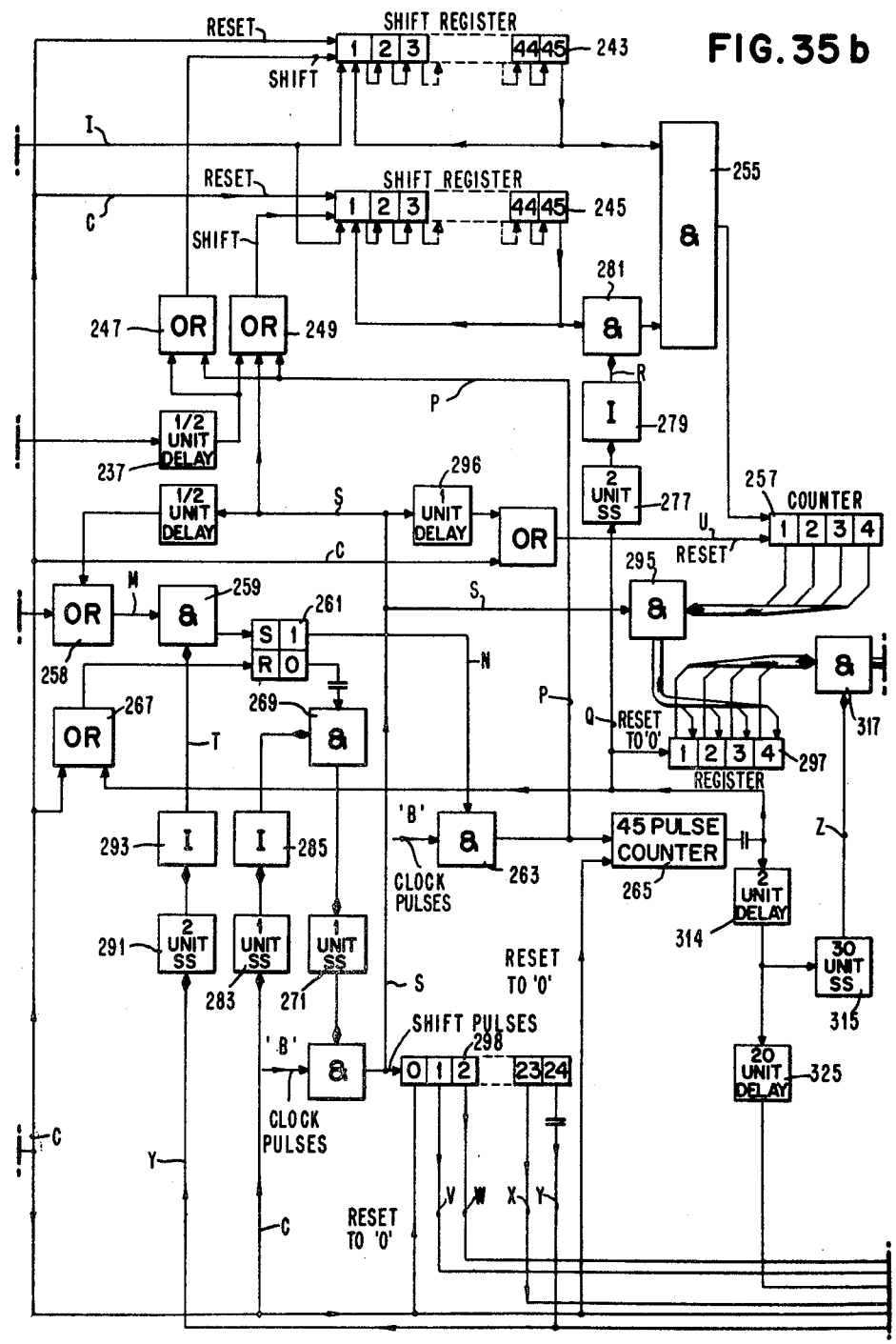
FIGURE 35 is a schematic diagram of the embodiment of the invention shown in FIGURES 1 and 34.
Figure 35F:
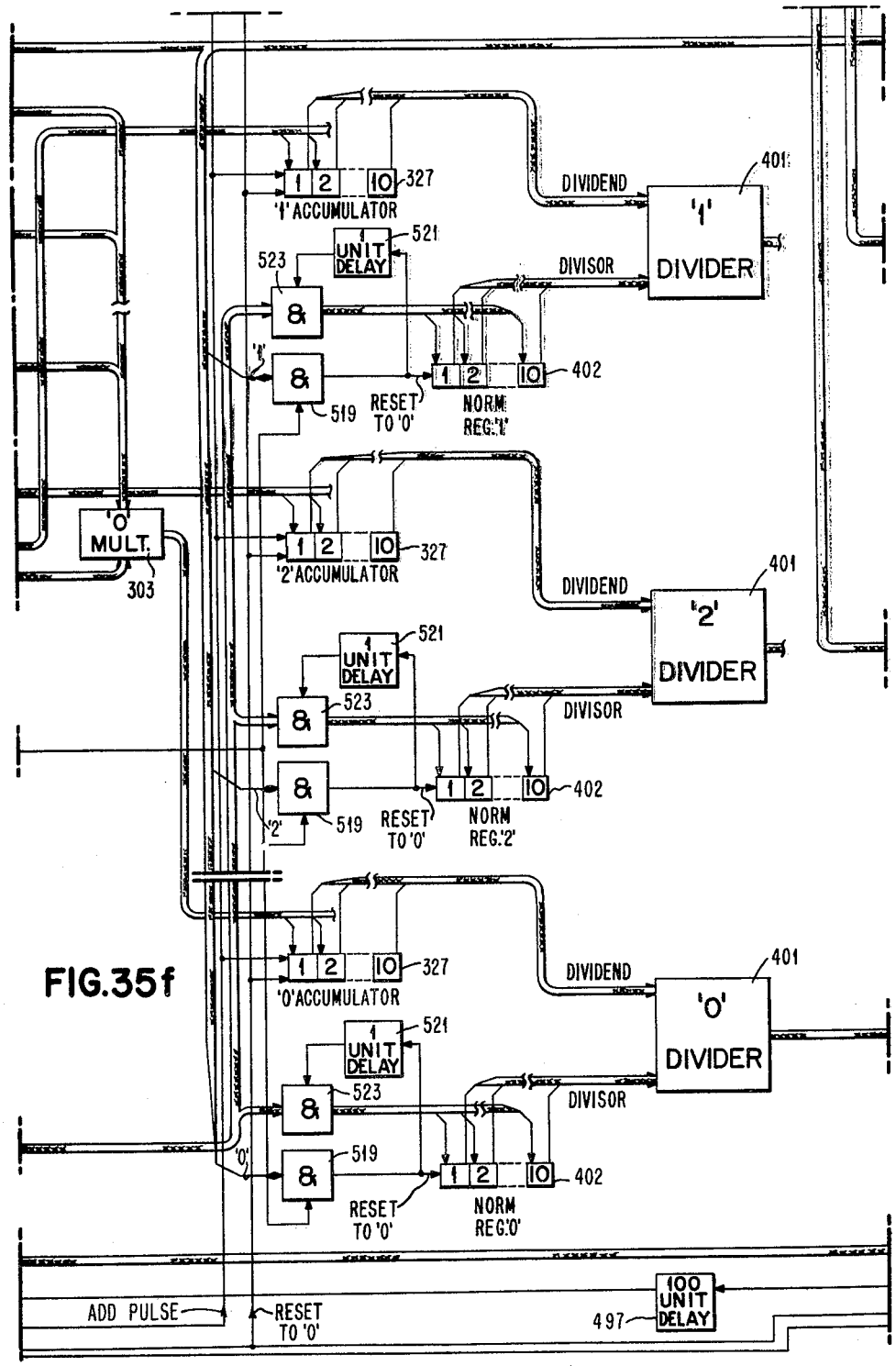
Figure 35H:
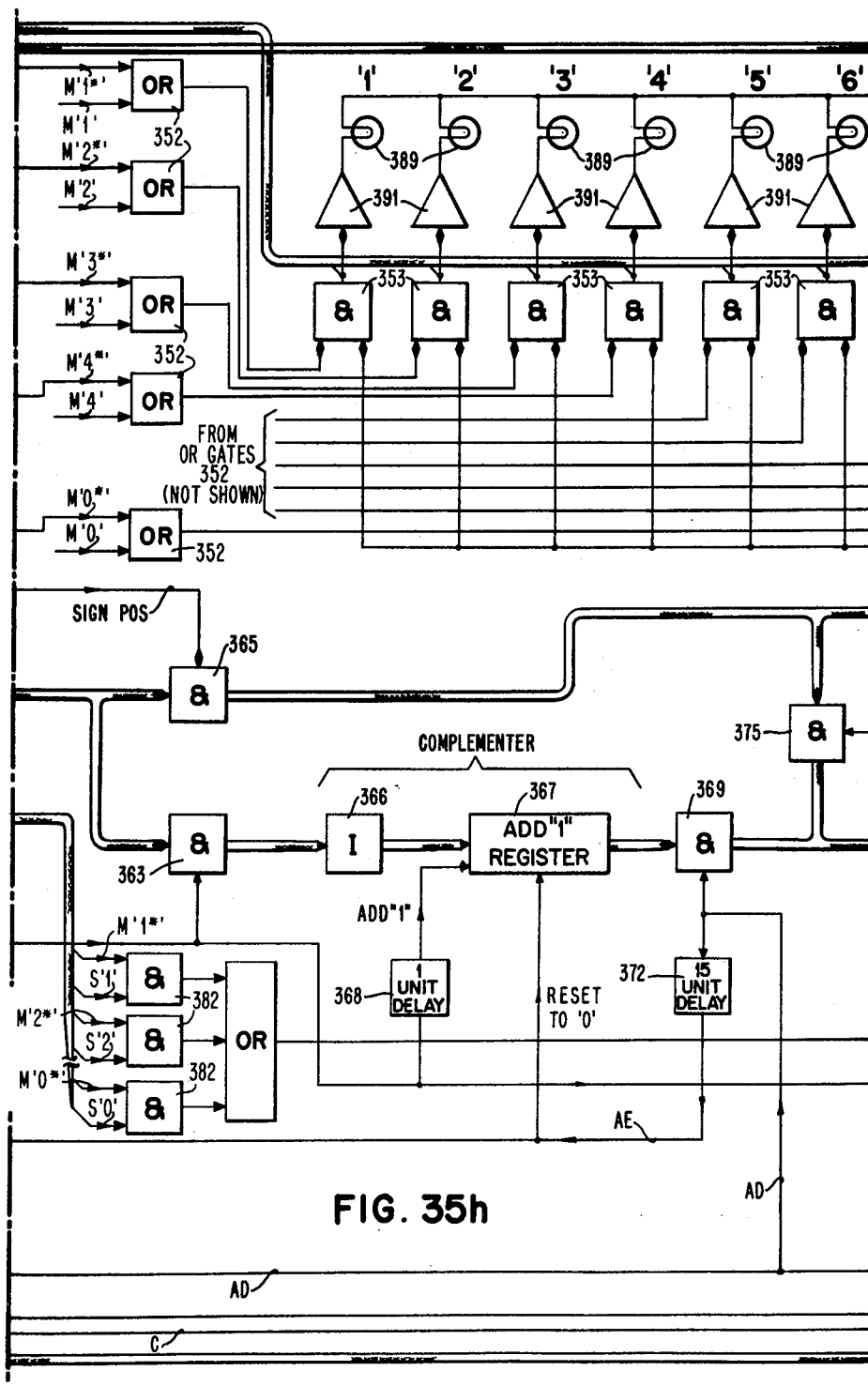
Figure 35J:
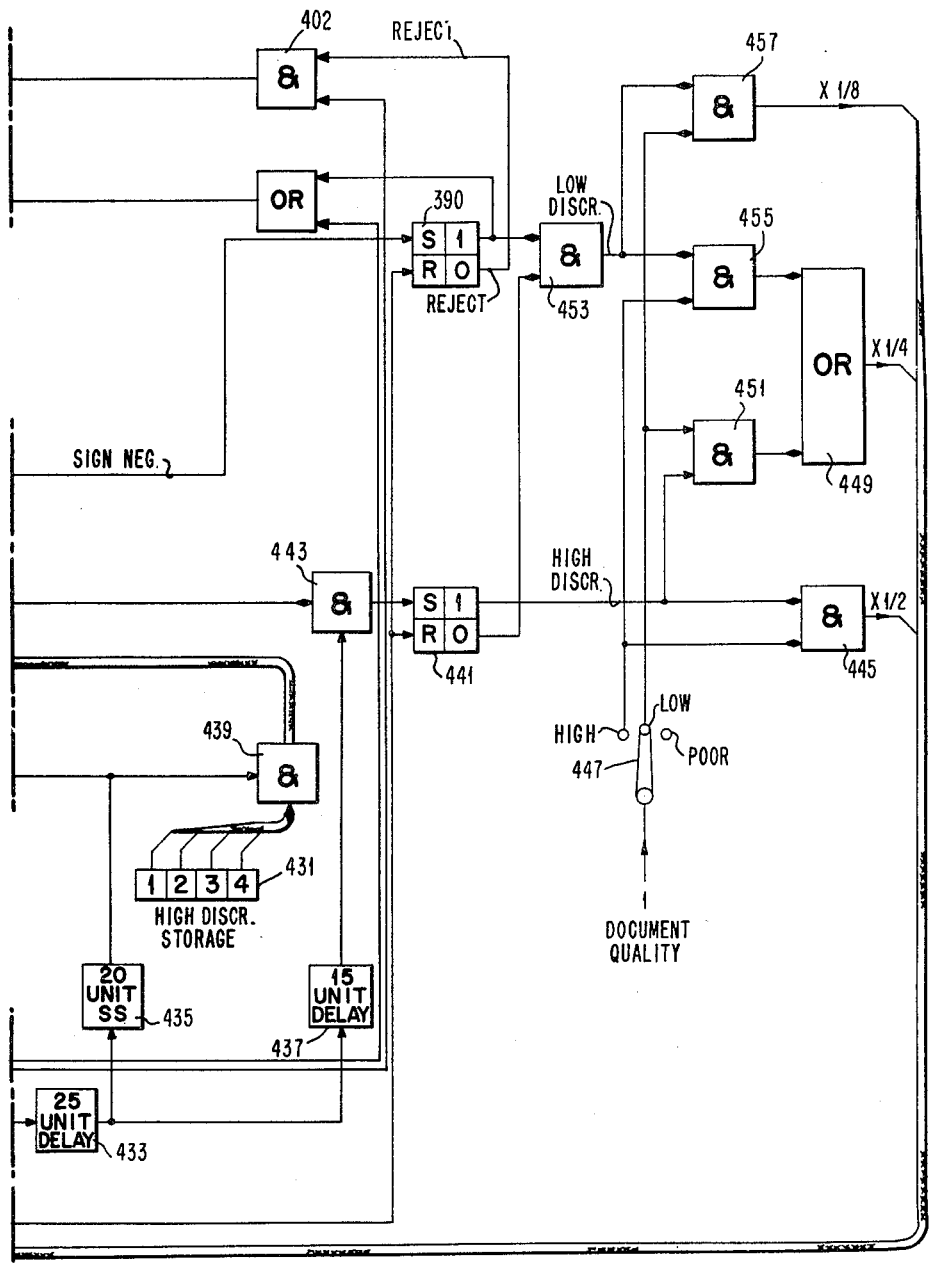
Figure 35K:
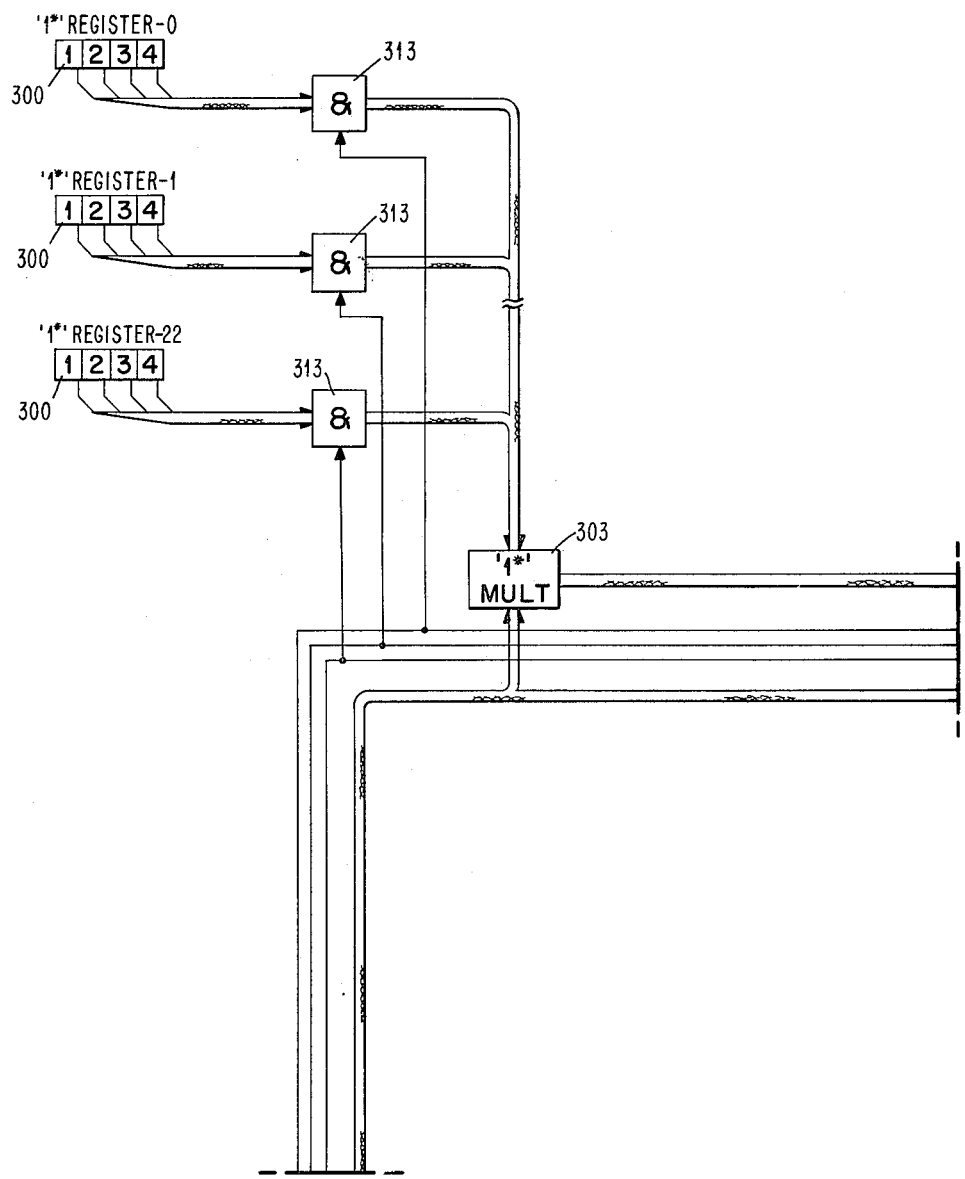
Figure 35:
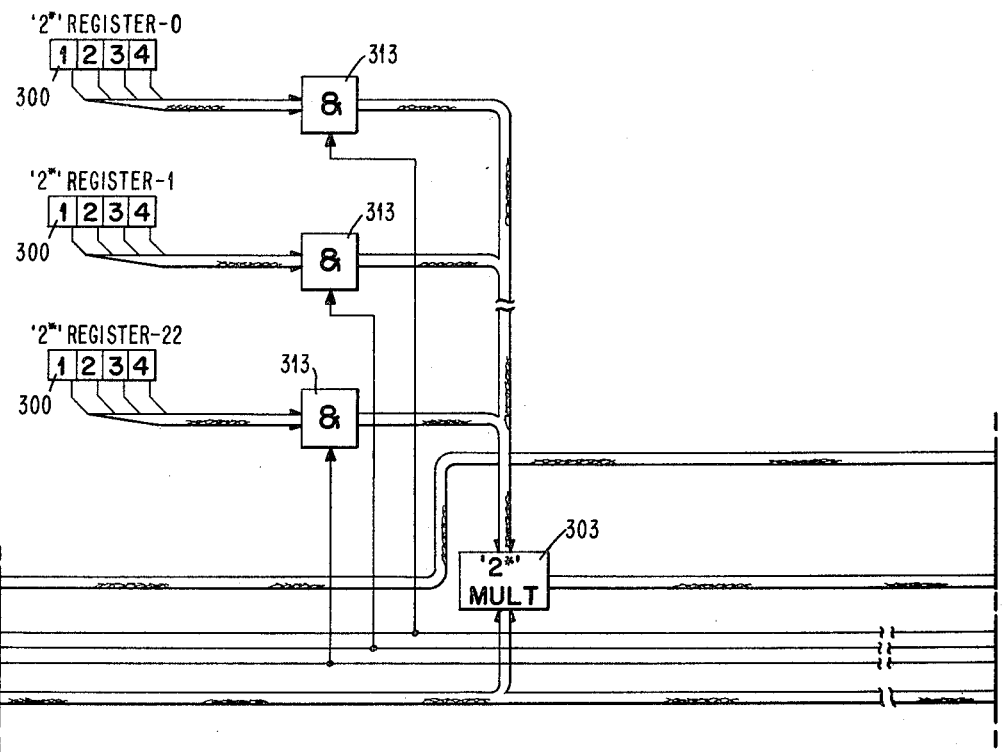
Figure 35M:
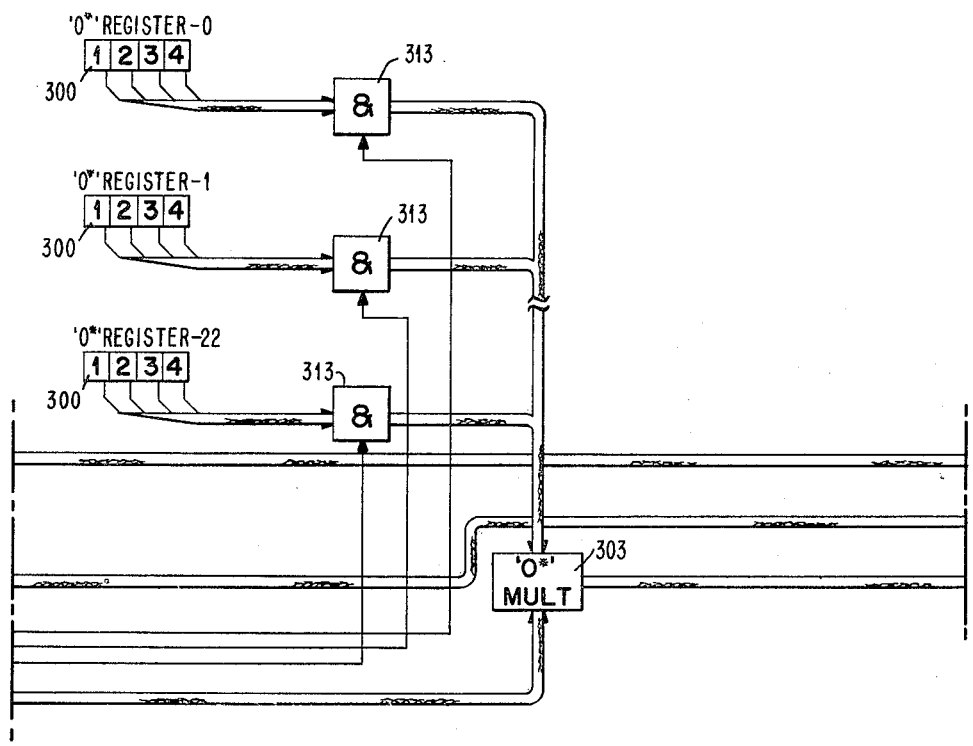

FIGURE 35 is a schematic diagram of the invention that was described with respect to the block diagram in FIGURE 1 and the functional diagram in FIGURE 34 and, wherever possible, the reference numerals used in FIG. 35 are the same as those used in FIG. 34. A specimen 201 on a matrix 203 is serially scanned by a flying-spot scanner 205 and a phototube 207. A book authored by V. K. Zworykin and E. G. Ramberg entitled Photoelectricity and Its Application, 1949, published by John Wiley, QC715.Z8 describes a flying spot scanner and associated sweep circuits on pages 369–375.

The phototube output is presumed to be of sufficient amplitude to operate the subsequent circuitry. A photomultiplier or other suitable means of amplification is not shown as it is considered to be obvious to one skilled in the art to provide the necessary basic circuits to produce adequate signal levels. Similarly, no amplifiers are shown in any logic circuits, with the exception of the circuit output drivers.

Figure 45A:
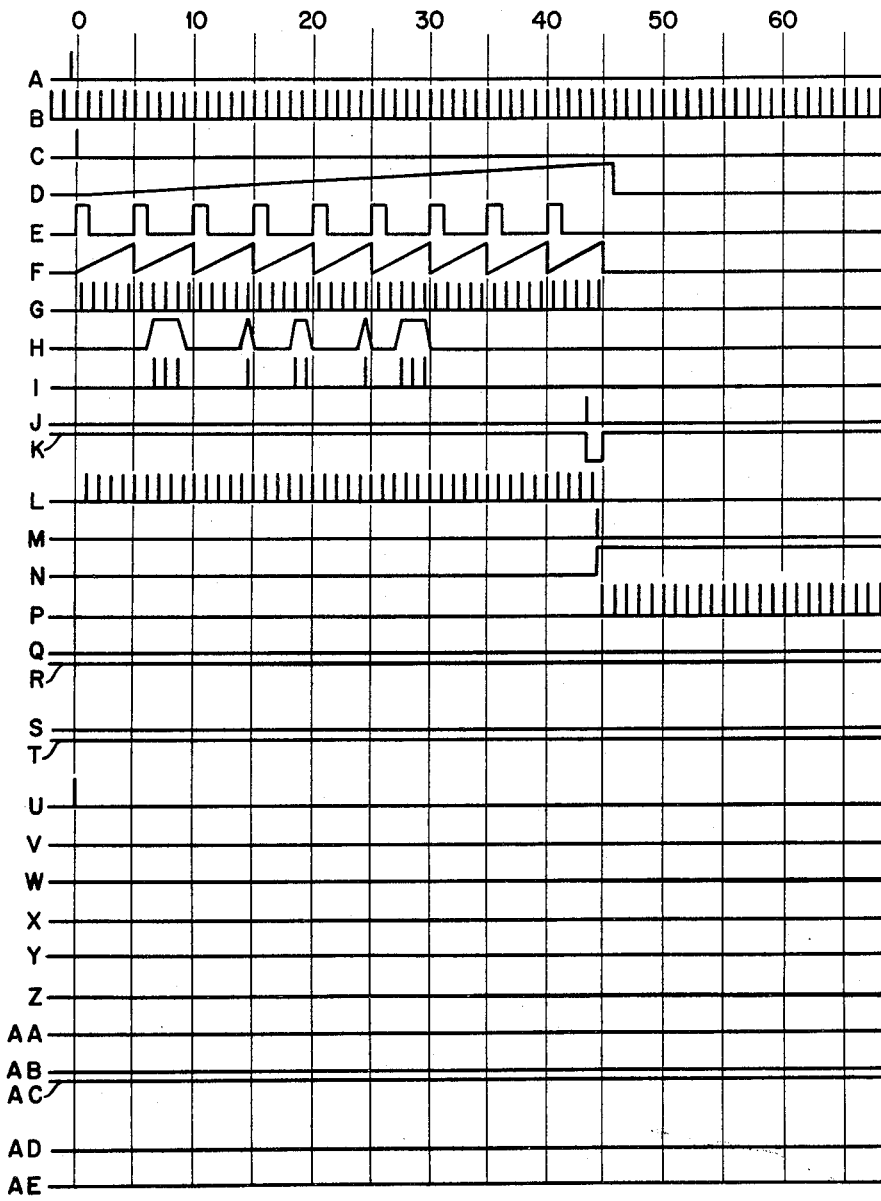
FIGURE 45 is a timing diagram showing the operation of the embodiment shown in FIGURE 35.
Figure 45:
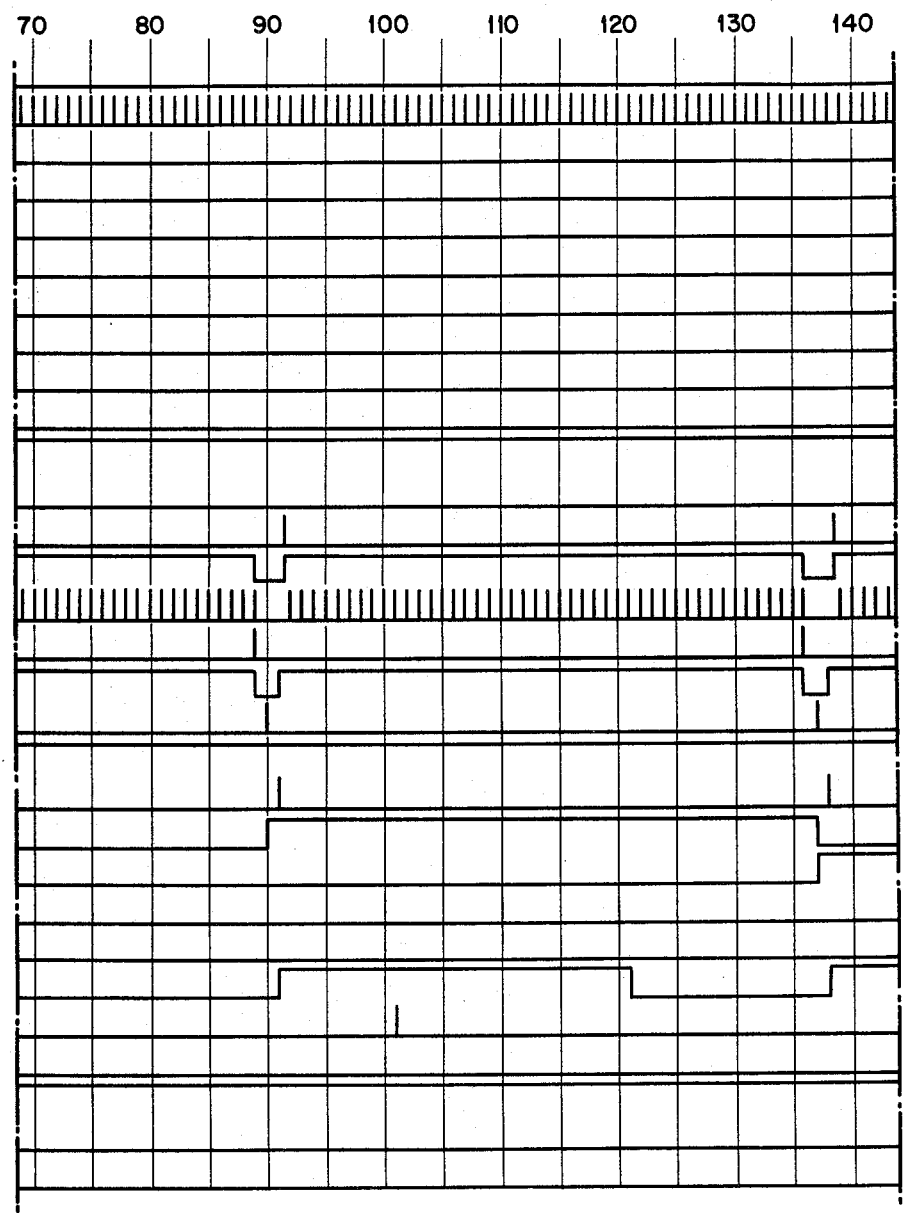
Figure 45C:
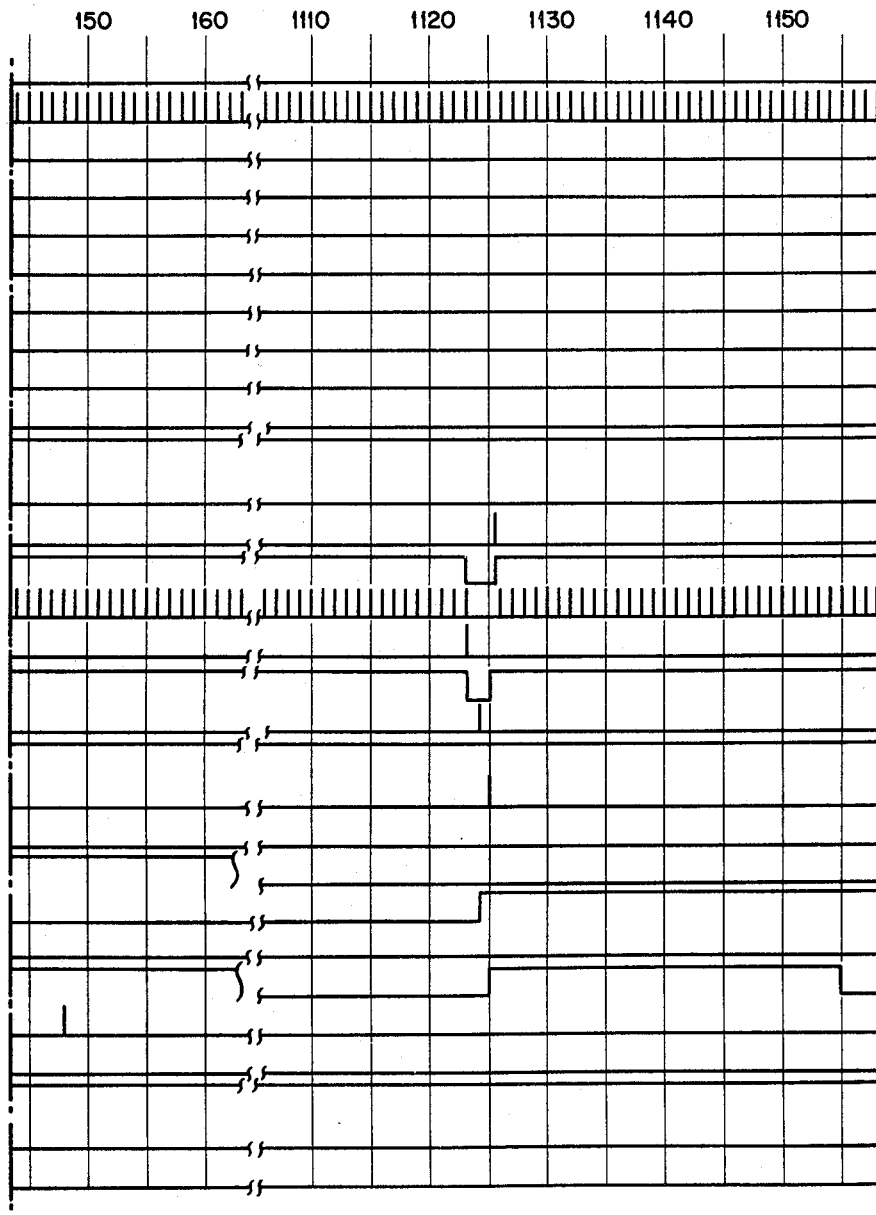
Figure 45D:
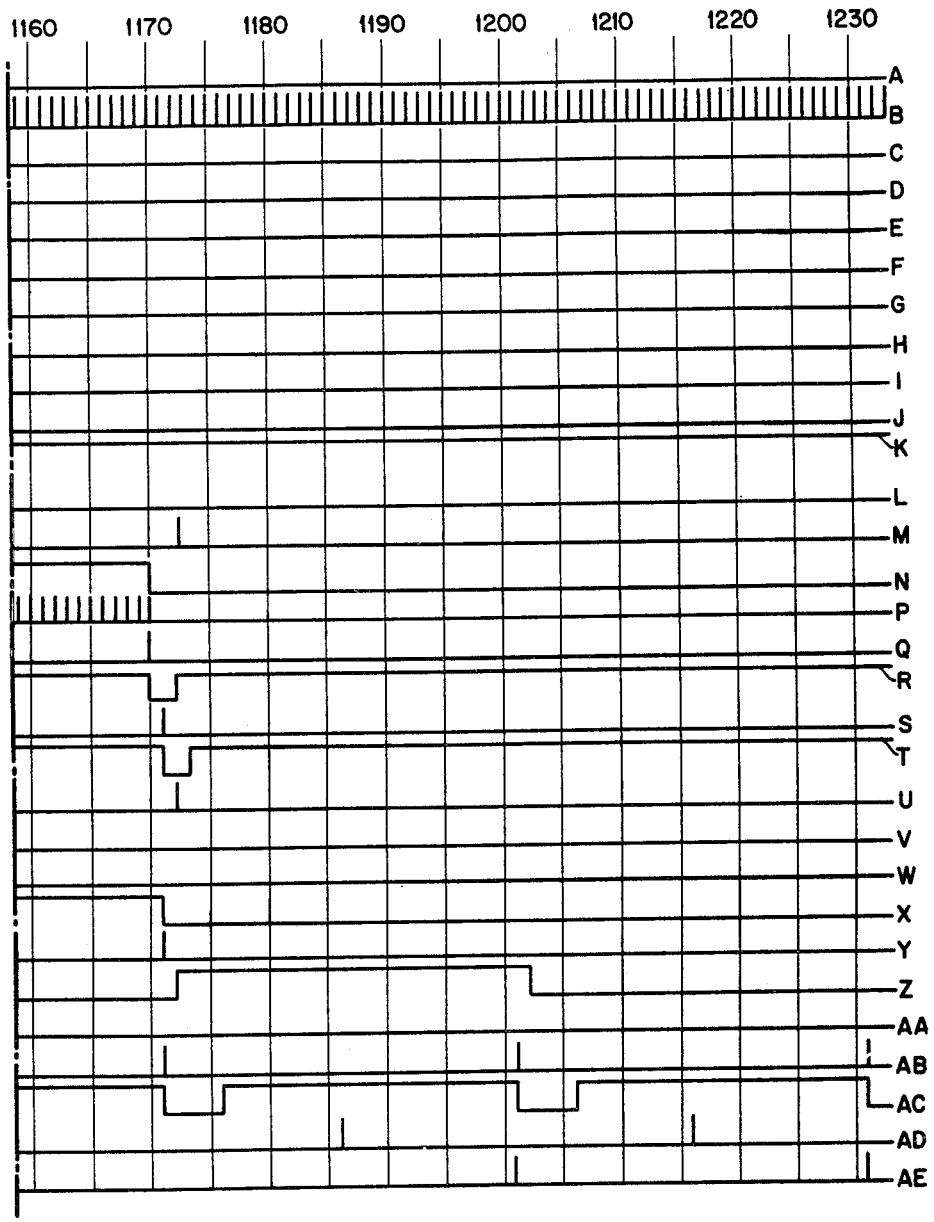

FIGURE 45 shows several waveshapes that pertain to the circuit shown in FIGURE 35. The waveshape labels correspond to similarly labelled points and leads on FIGURE 35.

A start pulse (waveshape A) initiates the operation of the pattern identification circuit. This pulse causes a single shot gate generator 209 to produce a conditioning gate on lead 211 that is one unit wide. One unit of time is defined as being the time between adjacent clock pulses (waveshape B). The first clock pulse occurring after start pulse A is thus passed through "and" gate 213 as waveshape C. This pulse serves several functions, one of which is to trigger the vertical sweep generator 204 which generates the vertical sweep (waveshape D) for the flying spot scanner 205. Since the matrix 203 is considered to have five discrete positions along each horizontal row, and nine discrete horizontal rows, the flying spot scanner sweeps horizontally nine times during each vertical sweep. Each horizontal sweep (waveshape F) is five units of time long. A five-pulse counter 215 provides a "1" output when registering a count of 0. This counter is reset to 0 by waveshape C. Another counter 217 which is also reset by waveshape C, provides a "1" output on lead 219 to "and" gate 221 when its count is lower than 8. Waveshape C triggers the first horizontal sweep for the scanner by setting counter 215 to 0, which provides a "1" output through "or" gate 223 to horizontal sweep generator 225. The fifth clock pulse B after waveshape C causes counter 215 to count past its maximum of four and the counter again registers 0, which provides a "1" output to start the second horizontal sweep (see waveshape E). In the same manner, the following horizontal sweeps are initiated. The beginning of the ninth horizontal sweep supplies the eighth pulse to counter 217 causing the counter to register 8, which terminates the conditioning gate ("1" output) for "and" gate 221. This terminates the scanner operation by causing a 0 signal on lead 219 to inhibit "and" gate 221, which removes clock pulses B from the input of counter 215.

Waveshape C also sets flip-flop 227 (through "or" gate 223) which conditions "and" gate 229. Clock pulses which are delayed one-half unit by delay 231 are also applied to "and" gate 229. The clock pulses passed by this "and" gate (waveshape G) condition "and" gate 231 to enable it to pass the video output of the phototube 207 at intervals during the sweep of the scanner. Waveshape H shows the approximate video output of the phototube for the input specimen "3." The one-half unit delay 231 causes the phototube output to be sensed as the scanning beam is approximately at the center of each area of matrix 203. Waveshape I indicates the signal present at the output of "and" gate 231 for an input specimen "3."

A counter 233 is reset to "0" by waveshape C. This counter provides two outputs; one at a count of "44" and one at a count of "45." The 45th clock pulse passed by "and" gate 229 provides an output from counter 233 that resets flip-flop 227, thus inhibiting "and" gate 229 and preventing further passage of video by "and" gate 231. Since the counter is read-out to reset flip-flop 227 at a count of "45," there are 45 intervals of time during which the flip-flop is set and "and" gate 229 is conditioned. The forty-five pulses from "and" gate 229 (waveshape G) are also applied to another "and" gate 235. The forty-fifth of these pulses is inhibited by waveshape K, which is a 1½ unit inhibit signal begun by the counter "read-out at 44" (waveshape J). The output of "and" gate 235 is delayed one-half unit by delay 237 to provide a pulse train (waveshape L) that is in phase with the clock pulses (waveshape B).

Two 45-position shift registers 243 and 245 are each reset by waveshape C. The 44 pulses in waveshape L are applied through "or" gates 247 and 249 to shift the registers 44 times. Since the shift pulses (waveshape L) are in phase with the clock pulses (waveshape B), the shifts occur between successive video pulses from "and" gate 231. Thus, one-half unit after the first video signal (from the first area of matrix 203) is passed through "and" gate 231 into the first positions of the shift registers 243 and 245, the first of the 44 shift pulses (waveshape L) shifts this data into the second order of each shift register. Another one-half unit later, the video signal corresponding to the second area of matrix 203 is placed into the lowest-order of each shift register. After 44 successive shifts the 45 video representations of the discrete areas of matrix 203 are stored in each shift register.

Figure 36:
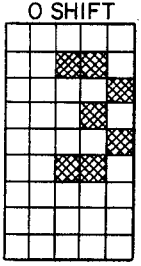
Figure 37:
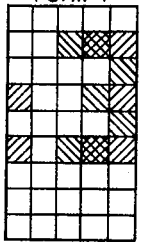
Figure 38:
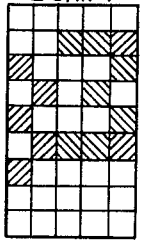
Figure 39:
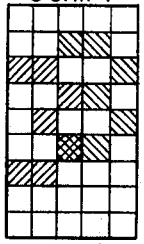
Figure 40:
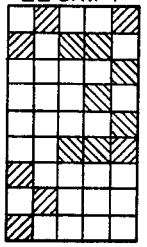

FIGURES 36–43 show the subsequent operation of the shift registers 243 and 245 and their associated circuitry in developing the autocorrelation sums. Following this paragraph will be a detailed electrical description of the operation of the shift registers. Each of FIGURES 36–43 show two 45-bit binary words indicating the bits stored in the shift registers 243 and 245 as the autocorrelation function is generated. The upper binary word is the same in all figures and represents the data in shifting register 243 corresponding to an uncentered input specimen "3" indicated on the matrices in FIGURES 36–43 by "slant-left" lines. The lower binary word indicates the data in shift register 245. This word is obtained by shifting the data in the upper binary word by the amount indicated. The shift registers described are of the recycling type as shown in FIGURE 15, where bits in the last position of the register are shifted into the first position. The "slant-right" lines in the matrices show the positions of the shifted specimen "3" corresponding to the lower binary word. The bits in the upper word are compared with the bits in the lower word and a count made of the number of coincident bits. This count provides the data for the autocorrelation table of FIGURE 44. FIGURE 36 shows the condition of the shift registers during the initial operation, after being filled with the binary data pertaining to the input specimen "3" (as described in the last paragraph). There are seven coincidence bits, providing the "7" at the center (position 0) of FIGURE 44. FIGURE 37 shows the condition of the shift registers during the second operation—the lower binary word is shifted one position. This corresponds to shifting the input specimen to the right one unit. Note the shifted specimen (slant-right lines) on the matrix is partially on the left side of the matrix. There are now two coincident bits (bit number 4 in row 2 and bit number 4 in row 6) providing the "2" at position 1 of FIGURE 44. FIGURE 38 shows the conditions present after two shifts, indicating 0 coincident bits, providing the "0" at position "2" of FIGURE 44. As the shifting is continued (after three shifts) the shifted specimen takes the shape of the "3" on the left side of the matrix, one row lower than the unshifted (short-left lines on the matrix) specimen (FIGURE 39). After three shifts, there is one coincident bit (bit number 3 of row 6), providing the "1" at position 3 of FIGURE 44. Continued shifting provides the remainder of the data for the table in FIGURE 44. FIGURE 40 shows the conditions present after twenty-two shifts. The lower word in FIGURE 40 shows three bits (number 2 and 5 of row 1 and number 1 of row 2) that have entered the left end of the word from the right. The shifted specimen (slant-right lines) has begun to enter at the top of the matrix, corresponding to bits entering the left end of the lower word. There are no coincident bits after twenty-two shifts, providing a "0" at position 22 of the table in FIGURE 44 (corresponding to shifting the specimen to the right two units and down four units). FIGURE 41 shows the conditions that would be present after twenty-three shifts, providing 0 coincident bits. This corresponds to a shift to the left two units and down five units, which is comparable to the shifting to the left two units and up four units, because the matrix has nine rows. On the matrix of FIGURE 41, bit 246 is shifted into bit 248 (left two units and down five units), and bit 250 is shifted into bit 252 (left two units and up four units). The choice of left two units and up four units was made to enable the data to be entered into the table of FIGURE 44 at position 23. The 23rd and all subsequent shifts provide data for the upper portion of the table of FIGURE 44. Due to the symmetry of the table, this data is redundant. FIGURE 40 shows the conditions that would be present after 44 shifts, providing a "2" at position 44 of the table of FIGURE 44. Finally, FIGURE 43 shows that forty-five successive shifts would provide the same result as was obtained before shifting (FIGURE 36). The same autocorrelation results are obtained (FIGURE 44) by this method as were obtained (FIGURE 29) by the more straight forward method outlined with respect to FIGURES 21–28. If input specimens of size "*m*" by "*n*" are to be identified, the input matrix must be of size 2*m*−1 by 2*n*−1 (or larger).

The operation of the shift registers and their associated circuitry to sequentially develop the 23 non-redundant sums is indicated in the tables of FIGURES 36–43. The sums are accumulated in counter 257 (FIGURE 35*b*). The counter 233 "read-out at 45" is passed through "or" gate 258 (first pulse of waveshape M) and through "and" gate 259 to set flip-flop 261, which provides a conditioning signal (waveshape N) for "and" gate 263. The function of "and" gate 259 is explained below. The succeeding 45 clock pulses are passed through this "and" gate (waveshape P) and through "or" gates 247 and 249 to simultaneously shift each register 243 and 245 forty-five times. Since the output of the 45th position of storage is fed back to the first position of storage in each shift register, each register returns to its initial condition after the 45 successive shifts. As the registers are shifted, an "and" gate 255 passes count pulse to counter 257 whenever the bit in the 45th order of the registers are "1's." Since identical video data is applied to both shifts registers, the counter 257 records the sum of video bits during the first stage of operation (as shown in FIGURE 36). The operation of two-unit single shot 277, inverter 279 and "and" gate 281 is explained below.

A 45-pulse counter 265 provides an output waveshape Q which is fed through "or" gate 267 to reset flip-flop 261, thus inhibiting the operation of "and" gate 263 after 45 pulses have passed. As flip-flop 261 is reset, a pulse is applied through "and" gate 269 one-unit single-shot 271. The output of this single-hot conditions "and" gate 273 which passes the subsequent clock pulse. "And" gate 269 is inhibited for one unit of time after the occurrence of waveshape C through the action of one unit single-shot 283 and inverter 285. This insures that no signal (waveshape S) will be generated when flip-flop 261 is initially reset (by waveshape C).

Waveshape S is applied through "or" gate 249 to shift the data in shift register 245 one position. This corresponds to shifting the pattern 201 on matrix 203 one unit as explained above. FIGURES 37 through 43 illustrate the operation of the shift registers during various data shifts. Waveshape S is also applied through a one-half unit delay 287, "or" gate 258, and "and" gate 259 to set flip-flop 261 for the second phase of operation (waveshape N). Delay 287 insures that the flip-flop 261 is not reset before register 245 is shifted. Thus, the registers 243 and 245 are shifted 45 times to cause a sum of coincidence of "1" signals to be accumulated in counter 257, then counter 245 is shifted one position, and each counter is again shifted 45 times. In this manner, the autocorrelation sums (FIGURE 44) are sequentially obtained.

The autocorrelation function can also be generated with a single shift register as shown in U.S. Patent Number 3,036,775, which was issued on May 29, 1962, to William L. McDermid, Harold E. Petersen and Glenmore L. Shelton, Jr.

Waveshape S also conditions "and" gate 295 to pass the accumulated total in counter 257 to the subsequent stages and after a delay of one unit in delay 296 resets counter 257 (waveshape U). This delay 296 insures that the counter 257 output will be passed to the subsequent stages before the counter is reset.

The output of the 45-pulse counter 265 (waveshape Q) initiates the operation of a two unit single-shot 277 which provides a positive gate to inverter 279. The inverter output (waveshape R) inhibits the operation of "and" gate 281 during the time that shift register 245 is shifted one unit (by waveshape S). This prevents a possibly erroneous signal from being applied through "and" gate 255 to counter 257 during this shift.

A ring counter 298 provides timing for the subsequent circuits. This counter provides a "1" output on only one output lead at a time. The counter is set to its zero output by waveshape C. An output is developed from its first stage (waveshape V) after the first occurrence of waveshape S. Successive inputs step the counter through its 24 positions. Waveshape W is developed by the second input to the ring counter; waveshape X by the 23rd input; and waveshape Y by the 24th input. One of the functions of waveshape Y is to trigger 2-unit single-shot 291 which provides an output through inverter 293 to inhibit "and" gate 259 (waveshape T). This stops the automatic recycling of flip-flop 261 and shift registers 243 and 245 after 23 input character shifts have been completed.

The sums accumulated in counter 257 are passed through "and" gate 295 at the appropriate time to register 297. The number stored in this register is simultaneously applied to a group of twenty multipliers 303 (labeled in FIGS. 35k, l, n, c, d, and f by "1*" MULT, "2*" MULT ... "0*" MULT, "1" MULT, "2" MULT ... "0" MULT) where it is multiplied by a number stored in a register 299 and 300 of each of the twenty groups of twenty-three registers (FIGS. 35k, l, m, c, d, and e). That is, the first number $D_S(0, 0)$ generated and stored in register 297 indicating the autocorrelation sum for a zero shift is multiplied by the number stored in the "1" register-0 299 in "1" multiplier 303. This product is stored in the "1" accumulator 327. At the same time, "2" multiplier 303 multiplies the number stored in register 297 by the number stored in "2" register-0 299 and applies the product to the "2" accumulator 327. Simultaneously, the number stored in register 297 is multiplied by the number stored in each of the other eighteen appropriate registers 299 and 300 (3, 4 ... 0, 1*, 2* ... 0*) and the products are stored in the corresponding accumulators 327. The second number, $D_S(1, 0)$ is subsequently stored in register 297 and simultaneously multiplied by the numbers stored in registers 299 and 300 having labels terminating with a "1" (Eg. "1*" REGISTER-1, "7" REGISTER-1). Twenty multipliers are used in this embodiment; two for each of the reference patterns used (one corresponding to adaptive storage and one corresponding to non-adaptive storage). If serial multiplication were to be used, only one multiplier would be needed. Since 23 individual autocorrelation sums are computed when a 5 x 9 matrix is used, 23 registers 299 and 300 are used to store the autocorrelation function of each adaptively stored and non-adaptively stored reference pattern. The numbers stored in registers 299 are the unnormalized autocorrelation functions of the references and the numbers stored in register 300 are normalized autocorrelation functions of the references, as indicated in the tables in FIGURES 28–30. Since the data in the non-adaptive registers 300 is not altered after its initial computation, normalized values may be conveniently stored. The data in the adaptive registers 299 is most conveniently stored in unnormalized form for ease of computing the altered values. Since the unnormalized autocorrelation function values do not exceed 15 (1111), 4-bit registers are used. Registers 300 are also shown to store 4-bits of data corresponding to rounded-off values of normalized autocorrelation function values. The numbers in all registers are entered before the system is used for recognition. The appropriate number for storage in each particular register in a group is dependent upon the order of generation of sums in counter 257 by the circuit of FIGURE 35a–b and is controlled by a group of "and" gates 313. FIGURE 44 shows the autocorrelation function for the pattern "3*" with its elements labeled "0," "1," "2," etc., through "44," indicating their order of generation. The number labelled "0" is placed in "3*" register-0, the number labelled "1" is placed in "3*" register-1, etc. through "22" which is placed in "3*" register-22. All numbers must be doubled except the numbers placed in the registers having labels terminating in a "0" ("1*" register-0, "2*" register-0, etc.) to account for the reflected numbers corresponding to 23, 24, 25 ... shifts which are not developed by the circuit of FIGURE 35 as they are the same as the numbers developed by the first 22 shifts.

The ring counter 298 (FIGURE 35b) controls the timing of the operation of "and" gates 313, insuring that the numbers in the registers having labels terminating in a "0" are applied to the multipliers 303 after generation of the 0-shift autocorrelation sum; the numbers in the registers having labels terminating in a "1" are applied after generation of the 1-shift autocorrelation sum, etc. until finally, the numbers in the registers having labels terminating in a "22" are applied after the 22-shift (final) autocorrelation sum is obtained. Waveshape Q resets register 297 one unit of time before waveshape S conditions "and" gate 295 to pass the accumulated sum from counter 257 to the register. One unit of time later than waveshape S (due to the two-unit delay 314 operating on waveshape Q), a 30-unit single-shot 315 provides a conditioning level (waveshape Z) to "and" gate 317. The multiplier outputs are added to the associated accumulators 327 twenty units of time after "and" gate 317 is conditioned due to the action delay 325. This delay provides time for the multipliers to develop their outputs. The twenty-fourth sum (caused by the twenty-third shift) accumulated in counter 257 is not used. Its development is automatic due to the use of 24 level ring counter 298. This sum is disregarded because only 23 autocorrelation sums are needed with a 5 x 9 input matrix 203. This sum is passed by "and" gate 317 to the multiplier, but there are no registers to provide the second factor required for multiplication, so the product is zero and does not affect the sums in accumulators 327.

The sums developed in accumulators 327 are normalized by division by $$\left[\sum_{x', y'} D_R^2(x', y')\right]^{1/2}$$

in dividers 401. The normalization factor for each reference is stored in a normalization register 402 (FIGURE 35f). These factors are corrected when the data in reference storage registers 299 is altered as will be described below.

The remainder of the circuitry shown in FIGURES 35c, d and e is related to the adaptive feature of the system and will be described subsequently.

The maximum signal indicator circuits on FIGURES 36g, 36h, and 36i have two functions: first, to determine which input signal is the largest after the termination of the multiplications and second, to indicate whether the difference between the largest signal and the next-largest signal is sufficiently great to indicate definite, unambiguous identification or whether a "reject" should be indicated. The input signals to the maximum signal indicator circuits are the output signals from the accumulators 327 (FIG. 35n) and the dividers 401 (FIG. 35f). The reject determination is made on a ratio basis—a reject is indicated when the second-largest input signal is actual number, it is necessary to invert each bit and add one. The addition of "1" occurs one unit of time after the subtracters 341 output is passed through "and" gate 345 due to the operation of 1-unit delay 368. This delay provides sufficient time for the register 367 to accept its input from inverters 366. The output of the "add-1" register 367 is passed through "and" gate 369 to register 361 at the occurrence of waveshape AD which occurs 15 units of time after waveshape AB due to the operation of delay 369. This delay provides adequate time for the addition of "1" in register 367. Waveshape AE occurs 15 units of time after waveshape AD due to delay 372 and is used to reset register 367 and the previously discussed "and" gates 347 and 349 (FIG. 35g).

If the output of subtracter 341 is positive, "and" gate 365 (FIG. 35h) is used to pass the subtracter output to the comparison circuit. "And" gate 365 requires a "sign-positive" input which is developed by inverter 370 (FIG. 35g) from the "sign-negative" output of the subtracter. The output of "and" gate 365 is applied to a subtracter 374 where it is the subtrahend of the subtraction from the number previously stored in register 361. Waveshape C resets register 361 to all "1's" before it is used in the comparison circuits. The only output of subtracter 374 that is used is the sign bit. At the occurrence of waveshape AD, "and" gate 369 passes this output to inverter 371 which generates a "1" signal if the sign of the subtraction is positive. A positive sign at the output of inverter 371 indicates that the new difference obtained from subtracter 341 (FIG. 35g) is smaller than the number stored in register 361 (FIG. 35i). This output is applied to reset register 361 and is delayed by five-unit delay 373 and applied to condition "and" gate 375 (FIG. 35h). Delay 373 provides adequate time for register 361 to be reset to "0" before storing the new number. "And" gate 375 then passes the output of subtracter 341 to register 361. After all subtractions in subtracter 341 have been terminated, register 361 maintains the difference between the largest and second-largest applied signals.

In order to prevent a "reject" from being indicated when the two largest applied signals correspond to the two stored versions of the same reference, a flip-flop 376 (and associated circuits) is controlled to provide a "1" output to override the reject circuits when this condition occurs, and to provide and "0" output when the two largest applied signals correspond to different references. This flip-flop is reset by a signal from inhibitor 371 when the subtracter 374 indicates that a new "smallest difference" has occurred (during the operation of subtracter 341, shown in FIG. 35g). The flip-flop reset signal is applied through a 1-unit delay 378 to condition an "and" gate 380 which then passes a signal to "set" flip-flop if the subtracter 341 is currently generating the difference between the signals corresponding to the two versions of the same reference. The "1" outputs of the "1*," "2*" . . . "0*" minuend flip-flops and the "1" outputs from the "1," "2" . . . "0" subtrahend flip-flops are compared, respectively, in "and" gates 382 (FIG. 35h), one of which generates a signal through an "or" gate (FIG. 35h) to "and" gate 380 when the minuend and subtrahend of subtracter 341 (FIG. 35g) correspond to the two versions of the same reference. The output connections from flip-flop 376 will be explained in detail below.

The ratio between the largest and second-largest sums is also calculated and a determination made whether to accept the largest sum as an indication of the input specimen or to indicate a reject. A discrimination factor is also determined based on the probability of successful identification. This factor is used to control the amount of error correction that is to be applied to the adaptive storage registers 299 (FIG. 35c, d, e). A multiplier 381 develops the product of the number stored in register 361 and a reject constant stored in a low-discrimination storage register 383. This constant is determined by the minimum discrimination tolerance that is acceptable between the largest and next-largest signals to the maximum signal indicator (from accumulators 327 in FIG. 35n and dividers in FIG. 35f). The multiplier inputs are applied for 20 units of time beginning 50 units of time after the S "9" flip-flop 333 (FIG. 35e) is set due to the action of delay 384 and single-shot 386. The delay provides adequate time for the last subtraction in subtracter 341 (FIG. 35g) and stabilization of the comparison circuits on FIGURES 35g and 35h; the single-shot 386 provides sufficient time for the operation of multiplier 381. The result of this multiplication is used as the subtrahend of subtracter 385. The minuend of subtracter 341 (FIG. 35g), which corresponds to the largest signal applied to the maximum signal indicator, is also applied as the minuend of subtracter 385. The only output of subtractor 385 that is used is the sign of the difference. If this sign is negative, indicating that the difference stored in register 361 is larger (after multiplication by the constant stored in register 383) then the largest applied signal (from an accumulator 327 in FIG. 35n or from a divider 401 in FIG. 35f), no reject is indicated. The "sign-negative" output of subtracter 385 is passed by "and" gate 387 when conditioned by a signal from delay 388 (which occurs 15 units of time after the multiplier 381 is conditioned to provide time for the multiplier to operate) to set a flip-flop 390. The output of this flip-flop is applied through an "or" gate 400 to condition the "and" gates 353 and, hence, operate one of the ten identification lamps 389 as an indication of the identity of the specimen. Amplifiers 391 provide the required power to operate the lamps. If the output of subtracter 385 is positive indicating a "reject," flip-flop 390 is reset, inhibiting the operation of "and" gates 353, and supplying a signal to operate the reject lamp 389 through an "and" gate 402. Flip-flop 376 (FIG. 35i), when set, provides a signal which overrides the system reject circuit by inhibiting "and" gate 402. This occurs when the "reject" is caused by two versions of the same reference. Flip-flop 376, when set, also supplies a signal through "or" gate 400 to condition "and" gates 353. This signal would ordinarily be supplied by flip-flop 390 if no "reject" were indicated. This substitute signal operates a lamp 389 to provide an indication of the identity of specimen.

Flip-flop 390 is also used, in conjunction with other circuitry, to provide an indication of the relative system discrimination, which is used to control the amount of correction to be applied to the reference storage register 299 (FIGS. 35d, e, f) when the specimen is not identical to a reference pattern. Signals labelled "x1/2," "x1/4" and "x1/8" are generated in FIG. 35j as a function of the probability of correct identification. Although the ratios in the signal labels may not exactly coincide with the actual probabilities of correct identification, the ratios are dependent upon the probabilities and their use in controlling the correction signals to storage register 299 gives the system a dependence upon the probabilities. A high discrimination storage register 431 contains a number dependent upon a higher tolerance (discrimination) and replaces the number from register 383 to multiplier 381 for a second multiplication. This multiplication cycle starts 25 units of time later than the first cycle due to the operation of delay 433. The operation of single-shot 435, and "and" gate 438 is similar to the operation of elements 386 and 379. An "or" gate 439 permits "and" gate 377 to be conditioned by a signal from either single-shot 386 or single-shot 435. When the sign of the subtracter 385 output is negative during the second multiplication cycle, a signal is applied to set a second flip-flop 441 through an "and" gate 443 which is conditioned by the output of a delay 437 (15 units of time after the beginning of the second multiplication cycle). Both flip-flops 390 and 441 are orginally reset by waveshape C. Thus, both flip-flops 390 and 441 remain reset if the system is incapable of identifying the specimen and a reject is indicated. If the specimen is identified but not with the high discrimination demanded during the second multiplication, flip-flop 390 is set and flip-flop 441 is reset.

within a pre-established percentage of the largest input signal, unless the two largest input signals correspond to the two stored versions of the same reference pattern (e.g., 3* and 3).

Figure 35N:
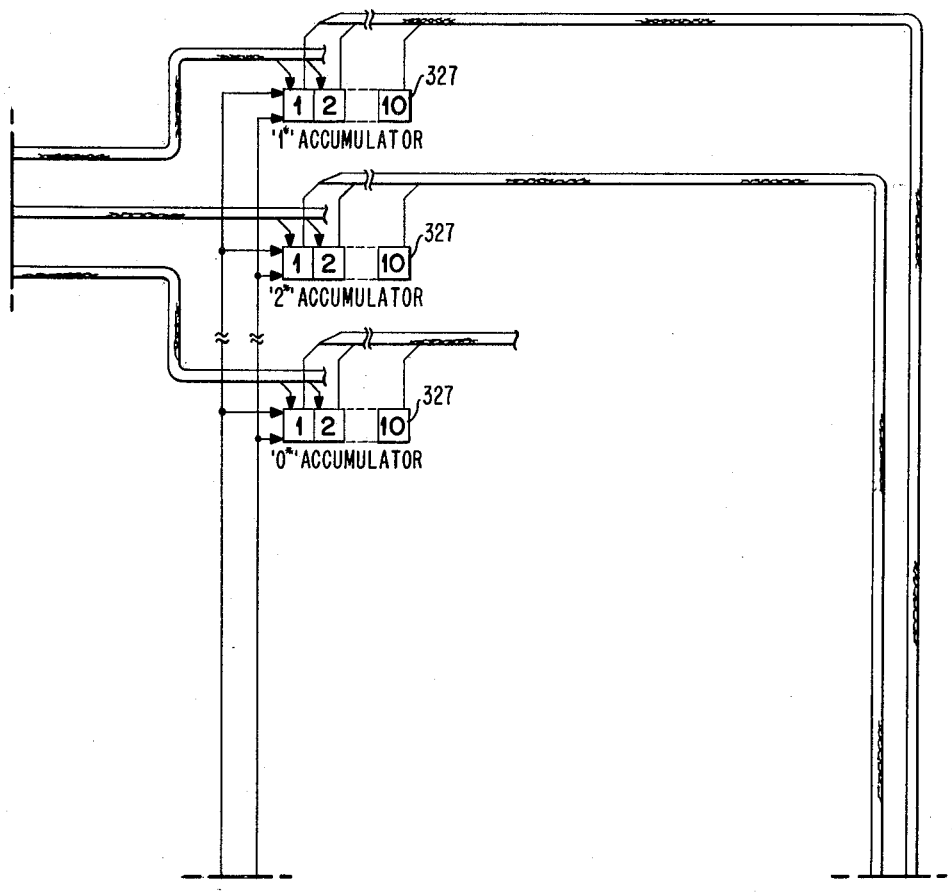

Twenty minuend flip-flops and nineteen subtrahend flip-flops 333 control twenty minuend "and" gates 335, and nineteen subtrahend 'and" gates 337 respectively. A subtracter 341 (FIG. 35g) sequentially compares the input signals (from the accumulator 327 in FIG. 35n and dividers 401 in FIG. 35f) under the control of the minuend and subtrahend "and" gates 335 and 337. During the first subtraction, the number (signal) from the "2*" accumulator (FIG. 35n) is subtracted from the number from the "1*" accumulator (FIG. 35n). If the subtrahend is smaller than the minuend (providing a positive difference), the subtrahend is replaced by the number from the "3*" accumulator. This is continued until a subtrahend larger than the minuend develops a negative difference from the subtracter. If this occurs, the number in the subtrahend is placed in the minuend and the subtrahend contains the next number to be tested. For example, if the "1*" output is larger than the "2*" output, but smaller than the "3*" output; during the first subtraction the "2*" signal is subtracted from the "1*" signal and a positive difference is indicated. The "3*" signal then becomes the subtrahend of a second subtraction from the "1*" signal. Since this subtraction provides a negative difference, the third subtraction uses the "3*" signal as the minuend and the "4*" signal as the subtrahend. This continues until the "0*" signal is the subtrahend of a subtraction, and the "1," "2" . . . "0" signals (from dividers 401) are tested. Since each subtraction that provides a negative remainder causes the subtrahend to become the minuend of the subsequent subtraction, the number in the minuend (after all subtractions are completed) is the largest of the twenty applied signals.

This procedure is accomplished in the circuitry of FIGURE 35d in the following manner. Waveshape Y from the 24th element of ring counter 298 (FIGURE 35b) sets the M "1*" and S "2*" flip-flops 331 and 333 which have outputs which condition the M "1*" and S "2*" "and" gates 335 and 337. These two "and" gates apply the numbers from the "1*" accumulator to the minuend input of subtracter 341 and the number from the "2*" accumulator to the subtrahend input of the subtracter. The subtracter output is applied through a one-unit delay 343 and an "and" gate 345 to the subsequent circuits. The operation of the one-unit delay and "and" gate will be explained below. Waveshape AE which is developed in the subsequent circuitry provides a pulse to the circuits of FIGURE 35g to indicate the operations of the subsequent circuitry are completed and the next subtraction is to take place. The generation of waveshape AE will also be explained below. The minuend to be used in the next subtraction is determined by the result of the previous subtraction. The "1" output of the S "2*" flip-flop 333 is applied to the MC "2*" (minuend control) "and" gate 347 and the SC "3*" (subtrahend control) "and" gate 349. Waveshape AE is applied to all "and" gates 347 and "and" gates 349. The "sign-negative" lead 351 is applied to all "and" gates 347. The MC "2*" "and" gate 347 is conditioned only when the difference of the previous subtraction is negative. Regardless of the sign of the difference of the previous subtraction, SC "3*" "and" gate is conditioned. This output sets the S "3*" flip-flop 333 and rests the S "2*" flip-flop 333, to cause the subsequent subtraction to use the next subtrahend in order. When the difference of a subtraction is negative, in addition to substituting subtrahends, the minuend is replaced by the subtrahend of the previous subtraction, as explained above. In this case, the substitution of minuends is caused by the operation of the MC "1*" "and" gate 347 when a negative sign is developed by the first subtraction. This operation continues as described above until the S "0" flip-flop 333 is set, causing the number from the "0" divider 401 to be used as a subtrahend of the subtraction. If this subtraction provides a positive difference indicating that the minuend is larger than the subtrahend, the minuend flip-flop 331 that is set during this subtraction provides an indication of the largest applied signal. If the remainder of the last subtraction is negative (indicating that the specimen is similar to the adaptive reference pattern "0"), the S "0" flip-flop 333 output, the sign negative signal on lead 351, and waveshape AE cause the MC "0" "and" gate 347 to set minuend flip-flop M "0." Each minuend "and" gate 347 output, in addition to setting the appropriate minuend flip-flop 331, provides a reset signal to all lower-order minuend flip-flops 331. All minuend flip-flops 331 and subtrahend flip-flop 333 are initially reset by waveshape C.

The "1" outputs of the minuend flip-flop 331 are combined in "or" gates 352 (FIG. 35h) and applied to "and" gates 353 (FIGS. 35h and i). The "or" gates combine the flip-flop outputs to generate a single output corresponding to each reference pattern (i.e., the outputs of flip-flop M "1*" and "M1" are combined, the outputs of M "2*" and M "2" are combined, etc.). The "or" gate 352 which generates an output signal conditions the corresponding 'and" gate 353 which, in turn, controls the illumination of an output lamp 389 to provide an indication of the identity of the specimen (if the circuits to be described below do not indicate a reject).

"Or" gate 355 (FIG. 35g) has a pulse output (waveshape AB) at the time that any subtrahend flip-flop 333 is set. The output of the subtrahend flip-flops is converted into a pulse by the operation of capacitors 357. This output is applied through a 15-unit delay 359 to the subsequent circuitry on FIGS. 35h, i and also to 5-unit single-shot 360. The output gate of this single-shot is applied through inverter 363 as waveshape AC to inhibit "and" gate 345. The 5-unit single-shot and associated circuitry inhibits the subtracter output for a period of time while the difference (output) is being generated. One-unit delay circuit 343 overcomes the effect of the inherent delays of 'or' gate 355, 5-unit single-shot 360, and inverter 363, insuring that the subtracter output will be inhibited until completely developed.

A comparison circuit, shown primarily on FIGS. 35h and i, detects the difference between the largest and second-largest signal to the maximum signal indicator (from accumulator 327 in FIG. 35n and dividers 401 in FIG. 35b), and indicates a reject if the ratio between these numbers is insufficient and if the two largest signals do not correspond to the two stored versions of the same reference. As each subtraction is performed by subtracter 341, the difference obtained is compared to the smallest difference obtained by previous subtractions with the same minuend and the smaller of these differences is stored for the subsequent comparisons to be made with respect to subsequent subtractions. If the output of subtracter 341 is negative, indicating the subtrahend to be larger than the minuend, the comparison circuit stores the output of subtracter 341. No comparison is necessary in this case, because the smallest difference from the largest minuend up to the time that a negative difference is detected is always the difference between the minuend and subtrahend of the subtraction that causes the negative difference. If, however, the output of subtracter 341 is positive, it is necessary for the comparison circuit to store the difference of this subtraction only if this difference is smaller than any previous difference from the same minuend in subtracter 341. A register 361 (FIGURE 35i) is used as the storage element for the comparison circuit.

If the output of subtracter 341 is negative, "and" gate 363 (FIGURE 35h) passes this output to a complementer comprised of a bank of inverters 366 (one for each bit of data) and an add "one" register 367. The complementer is necessary because the output of subtracter 341 is in the complement form when negative. It is well known that to convert a number in the "2's" complement to the If the specimen is identified with a high discrimination, both flip-flops are set. When a high discrimination is present, the signal from the "1" output of flip-flop 441 is applied to an "and" gate 445. A document quality switch 447 under the control of the machine operator, provides a conditioning signal to this "and" gate when the switch is placed at the "high" quality position and, in this case, the "and" gate provides the "x1/2" output. When the discrimination is high and the document quality poor or when the discrimination is low and the document quality is high the "x1/4" output is generated by an "or" gate 449. In the first case (flip-flop 441 set and switch 447 at "low"), an "and" gate 451 passes a signal to "or" gate 449 and in the second case (flip-flop 441 reset, flip-flop 399 set and switch 447 at "high") an "and" gate 453 in conjunction with an "and" gate 455 passes a signal to the "or" gate 449. Similarly, in the case of low discrimination and low document quality, an "and" gate 457 generates the "x1/8" output. These outputs ("x1/2," "x1/4" and "x1/8") are applied to control the amount of correction applied to the adaptive storage registers 299 (FIGS. 35b, e, f). The greatest correction ("x1/2") is used when the discrimination and document quality are high; a lesser correction ("x1/4") is employed when either discrimination or document quality is poorer; and a low correction ("x1/8") is employed when the discrimination and document quality are low. If the apparatus indicates a reject or if the document quality is poor, no correction is made.

The adaptive, or self-correcting, feature of the present invention, as embodied in FIGURE 35, makes use of the correction control signals ("x1/2," "x1/4" and "x1/8") which are generated in FIG. 35j; the indication of the identity of the specimen (applied to a cable from "and" gates 353 on FIGS. 35h and i); the previously-stored (adaptively) autocorrelation function of the references (stored in registers 299 in FIGS. 35c, d. and e); and the autocorrelation function of the specimen (generated as the output of "and" gate 317 on FIG. 35b).

Each element of the autocorrelation function of the specimen is stored in corresponding register 405 (FIG. 35c) under the control of a group of "and" gates 407. These "and" gates are sequentially conditioned by signals from the ring counter 298 (FIG. 35b) as the elements of the autocorrelation function are generated. The registers 405 are reset to 0 by waveshape C before the specimen is scanned. The data in the registers 405 is applied to a group of subtracters 409 where this data is subtracted from the corresponding data in the appropriate adaptive reference storage registers 299. A group of "and" gates 411 (FIGS. 35c, d and e) are associated with each group of reference storage registers (where each group corresponds to a reference. The identity of the specimen, as defined by the output of the "and" gates 353 (FIGS. 35h and i) is fed back to condition the appropriate group of "and" gates 411. The data selected by these "and" gates is applied to the appropriate subtracters 409 and the results of the subtractions are stored in registers 481 (which are reset by waveshape C before the specimen is scanned).

The data in registers 481, which is indicative of the difference between the autocorrelation function of the specimen and the adaptively stored autocorrelation function of the selected reference, is divided by the correction factor ("x1/2", "x1/4" or "x1/8") generated in FIG. 35j. This operation is accomplished in a group of dividers 413, each of which is comprised of a group of "and" gates 483 and a group of "or" gates 485. This simple type of divider may be used here because all divisors (2, 4 and 8) may be represented by $2^n$ where $n$ is an integer. In this case, division is accomplished by shifting the input data in registers 481 by the appropriate number of positions. That is: division by 2 is accomplished by shifting the data one position; division by 4 is accomplished by shifting the data two positions; and division by 8 is accomplished by shifting the data three positions. When the correction factor is "x1/2" indicating a division by 2, an "and" gate 483 passes the $2^3$ data in each register data in each register 481 as the $2^2$ output data; the $2^2$ data as the $2^1$ output data, and the $2^1$ data as the $2^0$ output data. The $2^0$ data in register 481 is not used. Similarly, division by 4 (corresponding to a correction factor of "x1/4") is accomplished by passing the $2^3$ data in register 481 as the $2^1$ output data and the $2^2$ data as the $2^0$ output data. The $2^1$ and $2^0$ data in register 481 is not used in this case. Division by 8 (corresponding to a correction factor of "x1/8") is accomplished by passing the $2^3$ data in register 481 as the $2^0$ output data and disregarding the $2^2$, $2^1$ and $2^0$ register data. Since the $2^0$ register data is never used, this position of the register is unnecessary and is shown in the drawing only to simplify the above explanation.

The register correction signals from dividers 413 are subtracted from the data stored in the corresponding reference storage registers 299 in subtracters 491 and the difference, which represents the corrected reference storage data to be used in future operations, is applied through "and" gates 493 to a group of temporary storage registers 495. When the specimen autocorrelation function is greater than the adaptively stored reference autocorrelation function, subtracters 409 generate negative difference which, after division by the correction factor, are applied as subtrahends to subtracters 391. In this case, subtracters 491 actually perform an addition operation to increase the new reference storage data. The temporary storage registers 495 are reset to 0 by waveshape C. The "and" gates 493 are conditioned after the entire identification system has stabilized by a signal from a 100-unit delay 497. The signal applied to this delay is identical to the signal that is applied through a 50-unit delay 384 (FIG. 35i) to initiate the discrimination factor generating circuits (FIGS. 35i and j), and thus, the output signal from the 100-unit delay 497 occurs after sufficient time has elapsed for all previously-discussed operations to occur. The conditioning signal to "and" gates 493 is also used to condition several other "and" gates 499 (FIGS. 35c, d and e) one corresponding to each adaptively stored reference. The second input to each of these "and" gates 499 represents the identity of the specimen and is supplied from the outputs of "and" gates 353 (FIGS. 35h and i). Thus, only one "and" gate 499 provides an output signal. This signal is used to reset the corresponding registers 299 and is also applied through a 1-unit delay 501 to condition an associated group of "and " gates 417. The conditioned "and" gates 417 pass the temporarily stored corrected reference data in registers 495 to the appropriate reference storage registers 299. The 1-unit delay 501 is used to provide time for the registers 299 to be reset before the corrected data is applied.

The corrected reference storage data in registers 495 is also used to alter the appropriate normalization factor stored in registers 402 (FIG. 35f). The normalization factor is generated by squaring the elements of the corrected autocorrelation function in a multiplier 421 (FIG. 35e); summing the squares in an accumulator 423; and generating the square root of the sum in a square rooter 425. This operation provides the necessary normalization factor:

$$\left[ \sum_{x', y'} D_R^2(x', y') \right]^{1/2}$$

which was described above.

The data in registers 495 is sequentially sampled by a group of "and" gates 502 under the control of a ring counter 504. The ring counter is initially reset to 0 by waveshape C and is shifted by signals generated by an "or" gate 506. The first shift signal is obtained from 100-unit delay 497 (FIG. 35f) and is the register 299 reset signal that was discussed above. The "or" gate 506 output is regenerated through an "and" gate 507, an amplifier 509, a 20-unit delay 511, and a 10-unit delay 513, from which it is applied to the "or" gate 506 as the second shift pulse for the ring counter 504. The twenty-fourth shift of the ring counter generates a signal which is applied through an inverter 515 to inhibit the recycling action. The ring counter supplies conditioning signals to the "and" gates 502 to sequentially sample the data in registers 495. The regenerating shift pulse at the output of 20-unit delay 511 is applied to a 5-unit single-shot 516 which provides an "add pulse" to cause the accumulator 423 to add the multiplier output. The 20-unit delay provides adequate time for the ring counter and multiplier to function, and the 10-unit delay 513 in the shift pulse regenerating circuit provides time for the accumulator to generate a sum. The accumulator is initially reset to 0 by waveshape C. The accumulated sum is applied to the square rooter 425 and the radicand is used as the corrected normalization factor in registers 402 (FIG. 35f). A capacitor 517 (FIG. 35e) passes the leading edge of the output of the twenty-fourth position of ring counter 504 to a group of "and" gates 519. The "and" gate corresponding to the normalization register 402 whose data is to be altered is conditioned by a signal from "and" gates 353 (FIGS. 35h and i). The output signal from the operated "and" gate 519 (FIG. 35f) is used to reset the corresponding normalization register 402 and is applied through a 1-unit delay 521 to condition a corresponding "and" gate 523 which passes the corrected normalization factor from the square rooter 425 (FIG. 35e) to the normalization register 402 (FIG. 35f). The 1-unit delay 521 insures that the register 402 is reset before the corrected data is applied.

Adaptive techniques that are applicable to specimen identification systems have been shown and described. These techniques provide for the gradual altering of adaptively stored references when recognizable specimens do not match their corresponding adaptively stored references. In this manner, the identification system adapts itself to changes in font and quality, in many cases before system failure occurs. The system alto utilizes non-adaptive reference pattern storage so that when high-quality specimens follow degraded specimens (which have caused the adaptive reference patterns to be automatically altered) the high-quality specimens are positively identified by their similarity to the non-adaptive references. The adaptive reference patterns are then automatically altered by the high-quality specimens. This feature insures that, when degraded specimens cause the adaptive references to be radically altered, subsequent high-quality specimens are still identifiable even though they would not be identifiable if compared to the adaptive references.

While the invention has been particularly shown and described with reference to a preferred embodiments thereof, it will be understood by those skilled in the art that various changes in form and details may be made therein without departing from the spirit and scope of the invention.

What is claimed is:

1. An apparatus for identifying a specimen based on its similarity to a member of a set of references comprising, in combination:
   means for comparing the specimen with a non-adaptively stored set of references and with an adaptively stored set of references;
   means for generating an indication of the identity of the reference that is most similar to the specimen;
   and means for altering the indicated adaptively stored reference such that it is more closely related to the specimen when the specimen is different than this adaptively stored reference.

2. The apparatus described in claim 1, where the alteration is a function of the deviation between the specimen and the indicated reference.

3. The apparatus described in claim 1, where the alteration is a function of the document quality.

4. The apparatus described in claim 1, where the alteration is a function of the probability of correct identification.

5. The apparatus described in claim 1, where the alteration is a function of the deviation between the specimen and the indicated reference and a function of the document quality.

6. The apparatus described in claim 1, where the alteration is a function of the deviation between the specimen and the indicated reference and a function of the probability of correct identification.

7. The apparatus described in claim 1, where the alteration is a function of the deviation between the specimen and the indicated reference, a function of the document quality, and a function of the probability of correct identification.

8. An apparatus for identifying a specimen based on its similarity to a member of a set of references comprising, in combination:
   means for generating a function of the specimen;
   means for comparing the function of the specimen with a non-adaptively stored function of each reference and with an adaptively stored function of each reference;
   means for generating an indication of the identity of the reference whose function is most similar to the function of the specimen;
   and means for altering the adaptively stored function of the indicated reference when the specimen is different than this adaptively stored reference.

9. An apparatus for identifying a specimen based on its similarity to a member of a set of references comprising, in combination:
   means for generating a function of the autocorrelation function of the specimen;
   means for comparing the function of the autocorrelation function of the specimen with a non-adaptively stored function of the autocorrelation function of each reference and with an adaptively stored function of the autocorrelation function of each reference;
   means for generating an indication of the identity of the reference whose function of the autocorrelation function is most similar to the function of the autocorrelation function of the specimen;
   and means for altering the adaptively stored function of the autocorrelation function of the indicated reference when the specimen is different than this adaptively stored reference.

10. An adaptive specimen identification apparatus comprising, in combination:
    means for generating a function of the specimen;
    non-adaptive means for storing functions of references;
    adaptive means for storing functions of references;
    means for comparing the function of the specimen with non-adaptively stored functions of references and with adaptively stored functions of references for providing an indication of the identity of the specimen;
    and means for altering the adaptively stored function of the corresponding reference when the specimen is different than this adaptively stored reference.

11. The apparatus described in claim 10, where the alterations is a function of the deviation between the specimen and the indicated reference.

12. The apparatus described in claim 10, where the alterations is a function of the document quality.

13. The apparatus described in claim 10, where the alteration is a function of the probability of correct identification.

14. The apparatus described in claim 10, where the alteration is a function of the deviation between the specimen and the indicated reference and a function of the document quality.

15. The apparatus described in claim 10, where the alteration is a function of the deviation between the specimen and the indicated references and a function of the probability of correct identification.

16. The apparatus described in claim 10, where the alteration is a function of the deviation between the specimen and the indicated references, a function of the document quality, and a function of the probability of correct identification.

17. An adaptive specimen identification apparatus comprising, in combination:
means for generating a function of the autocorrelation function of the specimen;
non-adaptive means for storing functions of autocorrelation functions of references;
adaptive means for storing functions of autocorrelation functions of references;
means for comparing the function of the autocorrelation function of the specimen with non-adaptively and adaptively stored functions of the autocorrelation functions of references for providing an indication of the identity of the specimen;
and means for altering the adaptively stored function of the autocorrelation function of the corresponding reference when the specimen is different than this adaptively stored reference.

18. A specimen identification apparatus comprising, in combination:
input means including a surface light scanning device, and a light-sensitive device having an output $f(x,y)$ indicative of the specimen;
means for generating an autocorrelation function $D_S(x', y')$ of the specimen indication $f(x, y)$;
means for adaptively storing autocorrelation functions $D_R(x', y')$ of reference patterns R;
means for non-adaptively storing autocorrelation functions $D_{R*}(x', y')$ of reference patterns R*;
means for developing the normalized sums $$\frac{\sum_{x', y'} D_S(x', y') \cdot D_R(x', y')}{\left[\sum_{x', y'} D_R^2(x', y')\right]^{1/2}} \text{ and }$$

$$\frac{\sum_{x', y'} D_S(x', y') \cdot D_{R*}(x', y')}{\left[\sum_{x', y'} D_{R*}^2(x', y')\right]^{1/2}}$$

of the point-by-point products of the autocorrelation function of the specimen and the autocorrelation functions of the reference patterns;
means for providing an indication of the reference pattern which corresponds to the largest of the sums, which is indicative of the identity of the specimen;
and means for altering the adaptively stored function of the indicated reference pattern when the specimen function is different than this function.

19. A specimen identification apparatus comprising, in combination:
input means including a surface light scanning device, and a light-sensitive device having an output $f(x,y)$ indicative of the specimen;
means for generating an autocorrelation function $D_S(x', y')$ of the specimen indication $f(x, y)$ of the specimen indication $f(x, y)$;
means for adaptively storing autocorrelation functions $D_R(x', y')$ of reference patterns R;
means for non-adaptively storing autocorrelation functions $D_R(x', y')$ of reference pattern R*;
means for developing normalized sums of point-by point products of the autocorrelation function of the specimen and adaptively and non-adaptively stored autocorrelation functions of the reference patterns;
means for providing an indication of the reference pattern which corresponds to the largest of the sums, which is indicative of the identity of the specimen;
and means for altering the adaptively stored function of the indicated reference pattern when the specimen function is different than this function.

20. An apparatus as described in claim 19, where the amount of alteration is a function of the deviation between the specimen and the indicated reference pattern.

21. An apparatus as described in claim 19, where the amount of alteration is a function of the probability of correct identification.

22. An apparatus as described in claim 19, where the amount of alteration is a function of the document quality.

23. An apparatus as described in claim 19, where the amount of alteration is a function of the deviation between the specimen and the indicated reference pattern and a function of the probability of correct identification.

24. An apparatus as described in claim 19, where the amount of alteration is a function of the deviation between the specimen and the indicated reference pattern and a function of the document quality.

25. An apparatus as described in claim 19, where the amount of alteration is a function of the deviation between the specimen and the indicated reference pattern, a function of the probability of correct identification, and a function of the document quality.

26. A specimen identification apparatus comprising, in combination:
input means including a surface light scanning device, and a light-sensitive device having an output $f(x, y)$ indicative of the specimen;
means for generating an autocorrelation function $D_S(x', y')$ of the specimen indication $f(x, y)$;
means for adaptively storing autocorrelation functions $D_R(x', y')$ of reference patterns R;
means for non-adaptively storing autocorrelation functions $D_{R*}(x', y')$ of reference patterns R*;
means for developing normalized sums of point-by-point products of the autocorrelation function of the specimen and adaptively non-adaptively stored autocorrelation functions of reference patterns;
means for providing an indication of the reference pattern which corresponds to the largest of the sums, which is indicative of the identity of the specimen when the ratio of the largest and the second-largest sums exceeds a predetermined amount, and for providing a reject indication when the ratio is insufficient;
and means for altering the adaptively stored function of the indicated reference pattern when the specimen function is different than this function.

27. A specimen identification apparatus comprising, in combination:
means for generating electronic indications of discrete portions of the functions of the autocorrelation function of the specimen;
means for non-adaptively storing electronic indications of corresponding discrete portions of functions of the autocorrelation functions of reference patterns;
means for adaptively storing electronic indications of corresponding discrete portions of functions of the autocorrelation functions of reference patterns;
means for multiplying portions of the function of the autocorrelation function of the specimen by corresponding portions of functions of the non-adaptively and adaptively stored autocorrelation functions of references;
means for separately accumulating the products for each reference;
means for providing an indication of the reference pattern which corresponds to the largest accumulation which is indicative of the identity of the specimen;
and means for altering the adaptively stored function of the autocorrelation function of the indicated reference pattern when the specimen function is different than this function.

28. The apparatus described in claim 27, wherein the means for serially generating electronic indications of discrete portions of the autocorrelation function of the specimen is limited to a serial autocorrelation function generator comprising, in combination:

two recycling shift registers each containing data indicative of the input function, and each having an output indication of the data in a position of the register;

means for independently shifting the data in each shift register;

a multiplier operating on the shift register outputs;

and means for summing groups of the multiplier outputs, whereby the sum of each group provides an element of the autocorrelation function of the input.

29. A specimen identification apparatus comprising, in combination:

input means including a surface light scanning device, and a light-sensitive device having an output $f(x, y)$ indicative of the specimen;

means for generating an autocorrelation function $D_S(x', y')$ of the specimen indication $f(x, y)$;

means for adaptively storing autocorrelation functions $D_R(x', y')$ of reference patterns R;

means for non-adaptively storing autocorrelation functions $D_{R*}(x', y')$ of reference patterns R*;

means for developing normalized sums of point-by-point products of the autocorrelation function of the specimen and the autocorrelation functions of adaptively and non-adaptively stored reference patterns;

means for providing an indication of the reference patterns which corresponds to the largest of the sums, which is indicative of the identity of the specimen;

means responsive to the developed sums for providing an indication of the system discrimination, and means responsive to the indication of the system discrimination and to the difference between the autocorrelation function of the specimen and the autocorrelation function of the indicated reference pattern, for altering the adaptively stored autocorrelation function of the indicated reference pattern.

30. An apparatus as described in claim 29, where the means for altering the stored autocorrelation function of the indicated reference pattern is also responsive to the document quality.

31. An adaptive specimen identification apparatus comprising, in combination:

means for generating a function of the specimen;

non-adaptive means for storing functions of references;

adaptive means or storing functions of references;

means for comparing the function of the specimen with non-adaptively stored functions of references and with adaptively stored functions of references for providing an indication of the identity of the specimen;

and means for altering the adaptively stored function of the corresponding reference when the specimen is not identical to this adaptively stored reference.

References Cited by the Examiner

UNITED STATES PATENTS 3,064,249  11/62  Forbath _____ 343—5

MALCOLM A. MORRISON, *Primary Examiner.*